(12) United States Patent
Nakayama

(10) Patent No.: US 6,188,780 B1
(45) Date of Patent: *Feb. 13, 2001

(54) IMAGE COLLATION DEVICE

(75) Inventor: Akihito Nakayama, Tokyo (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/997,662

(22) Filed: Dec. 23, 1997

(30) Foreign Application Priority Data

Dec. 26, 1996 (JP) .................................... 8-356825

(51) Int. Cl.[7] .................................................. G06K 9/00
(52) U.S. Cl. ............................................... 382/124
(58) Field of Search ..................... 382/124, 125, 382/126, 127, 202, 115, 117, 118, 194, 195, 216, 217, 218, 278; 356/71; 340/825.34

(56) References Cited

U.S. PATENT DOCUMENTS

| | | | |
|---|---|---|---|
| 4,581,760 | * | 4/1986 | Schiller et al. ....................... 382/124 |
| 4,752,966 | * | 6/1988 | Schiller ................................ 382/125 |
| 5,067,162 | * | 11/1991 | Driscoll, Jr. et al. .................... 382/5 |
| 5,109,428 | * | 4/1992 | Igaki et al. ........................... 382/125 |
| 5,146,102 | * | 9/1992 | Higuchi et al. ....................... 250/556 |
| 5,465,303 | * | 11/1995 | Levison et al. ...................... 382/124 |
| 5,524,161 | * | 6/1996 | Omori et al. ........................ 382/125 |
| 5,537,484 | * | 7/1996 | Kobayashi ........................... 382/124 |
| 5,555,314 | * | 9/1996 | Nakajima ............................ 382/124 |
| 5,717,777 | * | 2/1998 | Wong et al. ......................... 382/124 |
| 5,761,330 | * | 6/1998 | Stoianov et al. ..................... 382/127 |
| 5,796,857 | * | 8/1998 | Hara .................................... 382/124 |
| 5,832,102 | * | 11/1998 | Uchida ................................ 382/124 |
| 5,848,176 | * | 12/1998 | Hara et al. .......................... 382/124 |

* cited by examiner

Primary Examiner—Leo H. Boudreau
Assistant Examiner—Brian P. Werner
(74) Attorney, Agent, or Firm—Frommer Lawrence & Haug, LLP.; William S. Frommer; Dexter T. Chang

(57) ABSTRACT

An image collation device such as a fingerprint collation device for specifying a plurality of frames for an inspection object, cutting a plurality of linear images from each frame, determining whether images coincide with each other in each frame with reference to a plurality of cut linear images, determining the determination results on a overall basis, and finally determining the coincidence, enabling consistent collation results with a simple structure.

8 Claims, 42 Drawing Sheets

IMAGE OF FINGERPRINT

FIG. 5
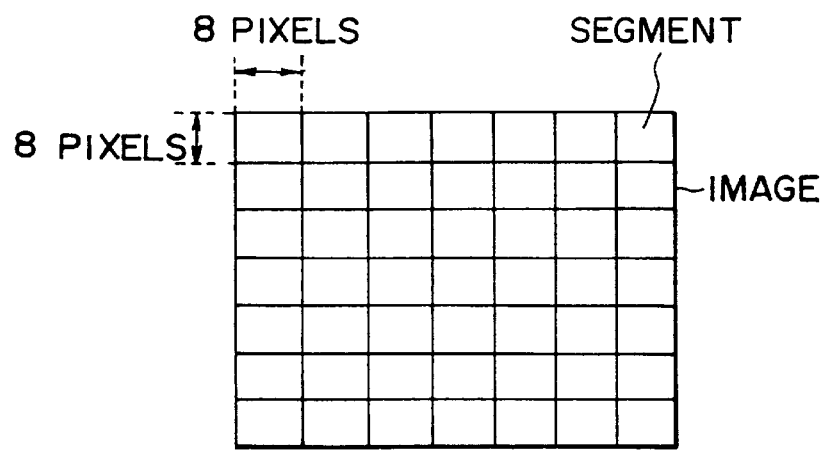
FIG. 6A
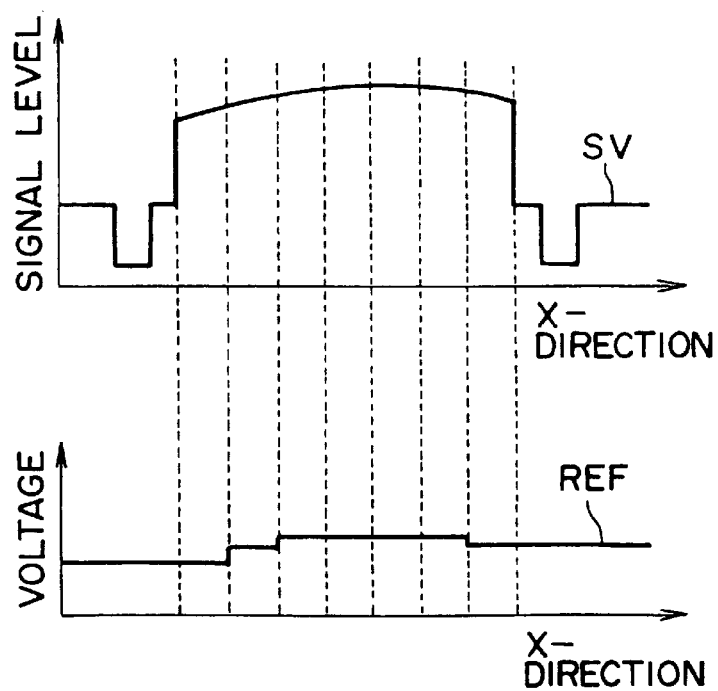
FIG. 6B

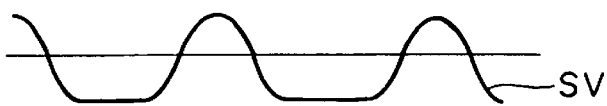
FIG. 7A
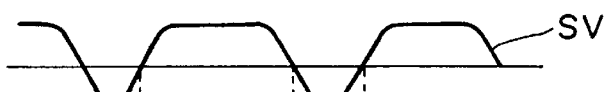
FIG. 7B
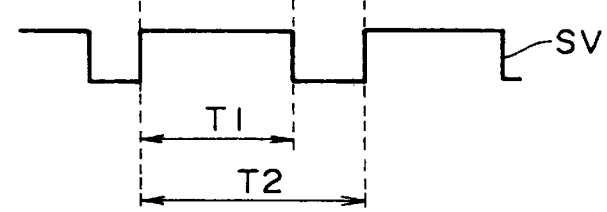
FIG. 7C
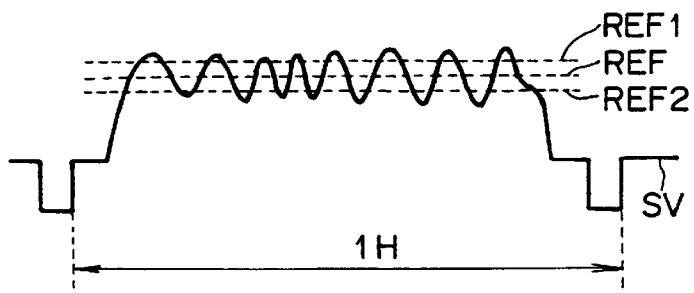
FIG. 8A
FIG. 8B1
FIG. 8B2
FIG. 8B3

ORIGINAL IMAGE
128 PIXELS
256 PIXELS

90 DEGREES ROTATED IMAGE
256 PIXELS
128 PIXELS

ORIGINAL PIXELS

90 DEGREES ROTATED IMAGE

FIG. 15

| FINGERPRINT DATABASE | | |
|---|---|---|
| USER ID | PRIORITY ORDER FINGERPRINT DATA D11 OF INDEX FINGER | MAGNIFICATION |
| | PRIORITY ORDER FINGERPRINT DATA D12 OF MIDDLE FINGER | MAGNIFICATION |
| | PRIORITY ORDER FINGERPRINT DATA D13 OF LITTLE FINGER | MAGNIFICATION |
| | RECORD OF COLLATION RATE | |
| USER ID | PRIORITY ORDER FINGERPRINT DATA D11 OF INDEX FINGER | MAGNIFICATION |
| | PRIORITY ORDER FINGERPRINT DATA D12 OF MIDDLE FINGER | MAGNIFICATION |
| | PRIORITY ORDER FINGERPRINT DATA D13 OF LITTLE FINGER | MAGNIFICATION |
| | RECORD OF COLLATION RATE | |

FIG. 16

| FINGERPRINT DATA D11, (D12, D13) | | | | | | |
|---|---|---|---|---|---|---|
| DATA IN HORIZONTAL DIRECTION | | | DATA IN VERTICAL DIRECTION | | | |
| FRAME 1 | FRAME 2 | FRAME 3 | | FRAME 1 | FRAME 2 | FRAME 3 |
| D1A COORDINATE VALUE | D1A COORDINATE VALUE | D1A COORDINATE VALUE | | D1A COORDINATE VALUE | D1A COORDINATE VALUE | D1A COORDINATE VALUE |
| D1B COORDINATE VALUE | D1B COORDINATE VALUE | D1B COORDINATE VALUE | | D1B COORDINATE VALUE | D1B COORDINATE VALUE | D1B COORDINATE VALUE |
| D1C COORDINATE VALUE | D1C COORDINATE VALUE | D1C COORDINATE VALUE | | D1C COORDINATE VALUE | D1C COORDINATE VALUE | D1C COORDINATE VALUE |
| ---------- | ---------- | ---------- | | ---------- | ---------- | ---------- |
| D1H COORDINATE VALUE | D1H COORDINATE VALUE | D1H COORDINATE VALUE | | D1H COORDINATE VALUE | D1H COORDINATE VALUE | D1H COORDINATE VALUE |

ORIGINAL IMAGE

FIG. 19

| | COORDINATE DATA OF ERECT IMAGE | | | | COORDINATE DATA OF ROTATION IMAGE | | | |
|---|---|---|---|---|---|---|---|---|
| | INCLINATION θ0 | INCLINATION θ1 | INCLINATION θ2 | --- | INCLINATION θ0 | INCLINATION θ1 | INCLINATION θ2 | --- |
| COLLATION SECTION 40A | (X1A,Y1A) (X2A,Y2A) (X3A,Y3A) | (X1A,Y1A) (X2A,Y2A) (X3A,Y3A) | (X1A,Y1A) (X2A,Y2A) (X3A,Y3A) | --- | (X1A,Y1A) (X2A,Y2A) (X3A,Y3A) | (X1A,Y1A) (X2A,Y2A) (X3A,Y3A) | (X1A,Y1A) (X2A,Y2A) (X3A,Y3A) | --- |
| COLLATION SECTION 40B | (X1B,Y1B) (X2B,Y2B) (X3B,Y3B) | (X1B,Y1B) (X2B,Y2B) (X3B,Y3B) | (X1B,Y1B) (X2B,Y2B) (X3B,Y3B) | --- | (X1B,Y1B) (X2B,Y2B) (X3B,Y3B) | (X1B,Y1B) (X2B,Y2B) (X3B,Y3B) | (X1B,Y1B) (X2B,Y2B) (X3B,Y3B) | --- |
| --- | | | | | | | | |

F I G. 21
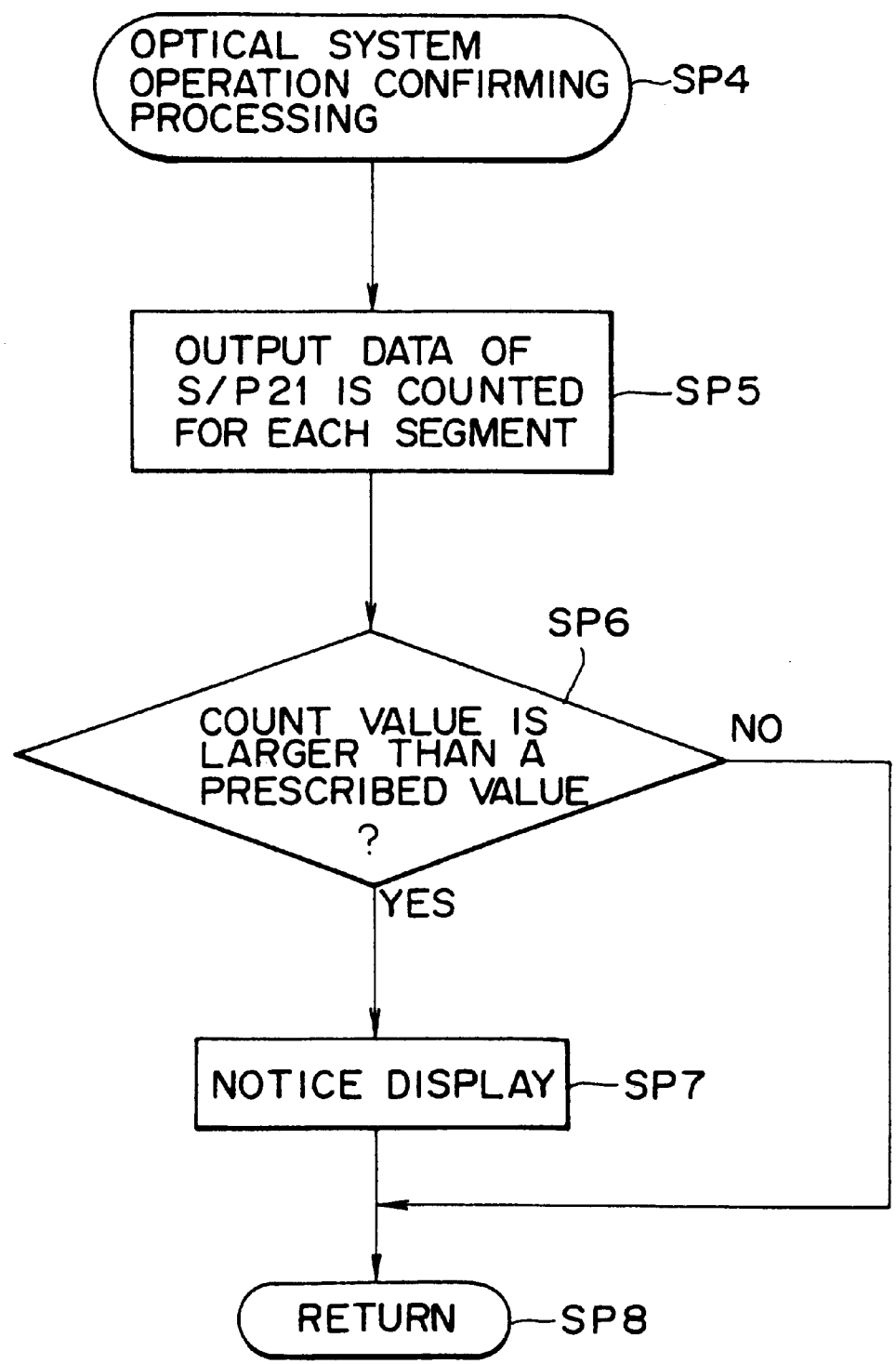

F I G. 44
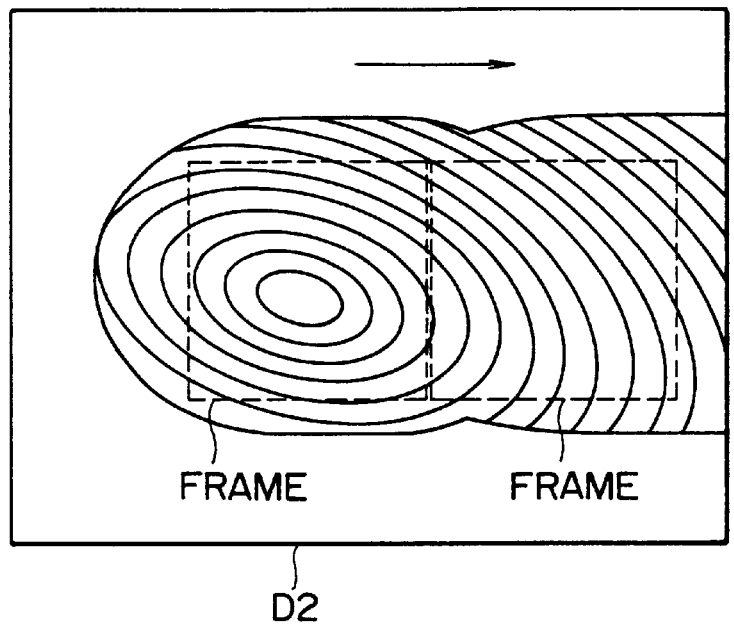
F I G. 46
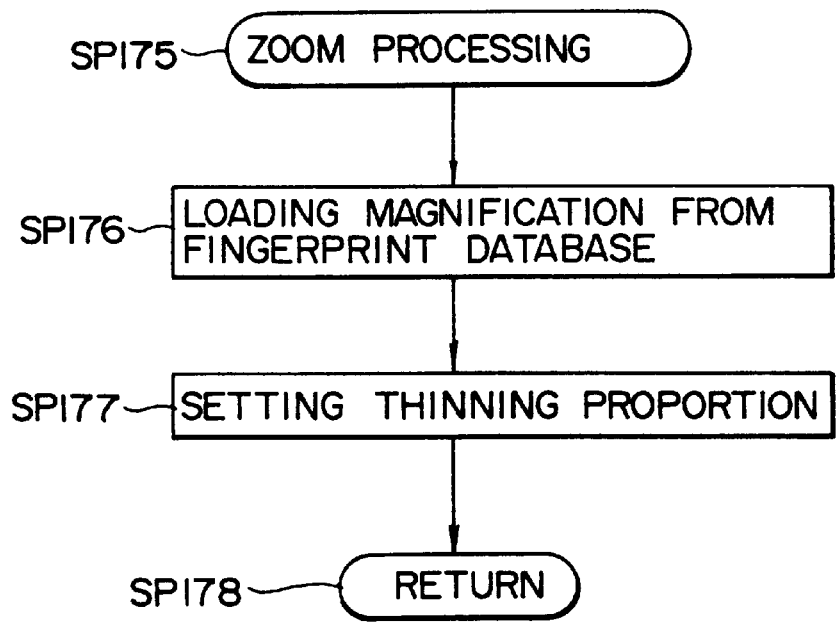

IMAGE COLLATION DEVICE

BACKGROUND OF THE INVENTION

1. Field of the Invention

This invention relates to an image collation device, which is applied, for example, as a fingerprint collation device. The device of the present invention involves the operation that a plurality of frames are specified for an inspection object, a plurality of linear images are cut from each frame, the coincidence between images in each frame is determined with reference to a plurality of cut linear images, this determination results are determined on an overall basis to finally determine the coincidence between the images, and thereby the image collation device can obtain the result of collation between images such as fingerprint image consistently.

2. Description of the Related Art

Heretofore, in the conventional fingerprint collation device using an image collation device of this sort, featured points such as a branch, point, and cut (referred to as featured point hereinafter) are extracted from a fingerprint image obtained by means of an image pick-up device, and fingerprint collation is performed with reference to these featured points.

In other words, in the conventional fingerprint collation device, a fingerprint to be collated is previously converted to database with reference to, for example, featured points and coordinate values. A fingerprint image to be subjected to fingerprint collation is subjected to image processing in order to extract featured points. Then, a database has an access to the extracted featured points and the fingerprint is collated based on the existence of corresponding featured points.

The conventional fingerprint collation is disadvantageous in that fingerprint collation takes a long time. If fingerprint collation is carried out consistently within a short time, the fingerprint collation device provides improved convenience for use, and such improvement is desirable.

To solve this problem, there may be one method that linear images are cut from a fingerprint image to be inspected, and the cut linear images are moved successively on a image to be determined, thereby comparison results are obtained. In this method, the degree of similarity can easily be detected, but there is a problem that no consistent collation result can easily be obtained.

SUMMARY OF THE INVENTION

The present invention has been accomplished in view of such disadvantage of the conventional fingerprint collation device, and this invention provides an image collation device which is capable of collating an image such as fingerprint consistently.

To solve such problem, in the present invention, first and second frames are specified, a plurality of linear images are cut from each frame, and the determination results for coincidence between the linear images in the first and second frames are detected.

If the coincidence of the first and second images is determined based on the determination results in the first and second frames, the accuracy of determination can be improved more than the method for determining coincidence between images by cutting linear images from only one frame.

BRIEF DESCRIPTION OF THE DRAWINGS

FIG. 5 is a plan view for illustrating the relation between an image and segments of a fingerprint.

FIGS. 6A and 6B are signal waveform diagrams for describing correction of actual light quantity dispersion.

FIGS. 7A to 7C are signal waveform diagrams for describing correction of a threshold value served as the reference voltage.

FIGS. 8A and 8B1 to 8B3 are signal waveform diagrams for describing switching of a threshold value served as the reference voltage.

FIG. 15 is a schematic diagram for illustrating the content of the fingerprint database.

FIG. 16 is a block diagram for illustrating a collation rate detection section.

FIG. 19 is a schematic diagram for illustrating the content of a coordinate group memory.

FIG. 21 is a flowchart for describing optical system operation confirming processing shown in FIG. 20.

FIG. 44 is a schematic diagram for describing shifting of a frame.

FIG. 46 is a flowchart for describing zoom processing shown in FIG. 45.

DESCRIPTION OF THE PREFFERED EMBODIMENTS

Embodiments of the present invention will be described in detail hereinafter with reference to the drawings.

(1) Structure of the embodiment (1-1) Whole structure

Figure 1:
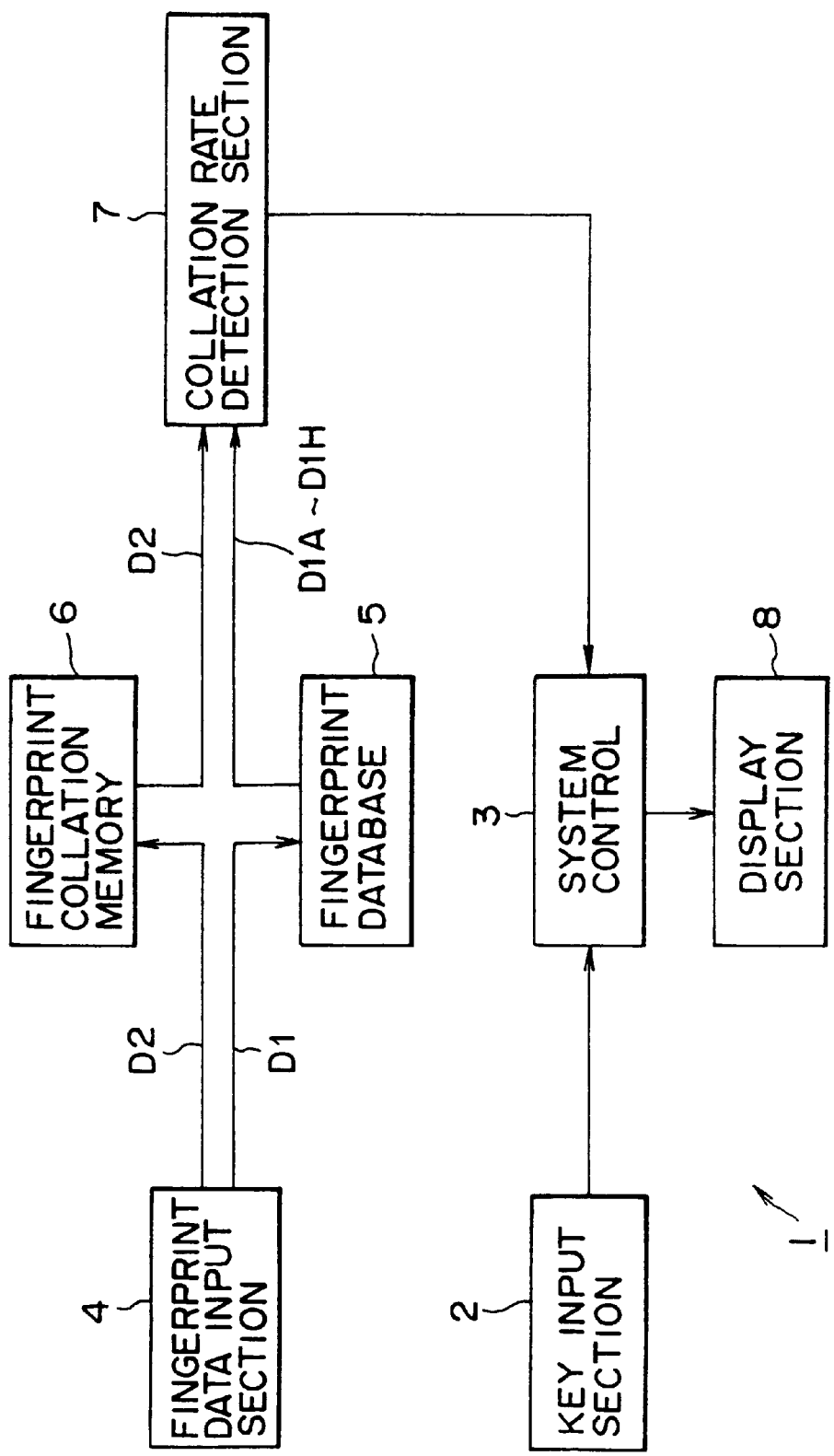
FIG. 1 is a block diagram for illustrating the whole structure of a fingerprint collation device in accordance with the present invention.

FIG. 1 is a block diagram for illustrating the whole structure of a fingerprint collation device in accordance with an embodiment of the present invention. In this fingerprint collation device 1, a system control circuit 3 controls all the operations in response to user operations inputted through a key input section 2, thereby, the system control circuit 3 fetches previously fingerprint collation data D1 of a desired user from a finger print data input section 4, and stores fetched fingerprint data D1 with other user data in a memory to construct a fingerprint database 5.

A user inputs a request for fingerprint collation to the fingerprint collation device 1, a fingerprint data D2 to be collated is fetched from the fingerprint data input section 4, and the fetched fingerprint data D2 is temporarily stored in a fingerprint collation memory 6. Then, the fingerprint data D2 temporarily stored in the fingerprint collation memory 6 and the corresponding fingerprint data D1 registered in the fingerprint database 5 are inputted to a collation rate detection device 7 in response to a user operation inputted through the key input section 2. Further, the degree of collation between these fingerprint data D1 and D2 is detected, and the system control circuit 3 judges whether these fingerprint data D1 and D2 are coincident or not coincident dependently on the degree of coincidence.

The fingerprint collation device 1 judges whether a fingerprint data D1 in form of database specified by the user ID inputted by a user and another fingerprint data D2 inputted through the fingerprint input section 4 are in coincidence, thereby judges whether the user who requested fingerprint collation is the person to be addressed, and outputs the judgment result. The fingerprint collation device 1 performs updating processing of the fingerprint database 5 as required dependently on the degree of coincidence and records the collation result. In the fingerprint collation device 1, a message is informed to the user using a display 8, and a necessary indication is informed to the user, for example, so that the user is pressed to input a user ID.

(1-1) Fingerprint data input section

Figure 2:
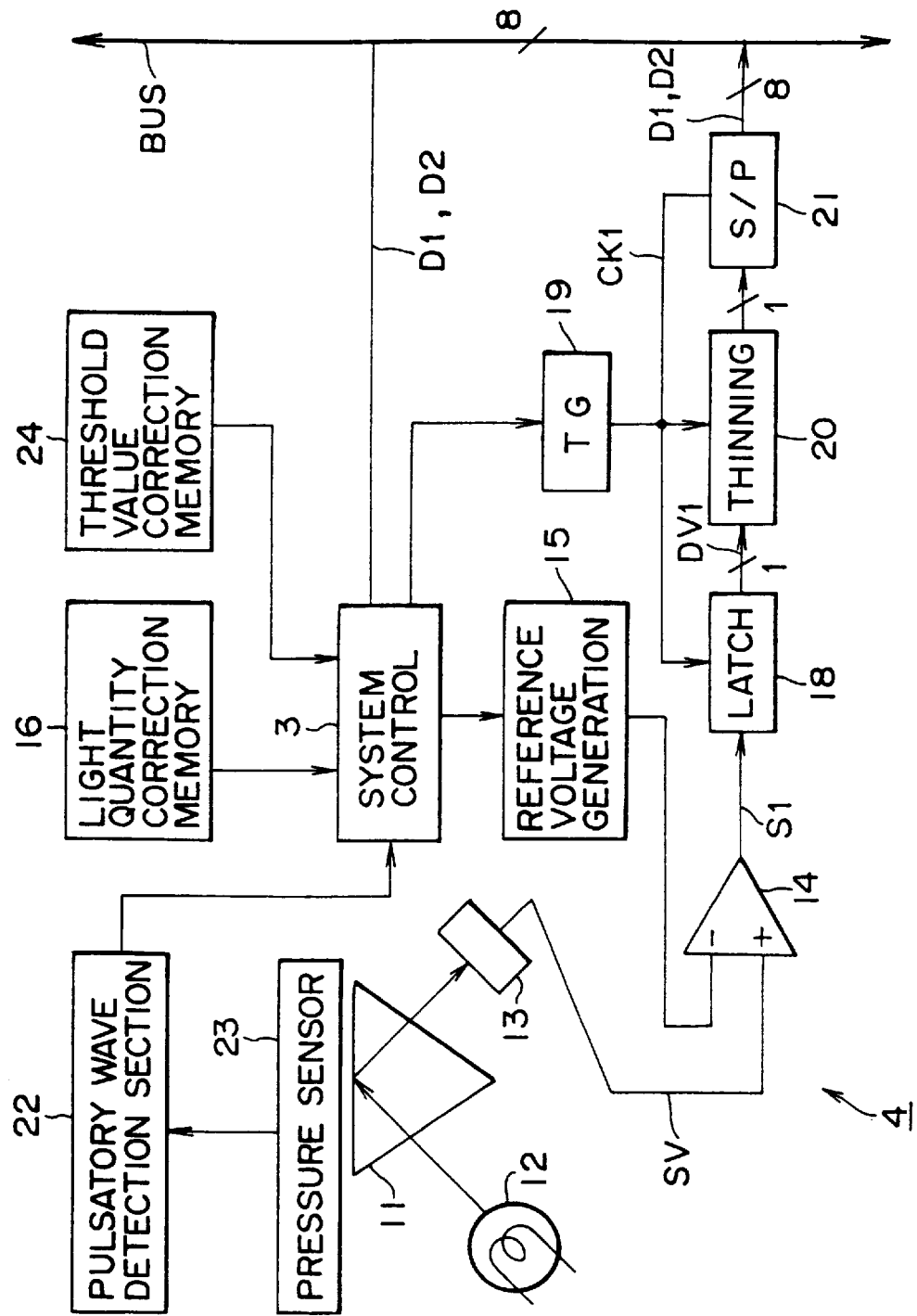
FIG. 2 is a block diagram for illustrating a fingerprint data input section of the fingerprint collation device shown in FIG. 1.

FIG. 2 is a block diagram for illustrating the fingerprint data input section. In the fingerprint data input section 4, a fingerprint is picked up as an image from a finger of a user who puts the finger on a prescribed finger placing position through a certain optical system, and fingerprint data D1 and D2 are generated from the image pick-up result.

The optical system comprises a isosceles triangle prism 11 which is held so that a finger to be subjected to fingerprint collation is placed on its base, a light source 12 for illuminating the base from an inclined plane of the isosceles triangle prism 11, and a COD camera 13 for image-picking up the light illuminated from the light source 12 reflected on the base from the residual inclined plane.

Figure 3:
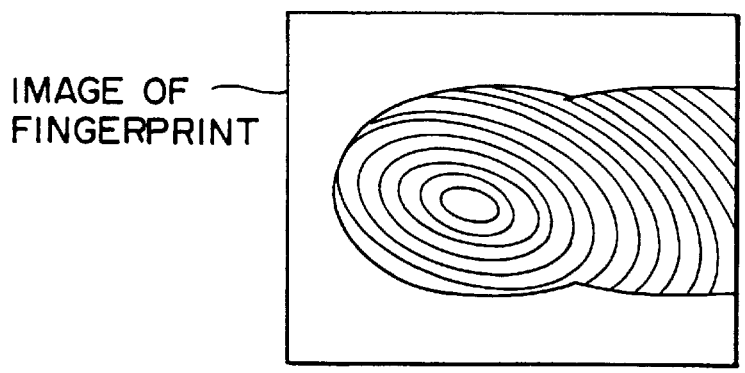
FIG. 3 is a schematic diagram for illustrating an image of a fingerprint of the fingerprint data input section shown in FIG. 2.

In the optical system, as for the portion where skin is not in contact with the base of the isosceles triangle prism 11, the illumination light emitted from the light source 12 is reflected totally and guided to the CCD camera 13, and on the other hand, as for the portion where the skin is in contact with the base of the isosceles triangle prism 11, the illumination light is reflected irregularly and the illumination light is not incident upon the CCD camera 13. As the result, the optical system outputs occulting image corresponding to the pattern of the fingerprint in video signal SV format as shown in FIG. 3 from the CCD camera 13.

In this embodiment, the CCD camera 13 picks up a finger so that the image direction from the tip to the foot of the finger corresponds to the resulting finger image disposed horizontally with the aspect ratio of 4:3. In this case, the blank portion outside of the finger is image-picked up at high brightness level because the finger is not in contact with the base of the isosceles triangle prism 11.

A comparison circuit 14 converts the video signal SV to a binary signal S1 and outputs the binary signal S1. A latch circuit 18 samples the binary signal S1 at a timing corresponding to each pixel of the CCD camera 13 with reference to a clock outputted from a timing generator (TG) 19, and outputs 1 bit image data DV1. A thinning circuit 20 fetches intermittently the image data DV1, thins the image data DV1 at a certain proportion, and outputs it, and the serial parallel converter circuit (S/P) 21 fetches the 2 bit image data DV1 in 8 byte unit and outputs it intermittently, thereby converts the 1 bit×8 bytes image data DV1 to the 8 bits×1 byte fingerprint data D1 or D2 and outputs it to a data bus BUS.

(1-1-1) Light quantity correction

The comparison circuit 14 generates a binary signal S1 with reference to a reference voltage REF generated from a reference voltage generation circuit 15, and corrects the light quantity dispersion of the optical system with reference to this reference voltage REF in this embodiment.

Figure 4A:
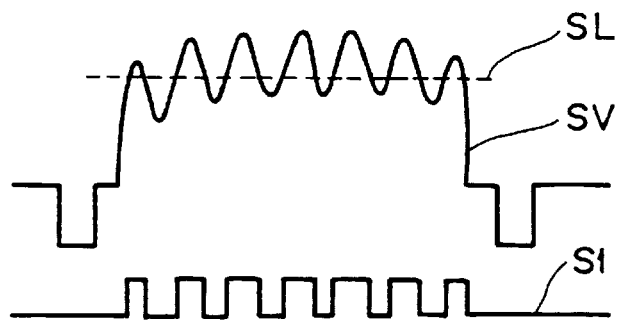
FIGS. 4A to 4E are signal waveform diagrams for describing correction of light quantity dispersion in the fingerprint data input section shown in FIG. 2.
Figure 4B:
Figure 4C:
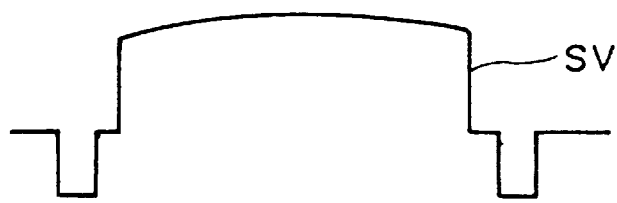
Figure 4D:
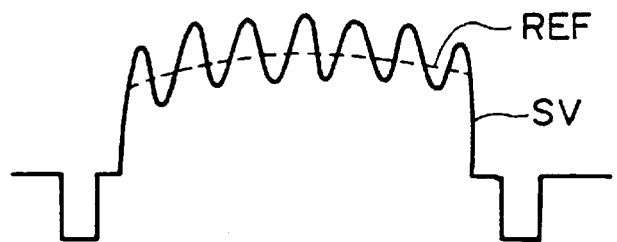
Figure 4E:

In detail, as shown in FIGS. 4A to 4E with a reference of horizontal scanning period, if such optical system generates light quantity dispersion, the signal level of the video signal SV that is the image pick-up result fluctuates due to the light quantity dispersion (refer to FIG. 4A), thereby, in the case of binary conversion with reference to a constant reference voltage SL, the binary signal S1 is generated so that the time period while the signal level rises is shortened at the peripheral portion where generally the light quantity decreases (refer to FIG. 4B). Therefore, it becomes difficult to generate the correct binary signal, and the fingerprint collation accuracy is deteriorated.

To cope with this problem, in this embodiment, the signal level of the video signal SV is detected while a fingerprint is not image-picked up (refer to FIG. 4C), thereby the optical system detects the light quantity dispersion. A reference voltage REF is set by setting off the detected signal level to the zero level side by the prescribed value, and a binary signal is generated with reference to the reference voltage REF (refer to FIGS. 4(D) and (E)). As described herein above, the light quantity dispersion is corrected and the fingerprint collation accuracy is improved in the fingerprint collation device 1. Further, the fingerprint collation device 1 detects soiling of the place where a finger is placed and deterioration of the light source 12 based on the comparison between the reference voltage REF in stand-by condition and the image pick-up result, and generates an alarm, thereby also the fingerprint collation accuracy is improved.

In detail, in this embodiment, an image outputted from the thinning circuit 20 is divided with an equal interval in the horizontal direction and vertical direction in 8 byte unit as shown in FIG. 5, thereby a plurality of segments are formed. The reference voltage generation circuit 15 comprises a latch circuit for holding the reference data of each segment and a digital analogue conversion circuit for performing digital analogue conversion processing at the timing corresponding to the reference data of each latch circuit and for outputting it, and outputs the reference voltage REF corresponding to each segment.

The signal level of a video signal SV outputted from the CCD camera 13 is detected and the reference data is registered in the light quantity correction memory 16 based on the signal level detection result previously when shipping from a factory. Further when the power source is thrown in, the system control circuit 3 sets the reference data in the reference voltage generation circuit 15. In the fingerprint collation device 1, if light quantity of the video signal SV is deficient in the peripheral portion in comparison with the central portion, for example, in the X-direction as shown in FIG. 6, the reference voltage REF is changed so as to correspond to the change in light quantity, and thus the image pick-up result is converted correctly to a binary signal corresponding to convexoconcave of a fingerprint.

To perform the function of the light quantity correction memory 16, the light quantity correction memory 16 comprises a non-volatile memory which is capable of holding the reference data for light quantity correction.

(1-1-2) Correction of threshold value

Skin contact area varies dependently on pressing force of a finger onto the base when the finger is placed on the base of the isosceles triangle prism 11. The total signal level varies in the video signal SV dependently on pressing force. In detail as shown in FIGS. 7A to 7C, the total signal level decreases so that the range of black level increases if pressing force is high (refer to FIG. 7A, on the other hand, the total signal level increases so that the range of white level increases if pressing force is low (refer to FIG. 7B). That is true for sweating. By reason of these phenomena, the binary signal S1 varies dependently on pressing force, and fingerprint collation result obtained from the binary signal S1 is varied in the fingerprint collation device 1.

In the comparison circuit 14, the reference data for light quantity correction which is set in the reference voltage generation circuit 15 by means of the system control circuit 3 is corrected with reference to correction data stored in the threshold value correction memory 24, the reference voltage REF is corrected segment-by-segment correspondingly to the image pick-up result, thereby the correct binary signal S1 is outputted even if pressing force and surface condition of the isosceles triangle prism 11 are changed.

A fingerprint data D1 outputted to the data bus BUS is inputted selectively to the system control circuit 3, the logical level of the fingerprint data D1 is detected in the system control circuit 3, and then the correction data to be stored in the threshold correction memory 24 is set based on the measurement result on the fingerprint data D1 so that a fall down period T1 of the signal level of the binary signal S1 is included in 30 to 70% range of the total period T2 (refer to FIG. 7C).

In the comparison circuit 14, the binary signal S1 is outputted using the reference voltage REF corrected with reference to the correction data, the content of the threshold correction memory 24 is updated for the binary signal S1, and when the total of the period T1 and T2 of each segment is contained in a certain range during repeated series of processing, updating processing of the threshold value correction memory 24 comes to an end.

The fingerprint collation device 1 sets the signal level of the reference voltage REF that is a threshold value to the optimal value for every segments, and outputs the correct collation result even if pressing force of a finger is changed.

(1-1-3) Changing of threshold value

In the fingerprint collation device 1, when the reference voltage REF is set as described herein above, fetching operation of the fingerprint data D1 and D2 to the fingerprint database 5 or fingerprint collation memory 6 starts, the comparison circuit 14 outputs the binary signal S1 with reference to the reference voltage REF determined dependently on the reference data of the light quantity correction memory 16 as shown in FIGS. 8A and 8B1, thereafter, outputs successively the binary signal using the first and second reference voltages REF1 and REF2 which are generated by shifting the reference voltage REF to positive side and negative side by a prescribed voltage (refer to FIGS. 8(A), (B2), and (B3)). In FIG. 8A and 8B1 to 8B3, the binary signal S1 with no correction of light quantity dispersion with reference to the reference voltage REF is shown.

In the condition that the system control circuit 3 corrects the reference data of the light quantity correction memory 16 dependently on the content of the threshold value correction memory 24, further the system control circuit 3 corrects it by a prescribed value, thereby changing of the reference voltage REF is performed by setting again the reference data in the reference voltage generation circuit 15. Thereby, the fingerprint collation device 1 eliminates deterioration of the fingerprint collation accuracy due to change in pressing force of a finger and in surface condition of the isosceles triangle prism 11, and outputs a correct collation result.

(1-1-4) Fingerprint data output

To output the fingerprint data D1 and D2 as described herein above, the timing generator 19 generates various clocks for the fingerprint collation device 1 with reference to the video signal SV, and changes the clock period to be outputted to the thinning circuit 20 in response to indication from the system control circuit 3. Thereby, the thinning circuit 20 changes the thinning proportion dependently on the size of a finger which is addressed for fingerprint collation of the fingerprint data D1 and D2, in detail, in the case that the finger is small, the fingerprint data D1 and D2 are generated with reduced thinning proportion from the image data DV1 so that fingerprint collation is performed consistently.

(1-1-5) Pulsatory wave detection section

The pulsatory wave detection section 22 comprises a pressure sensor 23 disposed aside from the finger placing position and peripheral circuits for outputting the detection result from the pressure sensor 23 to the system control circuit 3. The pressure sensor 23 together with a pressing mechanism not shown in the drawing presses the sides of a finger in response to an indication from the system control circuit 3 when the finger is placed on the finger placing position, and in this condition, and outputs the result of detected pulsatory pressure corresponding to blood flow of the finger.

The detected pressure varies correspondingly to pulsatory motion of blood flow, and referring to the pulsatory pressure, the system control circuit 3 detects the biological reaction of the finger based on the pressure detection result (that is detection result of pulsatory wave). Thereby, the fingerprint collation device 1 executes fingerprint collation processing and fingerprint collation processing only when the fingerprint collation device 1 judges that a human finger is placed on the place based on the pressure detection result, thus the security is improved. In this embodiment, the system control circuit 3 monitors the logical level of the fingerprint data D1 and D2, and detects a finger placed on the place utilizing the change in the logical level as a trigger, thereafter a series of collation processing is started only when the fingerprint collation device judges that a human finger is placed on the place based on the detection result detected by means of the pulsatory detection section 22.

(1-2) Fingerprint database 5 and fingerprint collation memory 6

(1-2-1) Fingerprint collation memory 6

Figure 9:
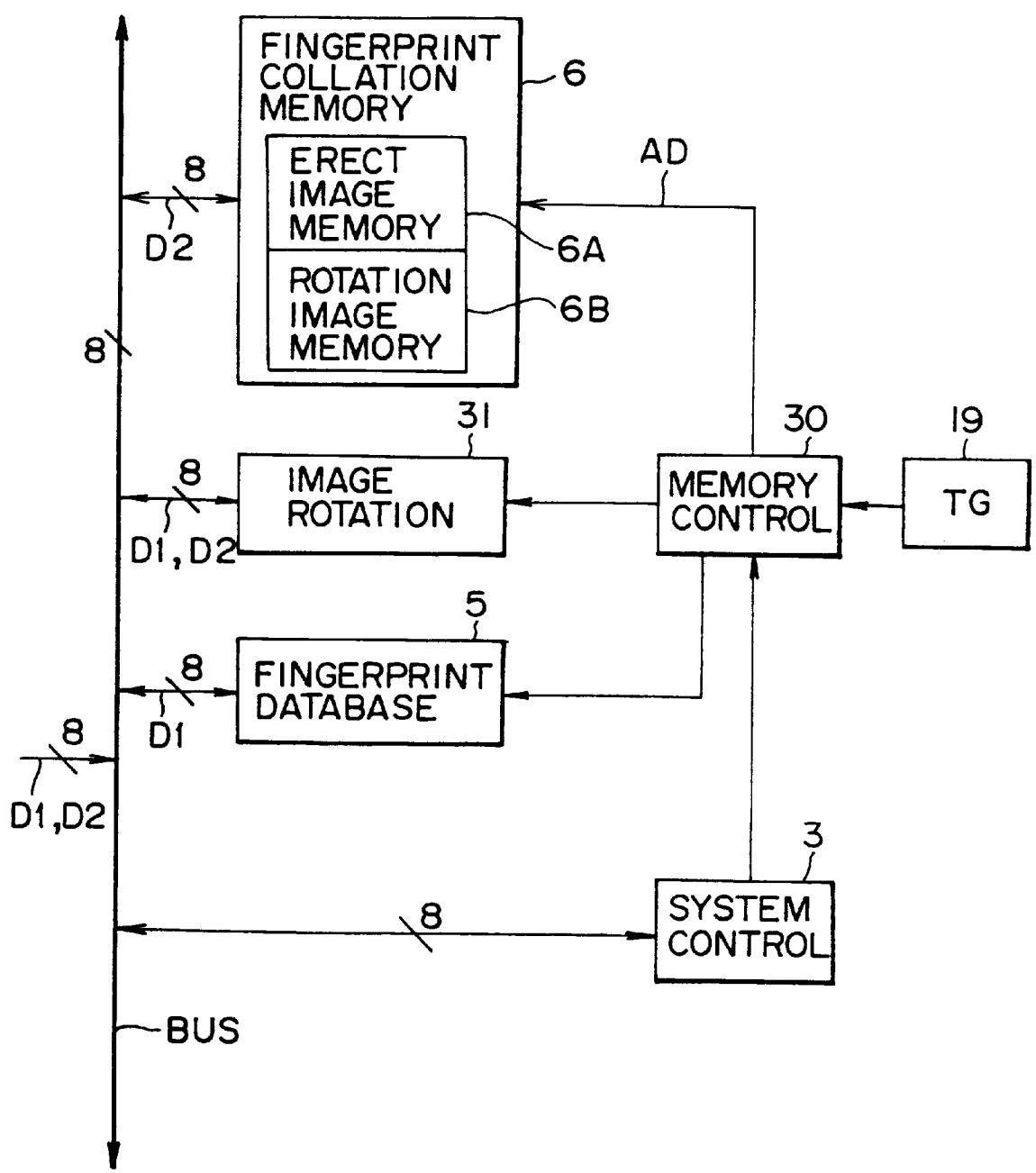
FIG. 9 is a block diagram for illustrating a fingerprint collation memory and fingerprint database together with peripheral circuits.

FIG. 9 is a block diagram for illustrating a fingerprint database 5 and fingerprint collation memory 6 with peripheral circuits. The fingerprint collation memory 6 holds the fingerprint data D1 and D2 outputted from the above-mentioned fingerprint data input section 4 when the fingerprint D1 is registered in the fingerprint database 5 and when the fingerprint is collated.

The fingerprint collation memory 6 stores the fingerprint data D1 and D2 comprising respectively horizontal 256 pixels and vertical 128 pixels from which ½ of the pixels are thinned from pixels of the CCD camera 13 for the fingerprint data D1 and D2 inputted from the fingerprint data input section 4 with a usual thinning proportion by way of address control which the memory control circuit 30 performs under the control performed by the system control circuit 3. On the other hand, in the case that the thinning proportion is changed dependently on the size of a finger for inputting, the image formed by the fingerprint data D1 and D2 is partially inputted selectively, then the fingerprint data D1 and D2 comprising horizontal 256 pixels and vertical 128 pixels are stored in the same manner as usual case. Thereby, the fingerprint collation device 1 can perform fingerprint collation in the same manner as usual case on the image which is fetched with a changed thinning proportion.

Figure 10:
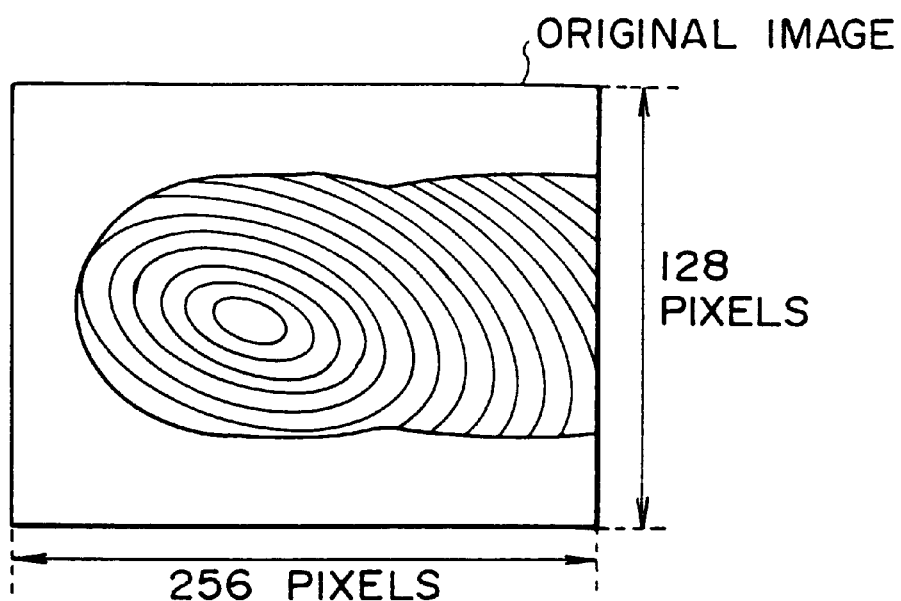
FIG. 10 is a schematic diagram for illustrating a fingerprint image of the fingerprint data input section shown in FIG. 2.
Figure 11:
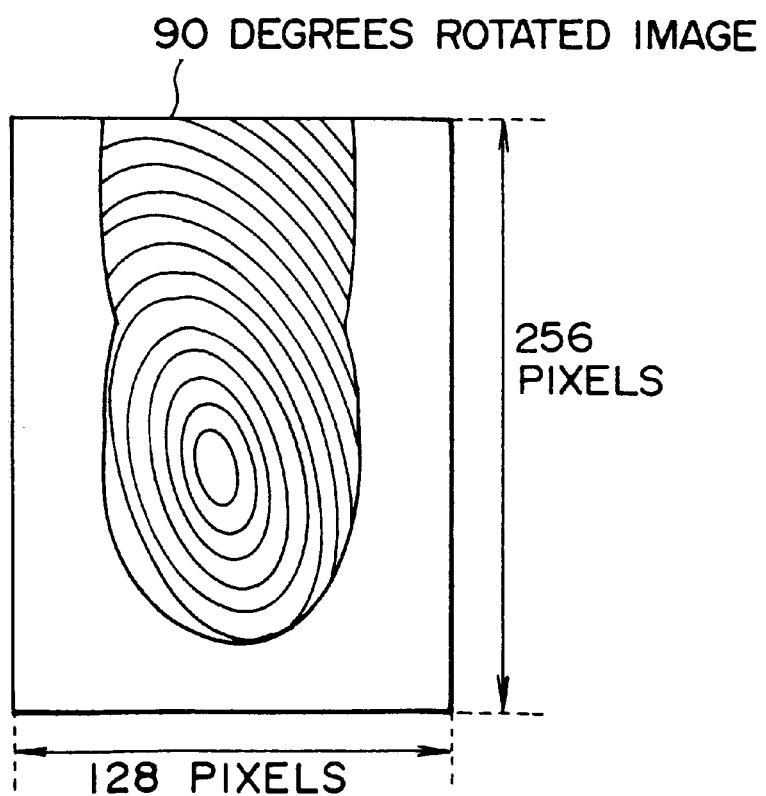
FIG. 11 is a schematic diagram for illustrating an image that the fingerprint image shown in FIG. 9 is rotated.

Further when, the fingerprint collation memory 6 stores the fingerprint data D1 and D2 outputted from the fingerprint data input section 4 in an erect image memory 6A, and outputs the fingerprint data which is stored successively in the erect image memory 6A through a data bus BUS by way of address control performed by the memory control circuit 30 to an image rotation circuit 31. Further, the fingerprint collation memory 6 stores the fingerprint data D1 of the image which is rotated 90 degrees with respect to the image based on the original fingerprint data outputted from the image rotation circuit 31 in a rotation image memory 6B as shown in FIG. 10 and FIG. 11. Thereby, the fingerprint collation device 1 can detect the fingerprint collation result by way of the same processing as applied to the original image using the image which was rotated 90 degrees with respect to the original image.

Figure 12:
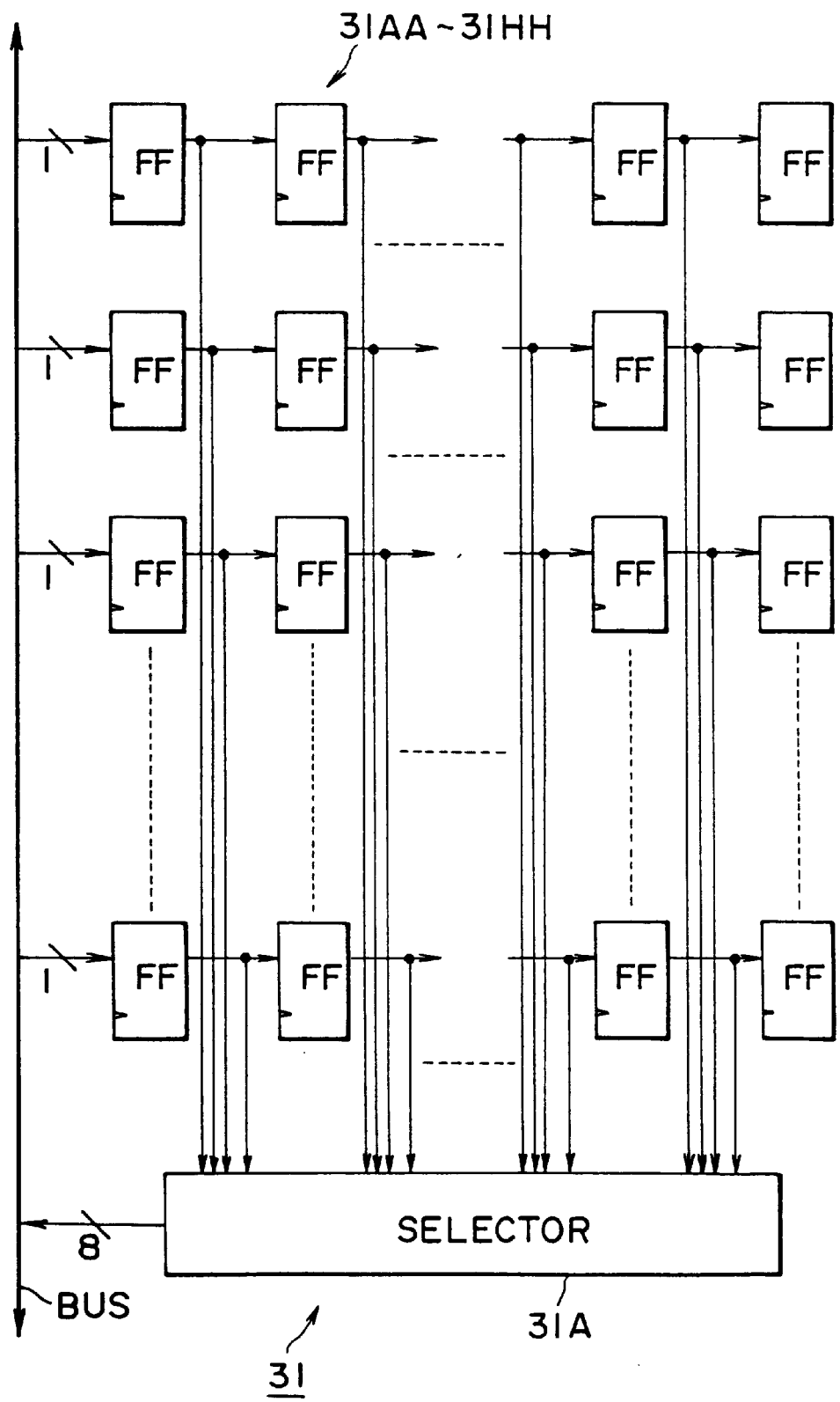
FIG. 12 is a block diagram for illustrating an image rotation circuit shown in FIG. 9.
Figure 13:
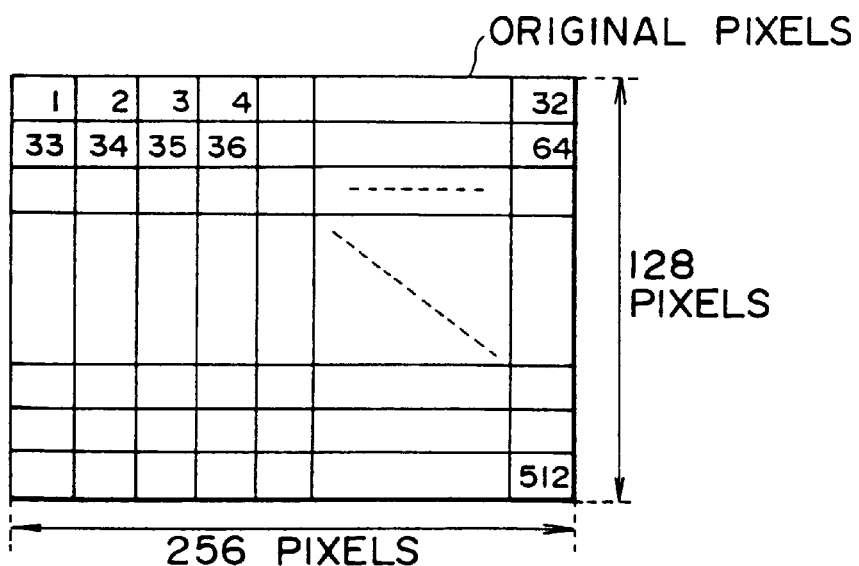
FIG. 13 is a schematic diagram for describing image rotation by means of the image rotation circuit shown in FIG. 12.
Figure 14:
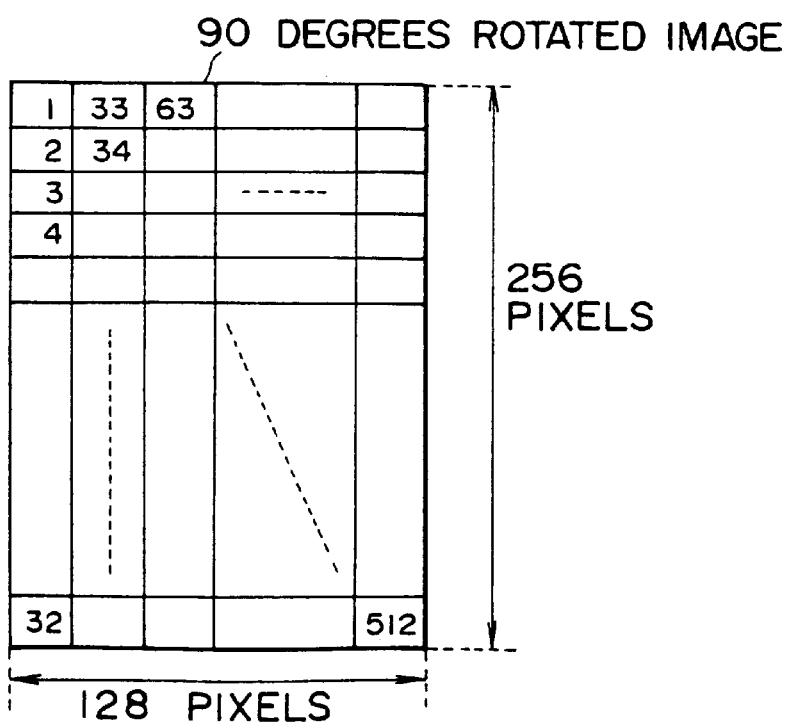
FIG. 14 is a schematic diagram for illustrating an image after rotation corresponding to FIG. 13.

In detail as shown in FIG. 12, the image rotation circuit 31 comprises 8×8 bit flip-flop circuits (FF) 31 AA to 31 HH connected in matrix pattern and a selector 31A, transfers each bit data of the fingerprint data D1 and D2 inputted from the data bus BUS 8 bytes-by-8 bytes successively by means of these flip-flop circuit (FF) 31 AA to 31 HH, thereafter, rotates the arrangement of the fingerprint data D1 and D2 90 degrees by way of outputting in parallel bit-by-bit. The image rotation circuit 31 inputs the fingerprint data D1 and D2 in the unit of a segment each of which segments are indicated with numerals 1 to 512 individually as shown in FIG. 13 and then re-stores them in a memory means, thereby the image rotation circuit 31 performs processing on the binary image data in 8 pixel unit, and thus the image rotation circuit 31 can rotate not only the arrangement direction of the segments but also the arrangement direction of the whole image as shown in FIG. 14.

The fingerprint collation memory 6 stores the fingerprint image which was rotated 90 degrees with respect to the image stored in the erect image memory 6A in the rotation image memory 6B.

When the fingerprint data D1 is registered, the fingerprint collation memory 6 receives and holds a plurality of fingerprint data D1 for one user, and the fingerprint collation device 1 selects the best fingerprint data D1 which is most preferable for fingerprint collation out of these plurality of fingerprint data D1 and registers selectively it in the fingerprint database 5.

The memory control circuit 30 performs address control under the control performed by the system control circuit 3, thereby the fingerprint collation memory 6 outputs selectively the fingerprint data D2 which is held as described herein above through the data bus BUS when the fingerprint is collated and registered in response to the operation of the collation rate detection section 7 which will be described herein after. Thereby, the fingerprint collation device 1 can cut the fingerprint image in horizontal direction, vertical direction, and slant direction and can output it.

(1-2-2) Fingerprint database 5

The fingerprint data base 5 comprises user data which were previously registered and fingerprint data D1. In detail as shown in FIG. 15, in the fingerprint data 5, a user ID for each registered user and fingerprint data D11, D12, and D13 of an index finger, middle finger, and little finger respectively for each user ID are registered. If it is difficult to collate the fingerprint of the middle finger because of, for example, hurt, or if it is difficult to obtain the collation result of coincidence using the middle finger, the fingerprint collation device 1 collates the fingerprint data D2 inputted from the fingerprint data input section 4 with these fingerprint data D11, D12, and D13 to identify the person, and thus the fingerprint collation device 1 is additionally convenient in that point.

The priority data is recorded on each fingerprint data D11, D12, and D13, and a fingerprint is collated successively according to the priority data. The fingerprint collation device 1 can perform collation with shorter waiting time for obtaining collation result as a whole, and is improved in convenience for use.

The fingerprint database 5 records the thinning proportion set by the thinning circuit 20 (refer to FIG. 2) when a fingerprint is registered as a magnification data of each fingerprint data D11, D12, and D13, and thereby fingerprint data D2 is fetched with the corresponding magnification when the fingerprint data D2 addressed to be collated is inputted. Further the collation rate detected in the fingerprint collation device 1 is recorded for each user ID, based on the collation rate record the collation condition is varied as required, and re-registration of the fingerprint D11 to D13 is prompted again. Thus the fingerprint collation device can identify the person consistently.

The fingerprint database 5 outputs selectively the held fingerprint data D11, D12, and D13 like the fingerprint collation memory 6 by way of address control performed by the memory control circuit 30 which is controlled by the system control circuit 3, and the content of the fingerprint database 5 is updated.

The database rotation image memory 5B holds the fingerprint image which is rotated 90 degrees by the image rotation circuit 31 with respect to the image of fingerprint data D11, D12, and D13 which are held in the fingerprint database 5. Thereby, the fingerprint collation device 1 holds the fingerprint image which was rotated 90 degrees in the rotation image memory 6B and the database rotation image memory 5B correspondingly to the erect fingerprint image which is held in the fingerprint database 5 and fingerprint collation memory 6, and can perform processing on the image which was rotated 90 degrees as in the same manner as applied to the original erect image.

(1-3) Collation rate detection section

FIG. 16 is a block diagram for illustrating the collation rate detection section 7. The collation rate detection section 7 has 8 series of collation sections 40A to 40H, and the target fingerprint data D2 addressed to be collated is set partially to each collation section 40A to 40H. The collation rate detection section 7 supplies successively the fingerprint data D1 to each collation section 40A to 40H so as to scan two-dimensionally on the image of the fingerprint data D1, and detects the degree of correlation between the fingerprint data D2 and fingerprint data D1 on each scanning position.

Based on the detection result, the coordinate value with high correlation is registered successively in a coordinate group memory 49, and the system control circuit 3 figures out the collation rate with reference to the positional relation of the registered coordinate group, and the judgment of coincidence is derived based on the collation rate. Because individual collation sections 40A to 40H have the same structure, a collation section 40A is only described in detail and detailed description of other collation sections 40B to 40H are omitted in FIG. 16. The collation rate detection section 7 detects the correlation value of the collation rate between a plurality of images of the fingerprint data D1 instead of judgment between the fingerprint data D1 and D2 when registering.

Figure 17:
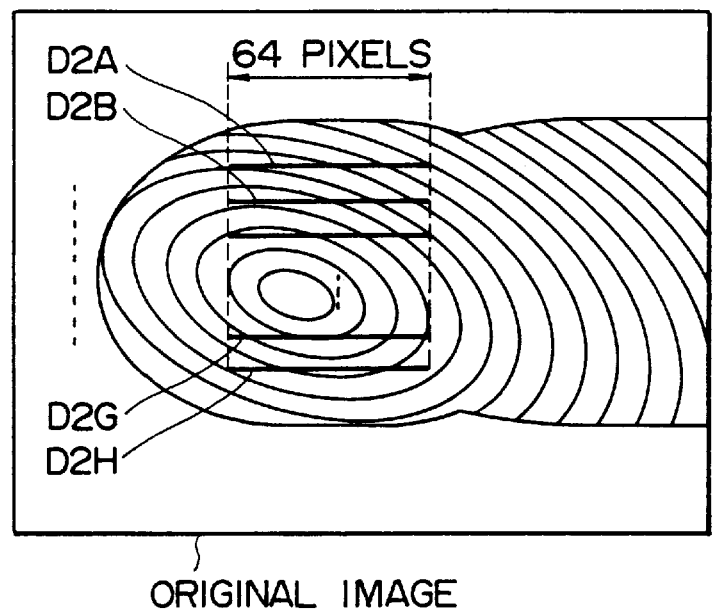
FIG. 17 is a schematic diagram for describing cutting into linear images.

In the respective collation sections 40B to 40H, the fingerprint data D2 stored in the fingerprint collation memory 6 is set 8 bits-by-8 bits in the latch circuit 41. The fingerprint data D2 to be set in the respective collation sections 40B to 40H is cut into linear images as shown in FIG. 17 by way of address control performed by the memory control circuit 30 (refer to FIG. 9) which is controlled by the system control circuit 3, and the linear images of the fingerprint data D2 is allocated to the respective collation sections 40B to 40H. That is, the fingerprint data D2 continuous in the horizontal direction, vertical direction, or slant direction on the original image is allocated. Further in the respective collation sections 40B to 40H, the fingerprint data D2 which changes in the logical level many times more than a prescribed times in the continuous direction so that the continuous direction are in parallel by way of previous examination performed by the system control circuit 3 is allocated.

In the collation sections 40A to 40H, the common fingerprint data D1 is supplied successively to the fingerprint data D2 which are set in the respective collation sections 40B to 40H. When, the fingerprint data D1 which is continuous according to the raster scanning order based on the assumption that the direction of image arrangement of the fingerprint data D2 is the horizontal direction correspondingly to the fingerprint data D2 which is set to the collation sections 40B to 40H by way of address control performed by the memory control circuit 30 (refer to FIG. 9) which is controlled by the system control circuit 3 is supplied in 8 bit-by-8 bit.

In the respective collation sections 40A to 40H, the parallel-serial conversion circuit (P/S) 42 converts the fingerprint data D1, which is inputted successively, to the serial data, and outputs it to a shift register 43 with a constant period. The shift register 43 holds 64 serial data, and performs successively bit shifting synchronously with the serial data outputted from the parallel-serial conversion circuit 42, and outputs the bit shifted data in 64 bit parallel.

A latch circuit 41 outputs the latched 8 byte fingerprint data D2A to D2H in 64 bit parallel. A comparison circuit 44 comprises 64 series of exclusive-or circuits, and outputs result of comparison of each bit between the output data of the shift register 43 and the output data of the latch circuit 41.

Figure 18:
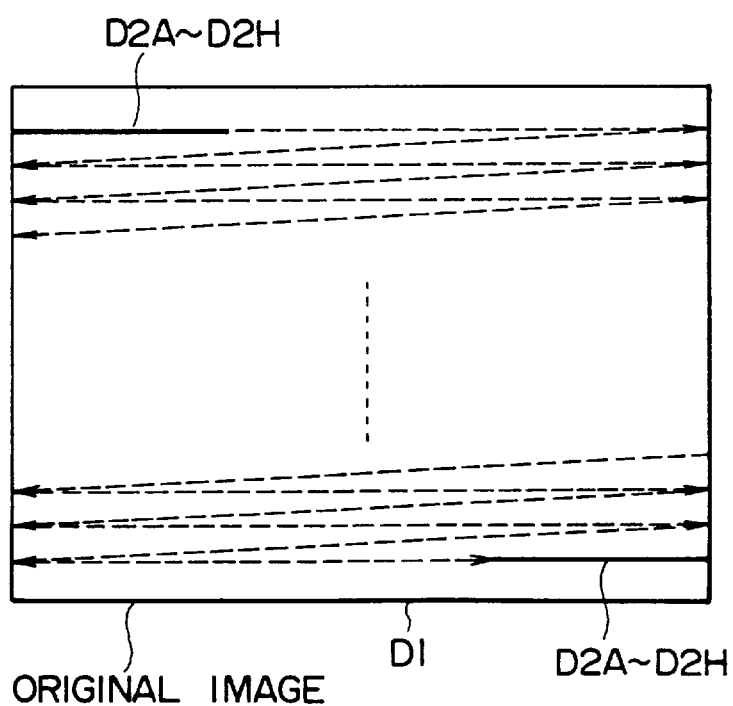
FIG. 18 is a schematic diagram for describing the supply of fingerprint data to linear images.

Thereby, the respective collation sections 40A to 40H performs raster scanning on the linear images formed by the fingerprint data D2A to D2H and on the image formed by the fingerprint data D1 as shown in FIG. 18 in the case that the fingerprint data D2A to D2H are set so that the pixel values are continuous, for example, in the horizontal direction, and thus judgment of coincidence or no coincidence of each bit between overlapped fingerprint data D1 and D2A to D2H is performed.

A counter 45 counts the 64 series of comparison results obtained as described herein above by the comparison circuit 44, and outputs the count value. The counter detects the degree of correlation between the linear image formed by the fingerprint data D2A to D2H and the image formed by the fingerprint data D1 which is overlapped on the linear image, and outputs a count value of the value 64 if the overlapped images are perfectly coincident.

The system control circuit 3 sets the reference value data for judgment in a register 46, and a comparison circuit 47 compares the reference value data set in the register 46 with the count value of the counter 45, and outputs judgment data D4A to D4H which rise in signal level if the degree of correlation between overlapped fingerprint data D1 and D2A to D2H is high as the result of raster scanning.

The coordinate group memory 49 corrects and records the address data AD outputted from the memory control circuit 30 when the judgment data D4A to D4H rise, and records thereby the relative position information between the fingerprint data D2A to D2H and D1 at the timing of rising of the respective judgment data D4A to D4H for collation sections 40A to 40B respectively.

As described herein above, the coordinate group memory 49 performs raster scanning of the linear image on the image of the fingerprint data D1, and corrects and fetches the address data AD at the timing when the judgment data rise, and records thereby the position where the degree of coincidence between the linear image and the image of the overlapped fingerprint data D1 is high by way of coordinate value of the fingerprint data D1.

In the case of an image having repeated pattern like fingerprint, such linear cut image is scanned to judge the degree of correlation between overlapped images, then many points where the degree of coincidence is high are found. Therefore, a plurality of coordinate data is recorded for respective collation sections 40A to 40H in the coordinate group memory 49. However in the case that two images belong to different two persons respectively, coordinate values independent between the collation sections 40A to 40H are stored in the coordinate group memory 49, on the other hand, in the case that two images belong to one person, the relative coordinate values held in relative positional relation of the above-mentioned fingerprint data D2A to D2H described for FIG. 17 are recorded in the coordinate group memory 49. Utilizing this relation, the collation rate data is generated from the coordinate group registered in the coordinate group memory 49.

In the embodiment, the coordinate group memory 49 stores the coordinate data of the erect image and coordinate data of the rotation image respectively in the divided memory areas as shown in FIG. 19. The coordinate group memory 49 records the coordinate data detected by means of the fingerprint data D1 and D2 of the fingerprint database 5 and erect image memory 6A as the coordinate data of the erect image, and records the coordinate data detected by means of the fingerprint data D1 and D2 of the corresponding database rotation image memory 5B and rotation image memory 6B as the coordinate data of the rotation image.

In this embodiment, the fingerprint collation device 1 is structured so as to set the linear images in the respective collation sections 40A to 40B with successively changed slant, and the coordinate group memory 49 records the coordinate data for each slant angle in the coordinate data of the erect image and rotation image. Thereby, the fingerprint collation device 1 judges totally the coordinate data recorded as described herein above to collate the fingerprint, and thus the accuracy of the fingerprint collation is additionally improved.

Further in the embodiment, the coordinate group memory 49 can hold a plurality of series of the coordinate data of such erect image and of the coordinate data of the rotation image. The coordinate group memory 49 holds the plurality of series corresponding to switching the reference voltage to REF, REF1, or REF2 in the fingerprint data input section 4 and corresponding to switching the area where linear images are cut (refer to as frame herein after), and records the coordinate data for each switching of reference voltage and frame respectively.

The fingerprint collation device 1 judges totally the coordinate data which are detected correspondingly to the switching of the reference voltage and to the switching of the frame to improve the collation results.

(1-4) System control circuit

The system control circuit 3 comprises a micro-computer, controls the whole operation in the fingerprint collation device 1, registers the fingerprint data D1 in the fingerprint database 5, and performs fingerprint collation processing with reference to the fingerprint database 5.

Figure 20:
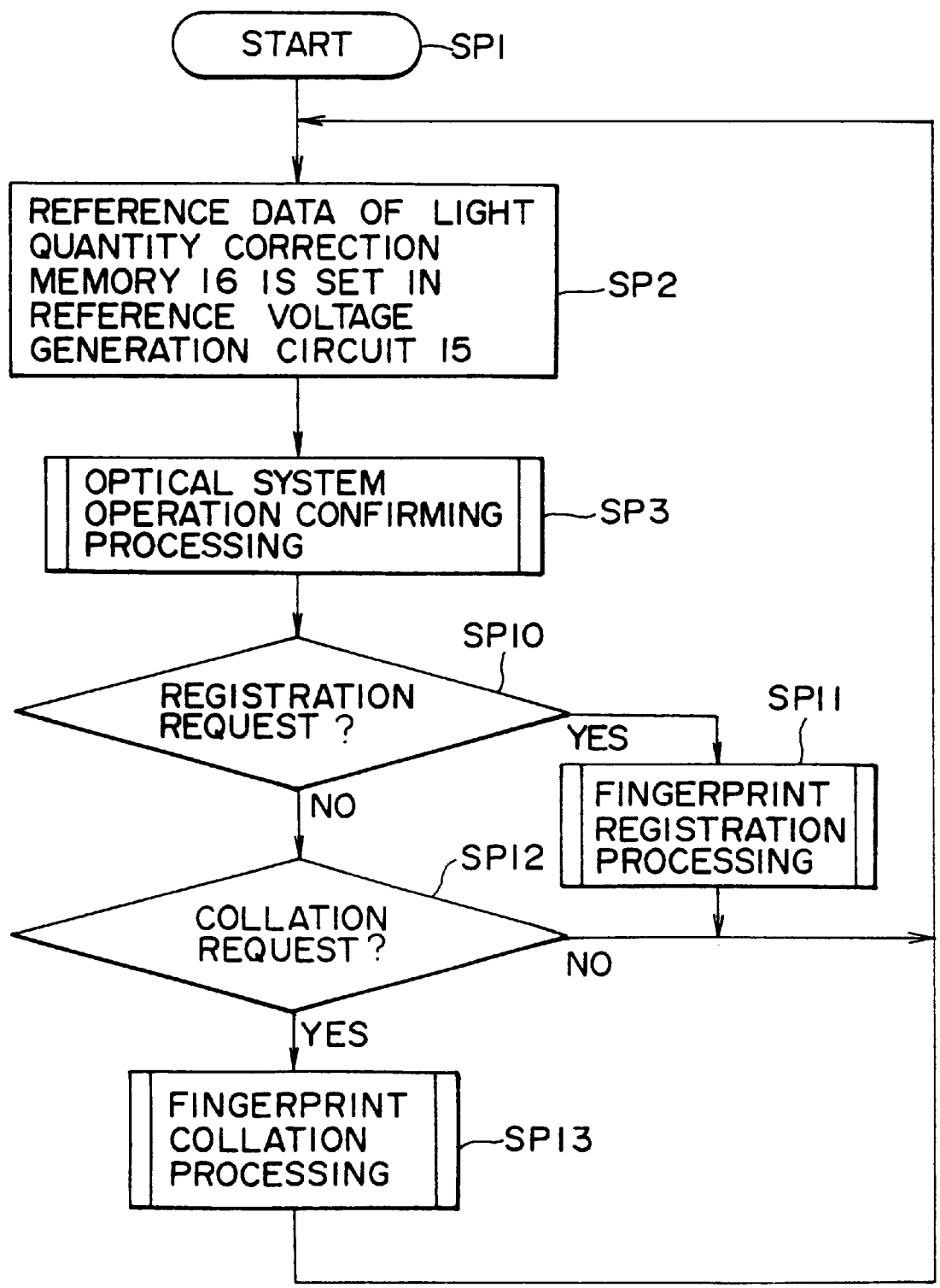
FIG. 20 is a flowchart for describing processing sequence of the system control circuit.

(1-4-1) Correction of light quantity dispersion and detection of abnormality of the optical system FIG. 20 is a flowchart for describing roughly the processing sequence of the system control circuit 3. When a power source is supplied to the system control circuit 3, the sequence proceeds from the step SP1 to the step SP2, the reference data registered in the light quantity correction memory 16 is set in the reference voltage generation circuit 15. Thereby, the system control circuit 3 sets the reference voltage REF of the comparison circuit 14 so as to correct light quantity dispersion of the optical system, and correct illumination result is obtained with an optical system having only a simple structure.

Subsequently, the system control circuit 3 executes optical system operation ensuring processing in the step SP3. In the optical system operation ensuring processing, the system control circuit 3, when the sequence proceeds from the step SP4 to the step SP5, fetches output data of the serial-parallel conversion circuit 21 through the data bus BUS (refer to FIG. 2) as shown in FIG. 21, and counts the logical level segment-by-segment. Counting of the logical level is performed by counting the number of bits the logical level of which bit falls down.

In the case that a finger is pressed on the base of the isosceles triangle prism 11 in the fingerprint input section 4, the illumination light of the light source 12 is reflected totally on the base for image picking up, usually the logical level of the output data is held at H-level. On the other hand, in the case that the base is dirty, the illumination light is reflected irregularly, the brightness level of the image pick-up result is lowered partially depending on the degree of soiling, the logical level falls down to L-level at the corresponding output data. Also in the case that the performance of the light source 12 is deteriorated in comparison with the performance when shipped from the factory to cause serious light quantity dispersion, it becomes difficult to correct by means of the reference data set in the light quantity correction memory 16, and the logical level falls down to L-level at the corresponding output data.

The system control circuit 3 judges whether the count value exceeds a prescribed value which is previously set based on the count result in the subsequent step SP6. If the result is YES, the sequence proceeds to the step SP7, the system control circuit 3 displays a maintenance call through the display section 8, thereafter the sequence proceeds to the step SP8, the system control circuit 3 finishes this processing sequence. The maintenance call displays a message which presses for cleaning of the finger placing place and a message which presses for informing to a maintenance worker in the case that a maintenance call is still displayed after cleaning.

In the fingerprint collation device 1, deterioration of fingerprint accuracy due to deterioration of performance of the light source and soiling of the isosceles triangle prism 11 are prevented, and the fingerprint collation accuracy is improved additionally.

On the other hand, if the judgment result is NO, then the system control circuit 3 finishes the processing sequence directly in the step SP8.

When the optical system operation ensuring processing is executed as described herein above, the sequence proceeds to the step SP10 (FIG. 20), the system control circuit 3 judges whether a finger registration request is inputted. In the embodiment, a fingerprint registration request is inputted by inputting prescribed commands and password number through the key input section 2. The fingerprint data D1 of each user is registered in the fingerprint database 5 in response to the fingerprint registration request. If a fingerprint registration request is inputted, then the system control circuit 3 obtains a YES result in the step SP10, the sequence proceeds to the step SP11, the fingerprint registration processing is performed, and the sequence returns to the step SP3.

On the other hand, if a fingerprint registration request is not inputted, then the sequence proceeds from the step 10 to the step 12, the system control circuit 2 judges whether a fingerprint collation request is inputted by operating the key input section 2. If the judgment result is NO, then the sequence of the system control circuit 3 returns to the step SP3. On the other hand, if the system control circuit 3 detects a fingerprint collation request, then the sequence proceeds from the step SP12 to the step SP13, the system control circuit 3 performs the finger collation processing, and the sequence returns to the step SP3.

(1-4-2) Fingerprint registration processing

Figure 22:
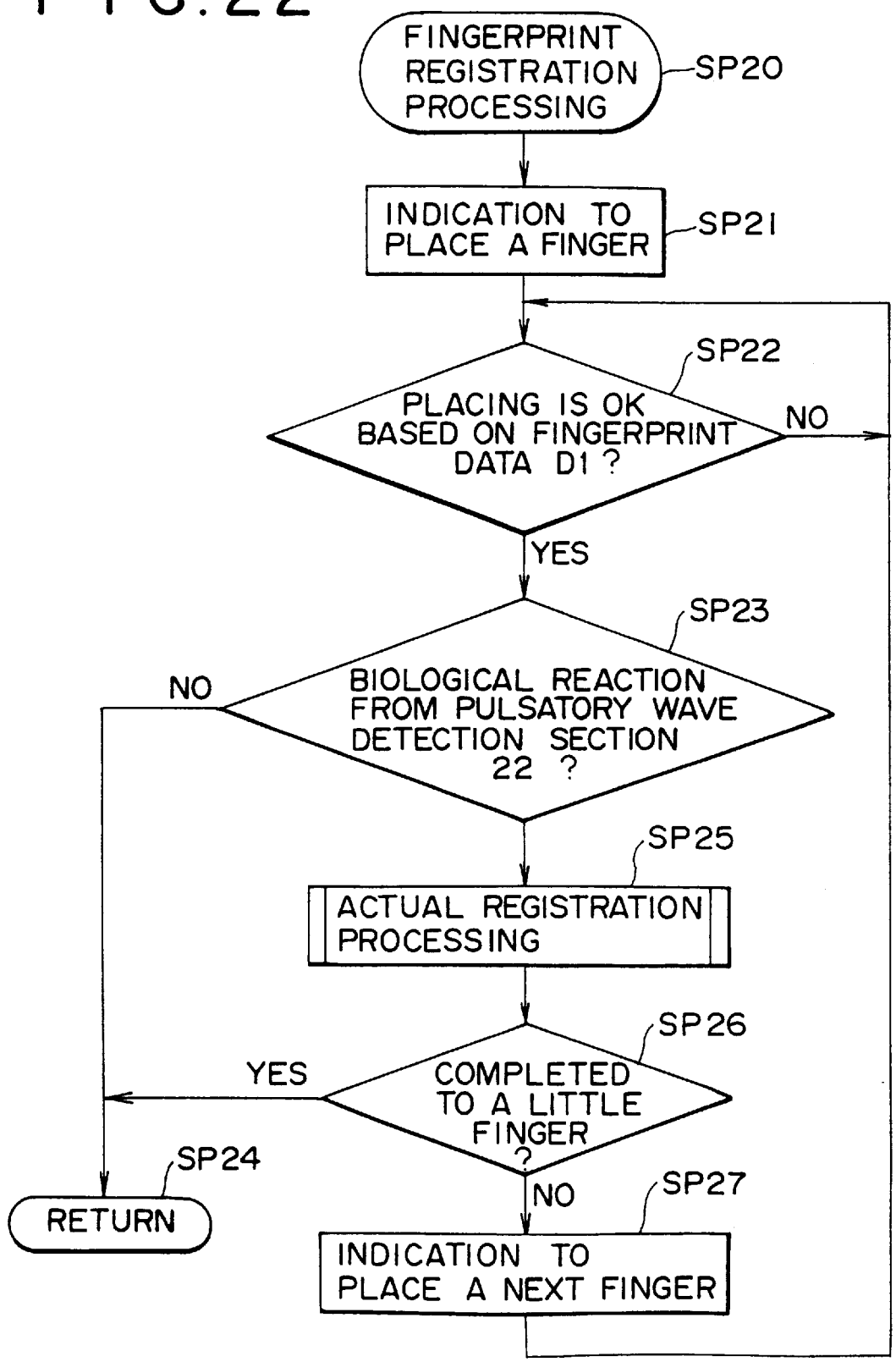
FIG. 22 is a flowchart for describing fingerprint registration processing shown in FIG. 20.

FIG. 22 is a flowchart for describing the processing sequence of fingerprint registration processing. The sequence proceeds from the step SP20 to the step SP21, the system control circuit 3 displays a message through the display section 8 (refer to FIG. 1) in the fingerprint registration processing, and presses a user to place his index finger on the finger placing place. Subsequently, the sequence proceeds to the step SP22, the system control circuit 3 judges whether a finger is placed on the finger placing place, and if the judgment result is NO, then the sequence repeats the step SP22.

In the step SP22, the system control circuit 3 inputs the output data of the serial-parallel conversion circuit 21 through the data bus BUS (refer to FIG. 2), and counts the logical level of the output data in a segment unit, thereby detects whether a finger is placed on the finger placing place by way of the output data. In the counting processing, the number of bits of the logical level is counted for a prescribed plurality of segments at the position corresponding to the approximately middle portion of the finger placing place, and the counting processing is executed by judging whether the count value exceeds a prescribed value. Thus the system control circuit 3 performs finger registration processing using image pick-up result as a trigger, and the operation of this fingerprint collation device 1 is simplified, and thus the convenience for use is improved additionally.

If the result is YES in the step SP22, the sequence proceeds to the step SP23, the system control circuit 3 judges whether the pulsatory wave detection section 22 detects a biological reaction. If the result is NO, then the sequence proceeds to the step SP24, the system control circuit 3 finishes the processing sequence. On the other hand, if the result is YES in the step SP23, the sequence proceeds to the step SP25, the system control circuit 3 executes actual registration processing that is an actual registration processing. Thereby, the system control circuit 3 registers the fingerprint data only when the biological reaction of the finger is detected, thus the security is improved additionally.

After the actual registration processing is completed, the sequence proceeds to the step SP26, the system control circuit 3 judges whether the fingerprint data is registered including a little finger. In the fingerprint collation device 1, the fingerprint data of an index finger, a middle finger, and a little finger is registered for each user, the system control circuit 3 obtains a NO result in the step SP26 as long as a special operation of the user is not detected, the sequence proceeds to the step SP27, the system control circuit 3 presses the user to place the next finger through the display section 8, and thereafter the sequence returns to the step SP22.

On the other hand, if the registration is completed including a little finger, then a YES result is obtained in the step SP26, the sequence proceeds from the step SP26 to the step SP24, the system control circuit 3 finishes the processing sequence.

(1-4-3) Actual registration processing

Figure 23:
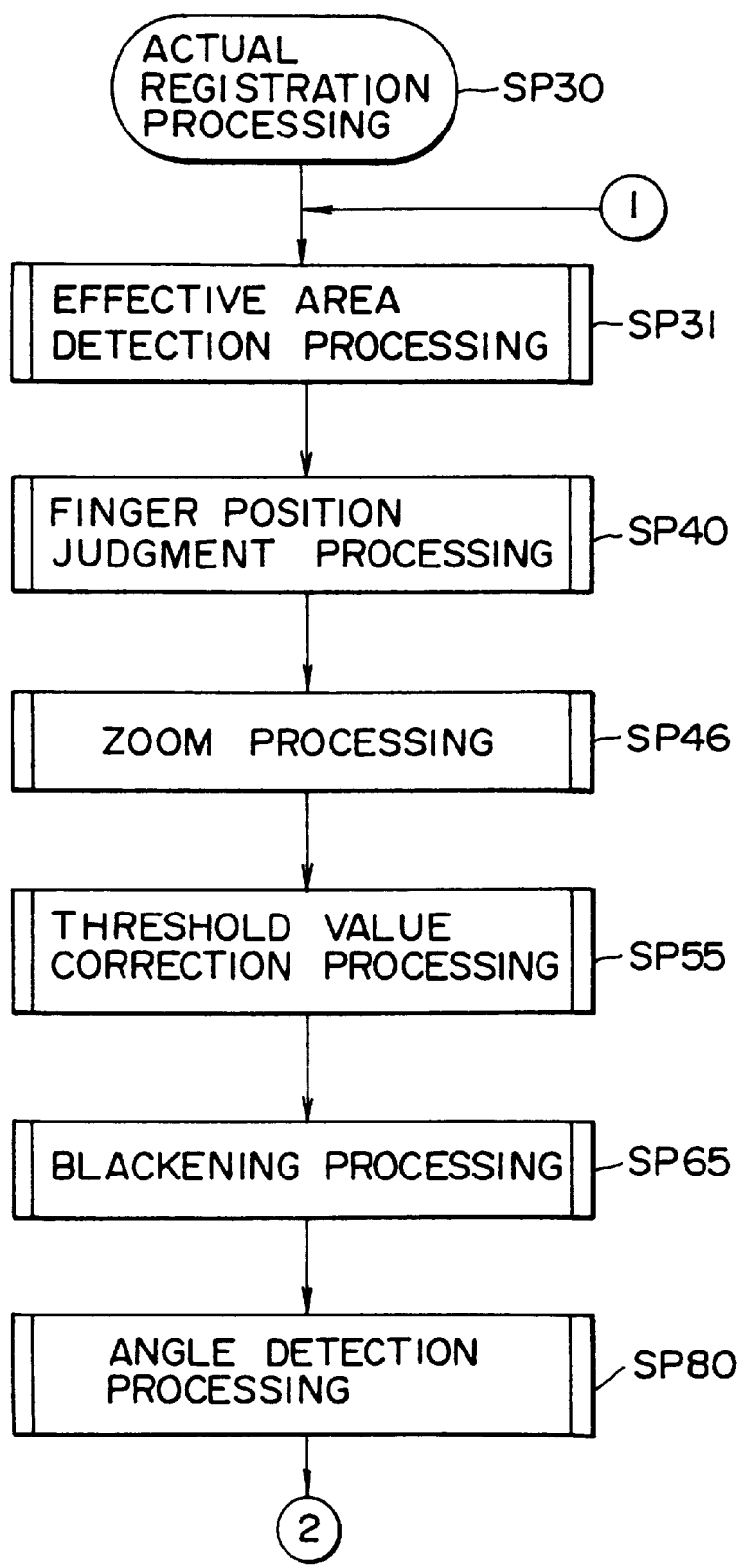
FIG. 23 is a flowchart for describing actual registration processing shown in FIG. 22.
Figure 24:
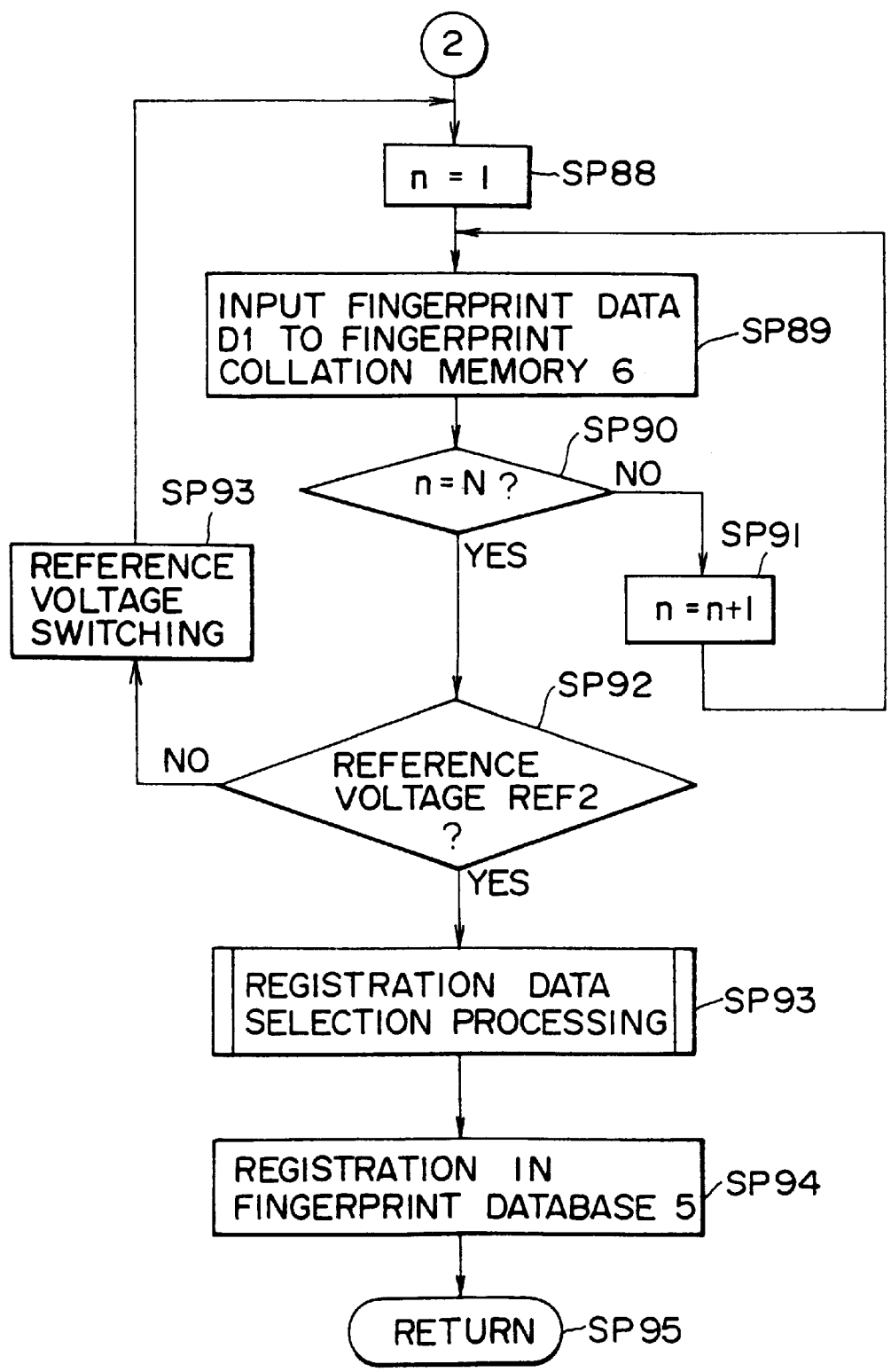
FIG. 24 is a flowchart for describing the continuation of the sequence shown in FIG. 23.
Figure 25:
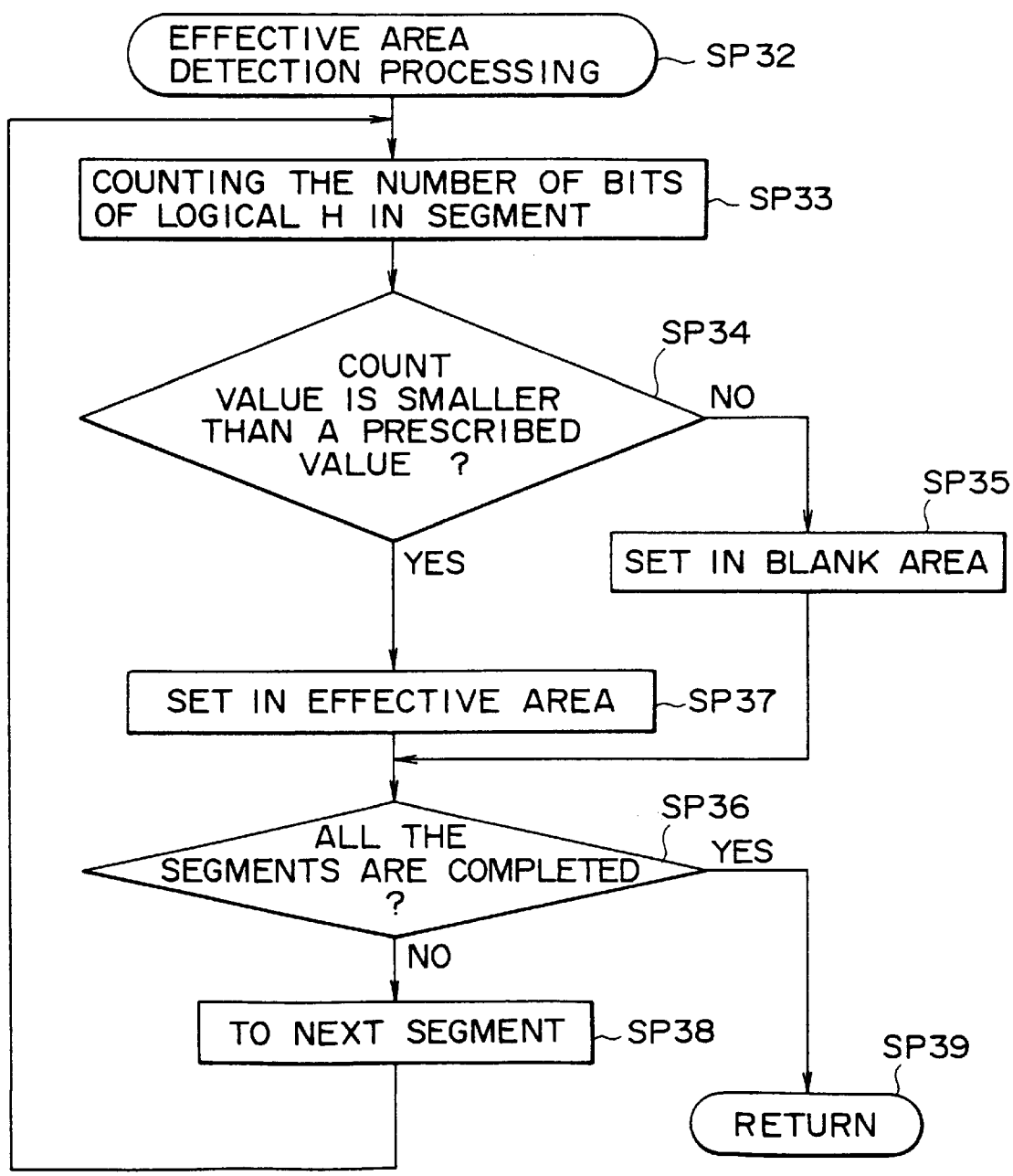
FIG. 25 is a flowchart for describing effective area detection processing shown in FIG. 23.

FIG. 23 and FIG. 24 are flowcharts for describing processing sequence of actual registration processing in the system control circuit 3. The sequence proceeds from the step SP30 to the step SP31 the system control circuit 3 executes detection processing of the effective area in the actual registration processing. As shown in FIG. 25, the sequence proceeds from the step 32 to the step SP33, the system control circuit 3 counts the number of bits of the logical H-level of segment-1, thereby, counts the number of pixels which rise in brightness level in the segment.

Subsequently, the sequence proceeds to the step SP34, the system control circuit 3 judges the count number is less than a prescribed value to judge whether the area where the brightness level is raised is less than a prescribed value in the target segment. In the optical system of the fingerprint collation device 1, in the case that a finger is placed on the base of the isosceles triangle prism 11, the illumination light is reflected totally and the corresponding brightness level is raised, and segments having the area more than a prescribed value where the brightness level rises as described herein above is judged to be blank segments where a finger is not placed.

If the No result is obtained in the step SP34, then the sequence proceeds to the step SP35, the system control circuit 3 sets these segments to the segments in blank area, thereafter the sequence proceeds to the step SP36. On the other hand, if a YES result is obtained in the step SP34, then the sequence proceeds to the step SP37, the system control circuit 3 sets the segments in the effective area, thereafter the sequence proceeds to the step SP36. He rein the effective area means the area where a finger is placed.

In the step SP36, the system control circuit 3 judges whether a series of processing on the effective area detection processing is completed on all the segments, and if the No result is obtained, then the sequence proceeds to the step SP38, the target segment to be subjected to the processing is switched to the next segment, and the sequence returns to the step SP33. On the other hand, if the series of processing is completed on all the segments, then the sequence proceeds from the step SP36 to the step SP39, and returns to the main routine.

Figure 26:
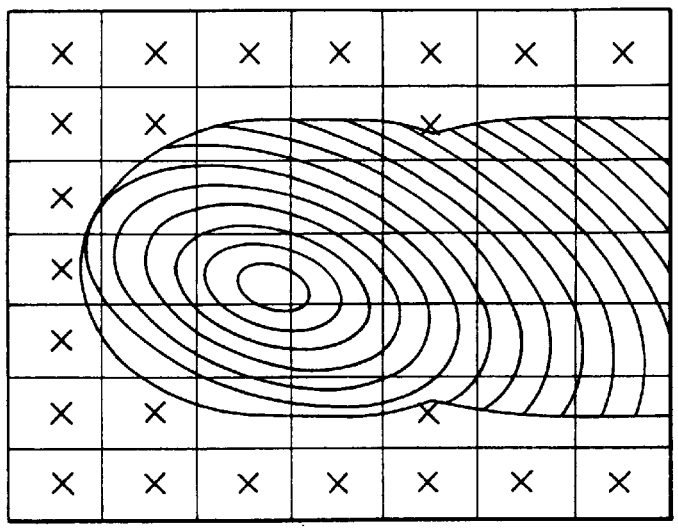
FIG. 26 is a schematic diagram for describing the effective area detection processing shown in FIG. 25.

As shown in FIG. 26, the system control circuit 3 sets the effective area which can be used for finger collation in the image pick-up result segment-by-segment, thereafter executes various processing with reference to the effective area, and thereby these various processing are simplified. In the step SP26, segments marked with × are segments in blank area.

Figure 27:
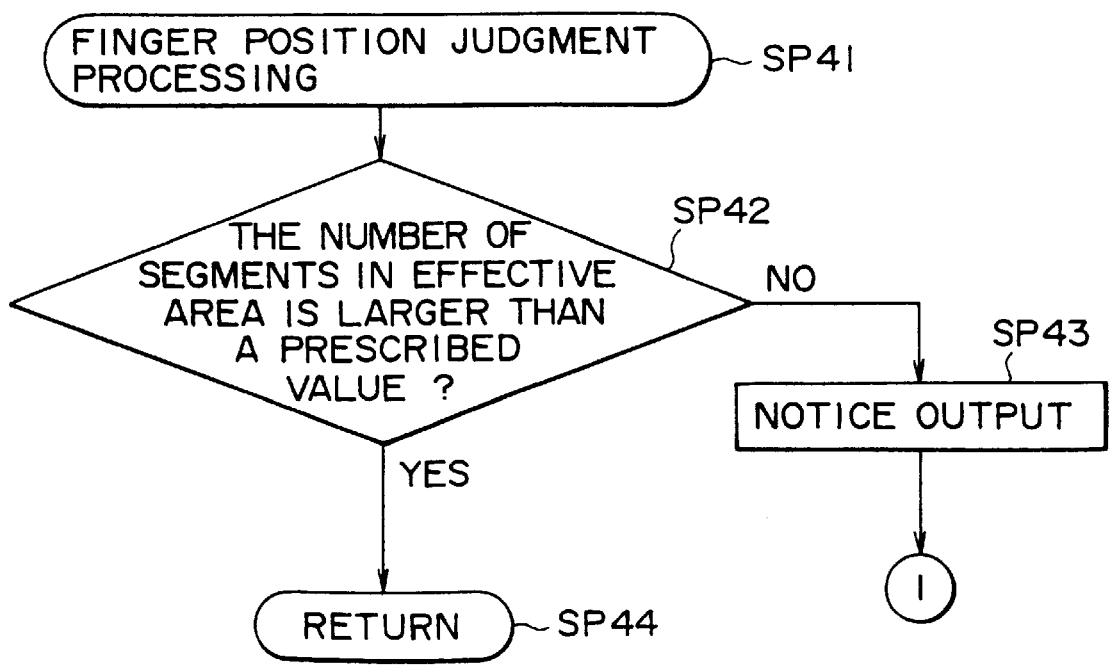
FIG. 27 is a flowchart for describing finger placing place judgment processing shown in FIG. 23.

Subsequently, the sequence proceeds to the step SP40 (refer to FIG. 23), the system control circuit executes finger position judgment processing. As shown in FIG. 27, the sequence proceeds from the step SP41 to the step SP42, the system control circuit 3 judges whether the number of segments in the effective area is less than a prescribed value. If the No result is obtained, then the sequence proceeds to the step SP43, the system control circuit 3 generates an notice for the user to replace the finger again through the display section because the place where the finger is placed is abnormal, and thereafter returns to the detection processing of the effective area.

On the other hand, if a YES result is obtained in the step SP42, the system control circuit 3 judges that the place where the finger is placed is normal, then the sequence proceeds to the step SP44, and returns to the main routine. Thus the fingerprint collation device 1 registers the fingerprint data only when a user places a finger correctly, and the fingerprint collation accuracy is improved.

Figure 28:
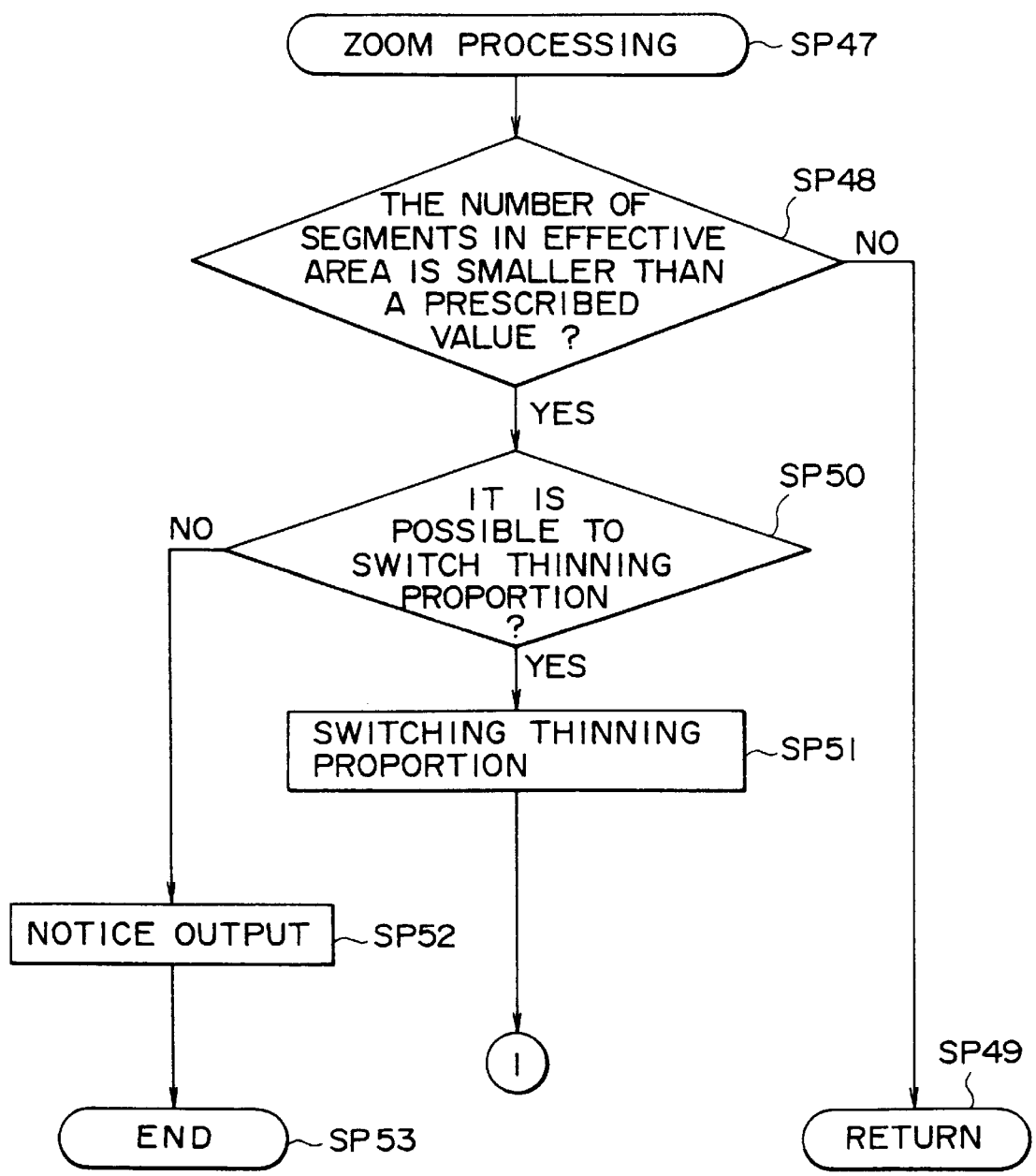
FIG. 28 is a flowchart for describing zoom processing shown in FIG. 23.

Subsequently, the system control circuit 3 executes zoom processing in the step SP46. As shown in FIG. 28, in the zoom processing, the sequence proceeds from the step SP47 to the step SP48, the system control circuit 3 judges whether the number of segments in the effective area is less than a prescribed value. If the number of segments in the effective area is more than the prescribed value, a finger is image-picked up with a size sufficient for finger collation, then the sequence proceeds from the step SP48 to the step SP49, and returns to the main routine.

On the other hand, if a YES result is obtained in the step SP48, the finger is image-picked up with a size insufficient for fingerprint collation, then the sequence proceeds to the step SP50, the system control circuit 3 judges whether the thinning proportion given by the thinning circuit 20 (refer to FIG. 2) can be reduced. If the thinning proportion can be reduced, the sequence proceeds to the step SP51, the system control circuit 3 switches the operation of the timing generator 19 to reduced the thinning proportion, and enlarges the image of the fingerprint data D1, and then returns to the effective area detection processing in the step SP31.

The system control circuit 3 executes effective area detection processing and finger position inversion processing on the enlarged fingerprint image again, then executes zoom processing. As described herein above, the fingerprint collation device 1 switches magnification of the optical system as required and performs fingerprint collation consistently.

In the case that a finger is dry, the illumination light is not reflected irregularly on the base of the isosceles triangle prism 11 (refer to FIG. 2) when the finger is placed. In such case, a No result may be obtained in the step SP50 in spite of reduced thinning proportion, and it is difficult to collate the fingerprint correctly. In such case, the sequence proceeds to the step SP52, the system control circuit 3 outputs a message for confirmation to the user, then finishes a series of fingerprint registration processing in the step SP53. As described herein above, the fingerprint collation device 1 picks up the image of fingerprint again and collates the fingerprint consistently in such unusual case.

Figure 29:
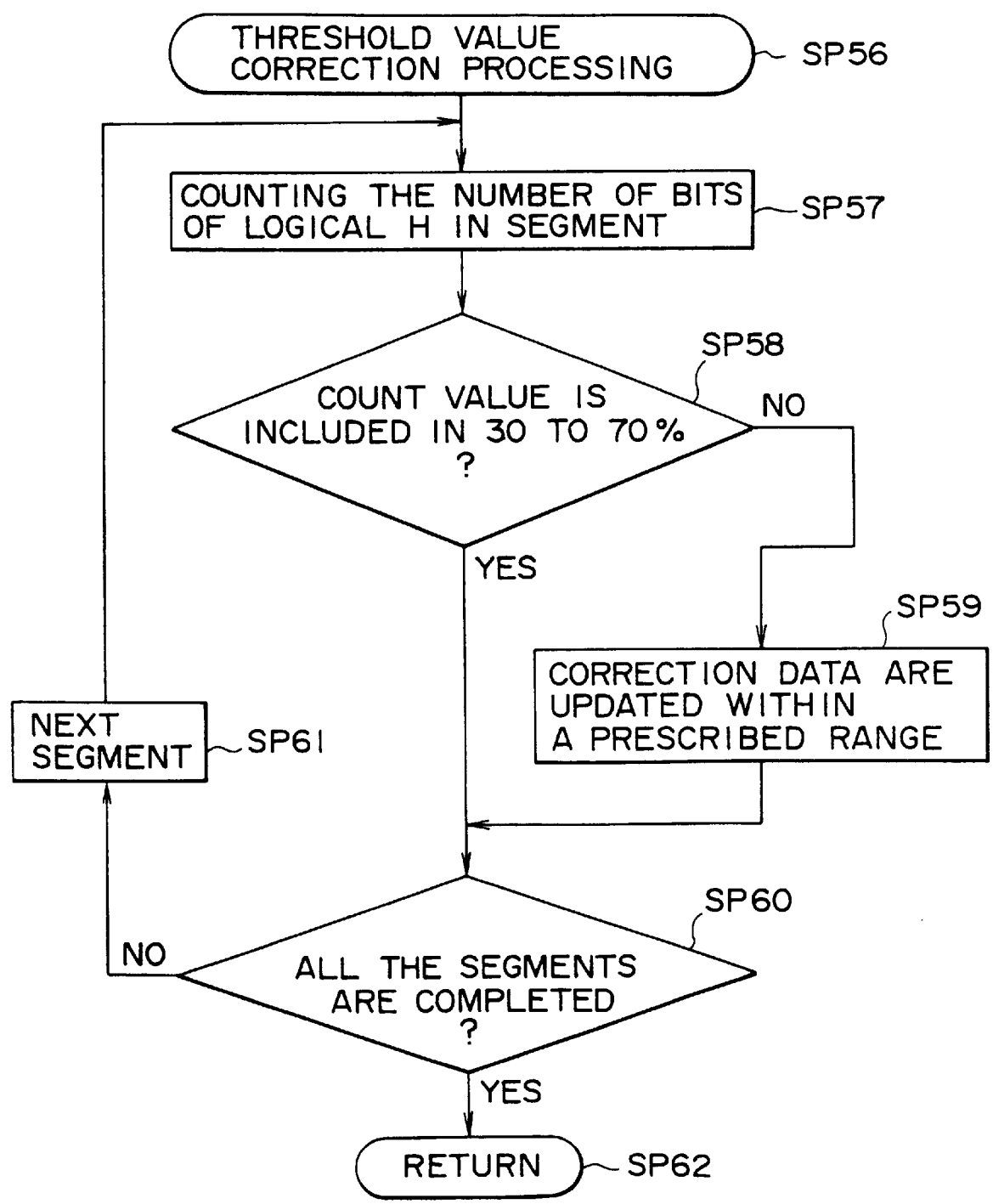
FIG. 29 is a flowchart for describing threshold value correction processing shown in FIG. 23.

Subsequently, the system control circuit 3 executes threshold value correction processing in the step SP55 (refer to FIG. 23). As shown in FIG. 29, in the threshold correction processing, the sequence proceeds from the step SP56 to the step SP57, the system control circuit 3 counts the number of bits of the logical L-level on segment-1. In this embodiment, brightness level of the corresponding pixel falls down and the bit of the corresponding fingerprint data D1 falls down to the logical L-level in the case that the illumination light is reflected irregularly on the base of the isosceles triangle prism 11, thereby the system control circuit 3 detects the area where a finger is pressed on the base of the isosceles triangle prism 11 based on the count value of the number of bits on the target segment.

Subsequently, the sequence proceeds to the step SP58, the system control circuit 3 judges whether the count value is included in the range of 30 to 70% for the number of pixels (8× 8) of the segment. If a NO result is obtained. the fingerprint image is likely strained locally, the sequence proceeds to the step SP59, the system control circuit 3 updates the correction data in the threshold value correction memory is updated within a prescribed range, and then the sequence proceeds to the step SP60. On the other hand, if a YES result is obtained in the step SP58, then the sequence proceeds directly to the step SP60.

In the step SP60, the system control circuit 3 judges whether a series of processing in the threshold value correction processing is finished for all the segments set in the effective area, and if a No result is obtained, then the sequence proceeds to the step SP61. The system control circuit 3 switches the processing target to the next segment, and the sequence returns to the step SP57. On the other hand, if a series of processing in the threshold value correction processing is completed for all the segments, the system control circuit 3 obtains a YES result in the step SP60, then the sequence proceeds to the step SP62 and returns to the main routine. Thus the fingerprint collation device 1 sets the content of the threshold value correction memory 24 as described herein before for FIG. 6 and performs fingerprint collation consistently.

Subsequently, in the step SP65 (refer to FIG. 23), the system control circuit 3 executes blackening processing. In detail, in the case that a finger is extraordinarily wet, for example, due to sweating, the illumination light is reflected irregularly on the base of the isosceles triangle prism 11 over a certain area. In such case, brightness level of pixels corresponding to the target segment remains fallen down in spite of the reference voltage REF varied within a certain range in the above-mentioned threshold value correction processing, and a blackened image is obtained. Therefore, it is difficult to collate the fingerprint on this segment.

Figure 30:
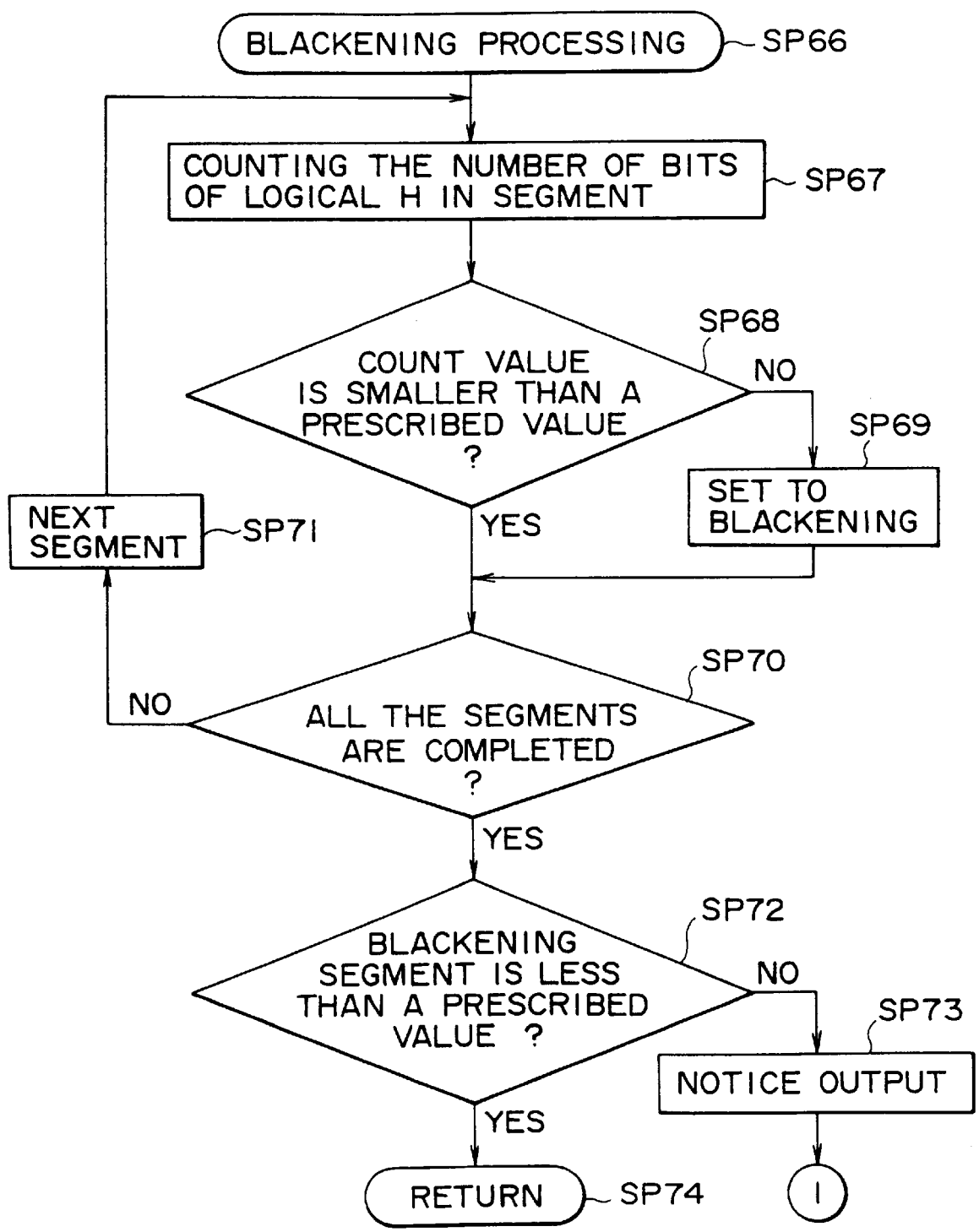
FIG. 30 is a flowchart for describing blackening processing shown in FIG. 23.

The sequence proceeds from the step SP66 to the step SP67 as shown in FIG. 30, the system control circuit 3 counts the number of bits of the logical L-level on segment-1, and then the sequence proceeds to the step SP68, and the system control circuit 3 judges whether the count value is smaller than the prescribed value.

If a No result is obtained, then the sequence proceeds to the step SP68, the system control circuit 3 sets the segment to a blackening segment, and the sequence proceeds to the step SP70. On the other hand, if a YES result is obtained in the step SP68, then the sequence proceeds directly to the step SP70. Thus the system control circuit 3 excludes the blackening segment from the processing target in the subsequent series of processing, and thus the fingerprint collation accuracy is improved.

In the step SP70, the system control circuit 3 judges whether a series of processing in the blackening processing is completed for all the segment, and if a NO result is obtained, then the sequence proceeds to the step SP71, the system control circuit 3 sets the next segment in the effective area to the processing target, and the sequence returns to the step SP67. The system control circuit 3 detects blackening segments for all the segments in the effective area as described herein above, then the sequence proceeds from the step SP70 to the step SP72.

In the step SP72, the system control circuit 3 judges whether the number of blackening segments is less than a prescribed value. If the number of blackening segments exceeds a certain value, the number of normal segments is not sufficient for fingerprint collation, in this case, the sequence proceeds from the step SP72 to the step SP73, the system control circuit 3 generates a notice to the user to place again after the finger is cleaned, and then the sequence returns to the step SP31.

On the other hand, if a YES result is obtained in the step SP72, then the sequence proceeds to the step SP74, and returns to the main routine. The fingerprint collation device 1 presses the user to try again fingerprint registration work in the case that the finger is wet, thus only high quality fingerprint image to be registered is fetched, and the fingerprint collation accuracy is improved additionally.

Figure 31:
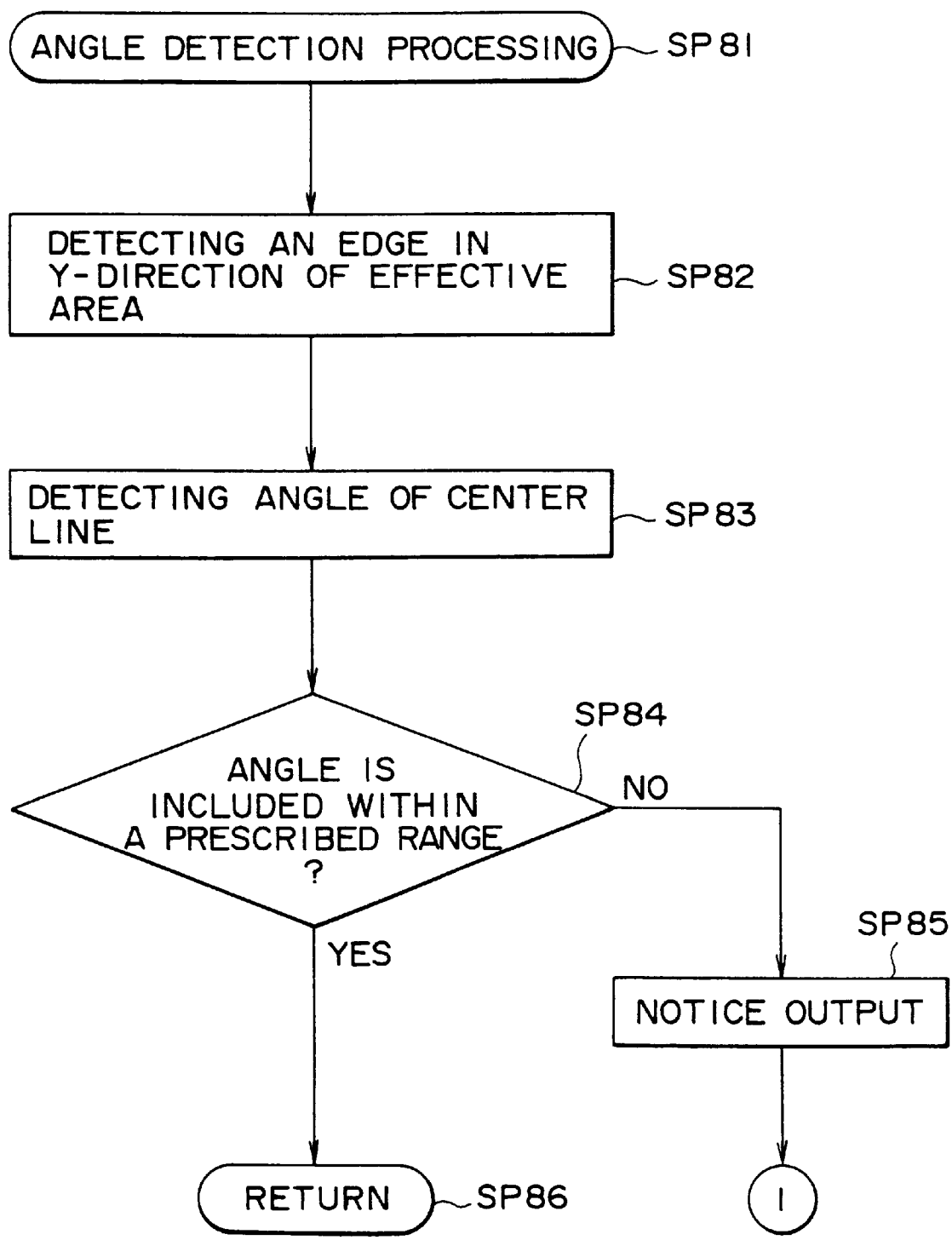
FIG. 31 is a flowchart for describing angle detection processing shown in FIG. 23.
Figure 32:
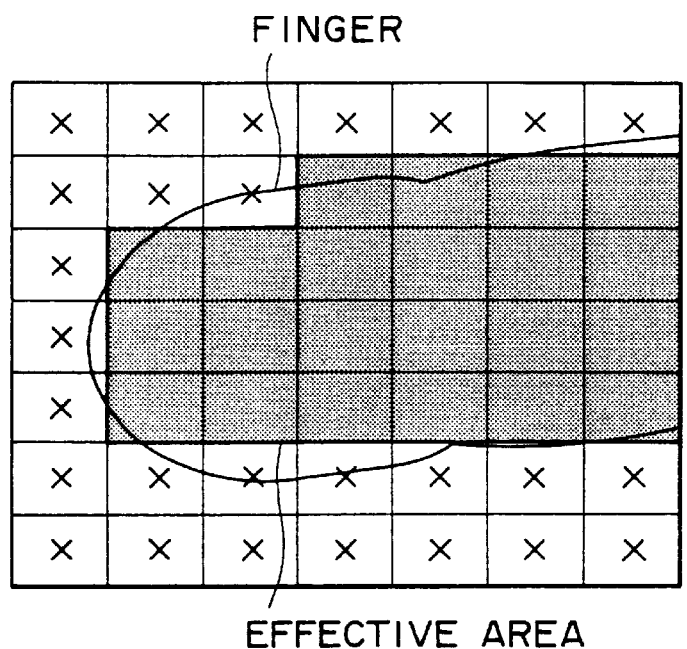
FIG. 32 is a schematic diagram for describing the subsequent processing shown in FIG. 31.
Figure 33:
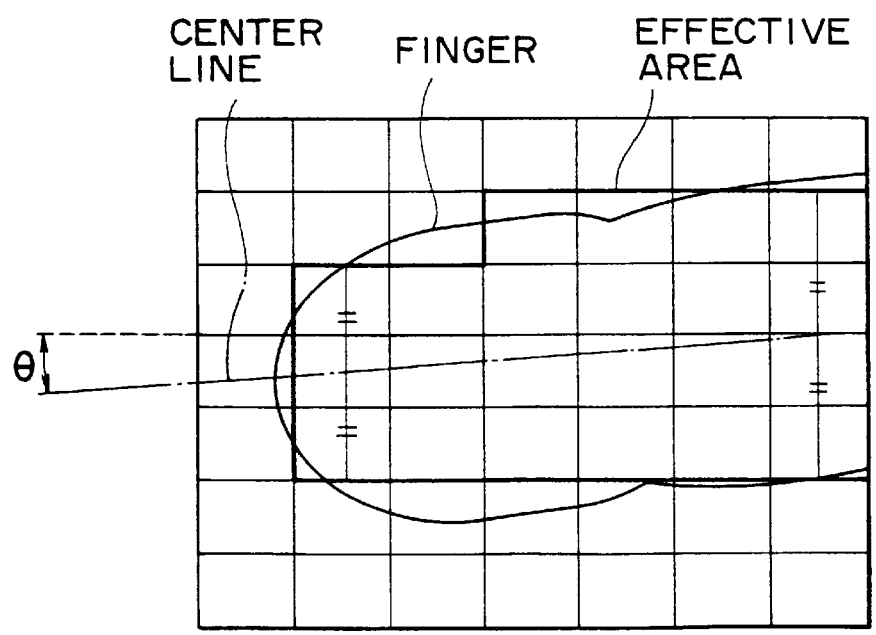
FIG. 33 is a schematic diagram for describing the continuation of the processing shown in FIG. 32.

Subsequently, the sequence proceeds to the step SP80 (refer to FIG. 23), the system control circuit 3 executes angle detection processing. In detail, a user can place a finger on the finger placing place slant. The sequence proceeds from the step SP81 to the step SP82, the system control circuit 3 detects an edge, for example, in Y-direction on the effective area in the angle detection processing shown in FIG. 31 as shown in FIG. 32. Further, the sequence proceeds to the step SP83, the system control circuit 3 detects segments which correspond vertically to the peripheral segments as shown in FIG. 33, and detects successively center coordinates of these segment pairs, and detects an inclination θ of the center line of the fingerprint image.

Subsequently, the sequence proceeds to the step SP84, the system control circuit 3 judges whether the angle θ is included within a certain range to judge whether the inclination of the finger is smaller than a certain range, and if a NO result is obtained, the sequence proceeds to the step SP85, the system control circuit 3 generates a notice to the user to place the finger correctly, then the sequence returns to the step SP31. If the inclination of the finger is included within the prescribed range, the sequence proceeds to the step SP86 and returns to the main routine.

Thus the fingerprint collation device 1 fetches the fingerprint data D1 the inclination of which is included within a certain range, and the fingerprint collation accuracy is improved.

After the previous processing is completed as described herein before, the sequence returns to the step SP88 (refer to FIG. 24), the system control circuit 3 sets the variable number n for counting the number of images to be fetched to 1, and then controls the memory control circuit 30 to store the fingerprint data D1 of one image in the fingerprint collation memory 6 in the step SP89.

Subsequently, the sequence proceeds to the step SP90, the system control circuit 3 judges whether the value of the variable n is equal to a prescribed value N, and if a NO result is obtained, then the sequence proceeds to the step SP91, the variable n is incremented by 1, and then the sequence returns to the step SP89. Thus the system control circuit 3 repeats the processing sequence of the step SP89-SP90-SP91-SP89 N times, and stores N images in the fingerprint collation memory 6.

Subsequently, the sequence proceeds to the step SP92, the system control circuit 3 judges whether the series of processing is completed on the reference voltage REF2, a NO result is obtained in this case, the sequence proceeds to the step SP93, the system control circuit 3 performs switching control of the reference voltage in the reference voltage generation circuit 15, and then the sequence returns to the step SP88.

The system control circuit 3 stores N images in the fingerprint collation memory 6 with reference voltage REF which is set by correcting the reference data stored in the light quantity correction memory 16 with the correction data in the threshold value correction memory 24, and then stores N images in the fingerprint collation memory 6 with reference to the reference voltage REF1 that is the reference voltage REF offset to the positive side by a prescribed voltage, Similarly to the case that the system control circuit 3 fetches N image with reference to the reference voltage REF merely by offsetting the reference voltage and by setting the reference voltages REF1 and REF2, the system control circuit 3 inputs N image in the fingerprint collation memory 6 which was subjected to the light quantity dispersion correction processing (refer to FIG. 20, step SP2) and threshold value correction processing in a segment unit (refer to FIG. 29).

In this reference voltage switching processing, the system control circuit 3 counts the logical level of output data outputted from the serial-parallel conversion circuit 21 over the entire effective area excluding blackening area, thereby switches the reference voltage so that the white level area in the area is included in the range of 30 to 70% to the whole area. Based on experimental results, a plurality of fingerprint image is picked up with the reference voltage switched in this range and the fingerprint is collated based on the image pick-up result as described in this embodiment, thereby the fingerprint collation accuracy is improved.

After input of N images is completed using the reference voltage REF2 as described herein above, the system control circuit 3 obtains a YES result in the step SP92, and executes registration data selection processing in the step SP93. The registration data selection processing involves a processing for judging which fingerprint data D1 should be registered in the fingerprint database 5 out of 3×N images fetched as described herein above. The system control circuit 3 registers the fingerprint data D1 selected by the registration data selection processing in the step SP94 in the fingerprint database 5, and then finishes the processing sequence in the step SP95.

The system control circuit 3 executes the series of processing successively on an index finger, middle finger, and little finger (refer to FIG. 22), and registers them in the fingerprint database 5 (refer to FIG. 15) with priority order of from the index finger, to middle finger, and little finger. When, the system control circuit 3 records magnification of the selected fingerprint data D1 (thinning proportion involved in the thinning circuit 20). The system control circuit 3 can reproduce the condition at the time when the fingerprint is registered for individual fingerprint data D1 in database when a fingerprint is collated actually, thus the fingerprint collation accuracy is improved and also the time required for collation is shortened.

(1-4-4) Registration data selection processing

Figure 34:
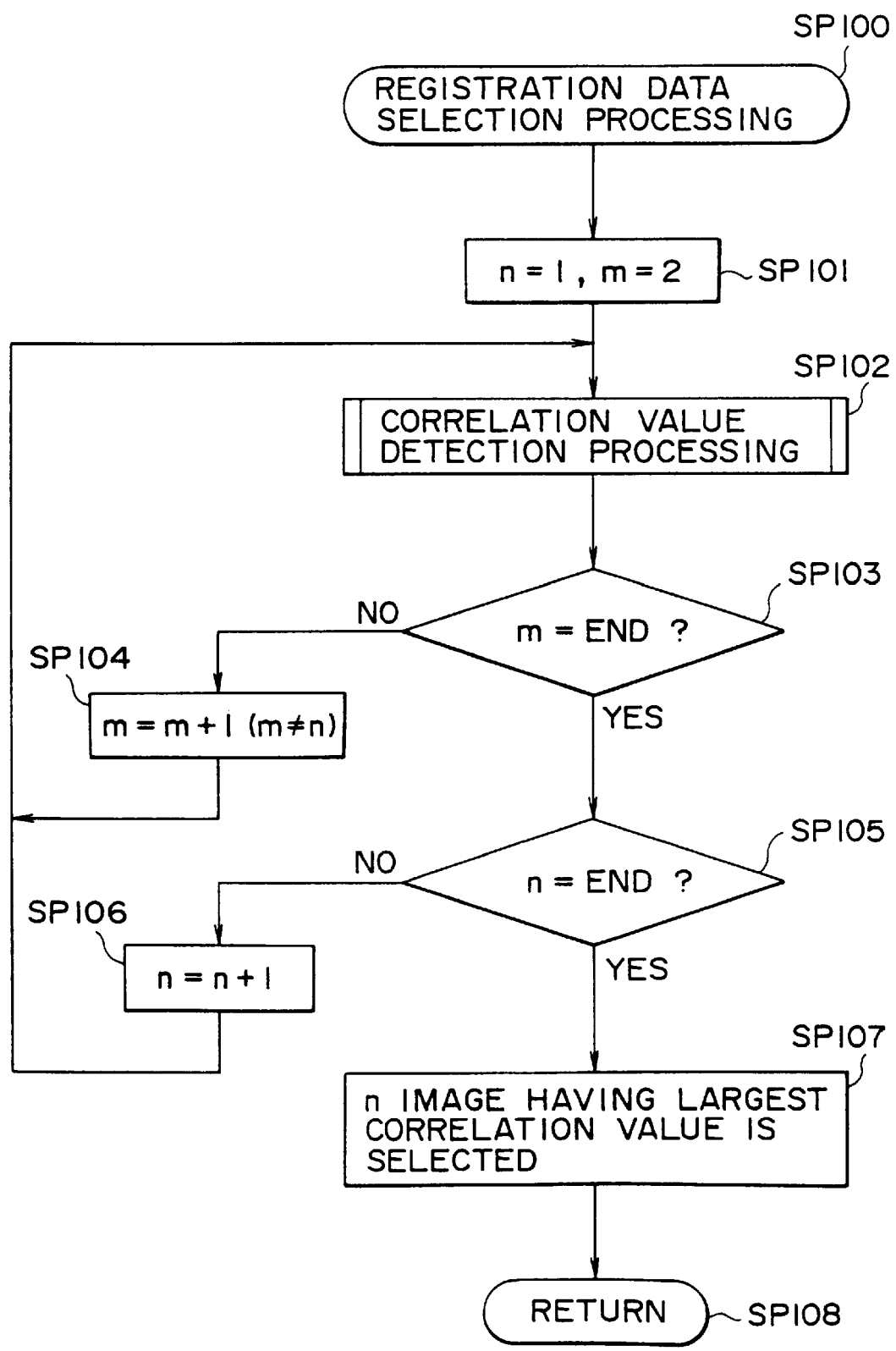
FIG. 34 is a flowchart for describing registration data selection processing shown in FIG. 24.

FIG. 34 is a flowchart for describing the above-mentioned registration data selection processing, the system control circuit 3 selects a fingerprint data D1 to be registered in the fingerprint database 5 out of fingerprint data D1 stored in the fingerprint collation memory 6 by way of this processing sequence.

The sequence proceeds from the step SP100 to the step SP101, the system control circuit 3 sets the variables n and m to the value of 1 and 2 respectively. Herein the variables n and m are variables for specifying fingerprint data D1 respectively. The system control circuit 3 detects successively the correlation value between fingerprint data specified by the variable m on the fingerprint data D1 specified by the variable n. Further the system control circuit 3 detects the maximum correlation value out of the correlation value detected as described herein above, and sets the fingerprint data D1 with the corresponding variable n as the fingerprint data D1 to be the registration target.

The system control circuit 3 executes correlation value detection processing in the subsequent step SP102 to detect the correlation value corresponding to the fingerprint data D1 with the variable m of the fingerprint data D1 with the variable n. Further, the sequence proceeds to the step SP103, the system control circuit 3 judges whether all the fingerprint data D1 which are fetched in the fingerprint collation memory 6 is specified with the variable m, and if NO result is obtained, the sequence proceeds to the step SP104, and the system control circuit 3 increases the variable m, then the sequence returns to the step SP102.

The system control circuit 3 switches successively the variable m and detects successively the correlation value between the one fingerprint data D1 and the other fingerprint data D1 specified with the variable n.

On the other hand, if a YES result is obtained in the step SP103, then the sequence proceeds to the step SP105, the system control circuit 3 judges whether all the fingerprint data D1 fetched in the fingerprint collation memory 6 are specified with the variable n. If a NO result is obtained, then the sequence proceeds to the step SP106, the system control circuit 3 increases the variable n and initializes the variable m to the value of 1, and the sequence returns to the step SP102.

Thus the system control circuit 3 detects the correlation value of the fingerprint data D1 with the variable n on all the combination between fingerprint data D1 fetched in the fingerprint collation memory 6.

After the correlation value detection processing is executed on all the combinations, the system control circuit 3 obtains a YES result in the step SP105, then the sequence proceeds to the step SP107, the system control circuit 3 selects the fingerprint data D1 with the maximum correlation value with the variable n as a fingerprint data for registration target, and then the sequence proceeds to the step SP108 to finish this processing sequence.

In the fingerprint collation device 1, the image quality of the fingerprint image is judged with reference to the correlation value, and the fingerprint data D1 that is most suitable for fingerprint collation is registered in the fingerprint database 5. In detail, in the fingerprint collation device 1, the fingerprint is collated based on the collation rate described hereinafter detected by way of the same procedure as used for detecting the correlation value. The system control circuit 3 executes fingerprint collation processing between the residual fingerprint images on the assumption that a plurality of fingerprint images fetched in the fingerprint collation memory 6 is registered successively in the fingerprint database 5, thereby selects the fingerprint image that is suitable for fingerprint collation by way of the judgment procedure which is suitable for practical fingerprint collation, and thus the fingerprint collation accuracy is improved.

Figure 35:
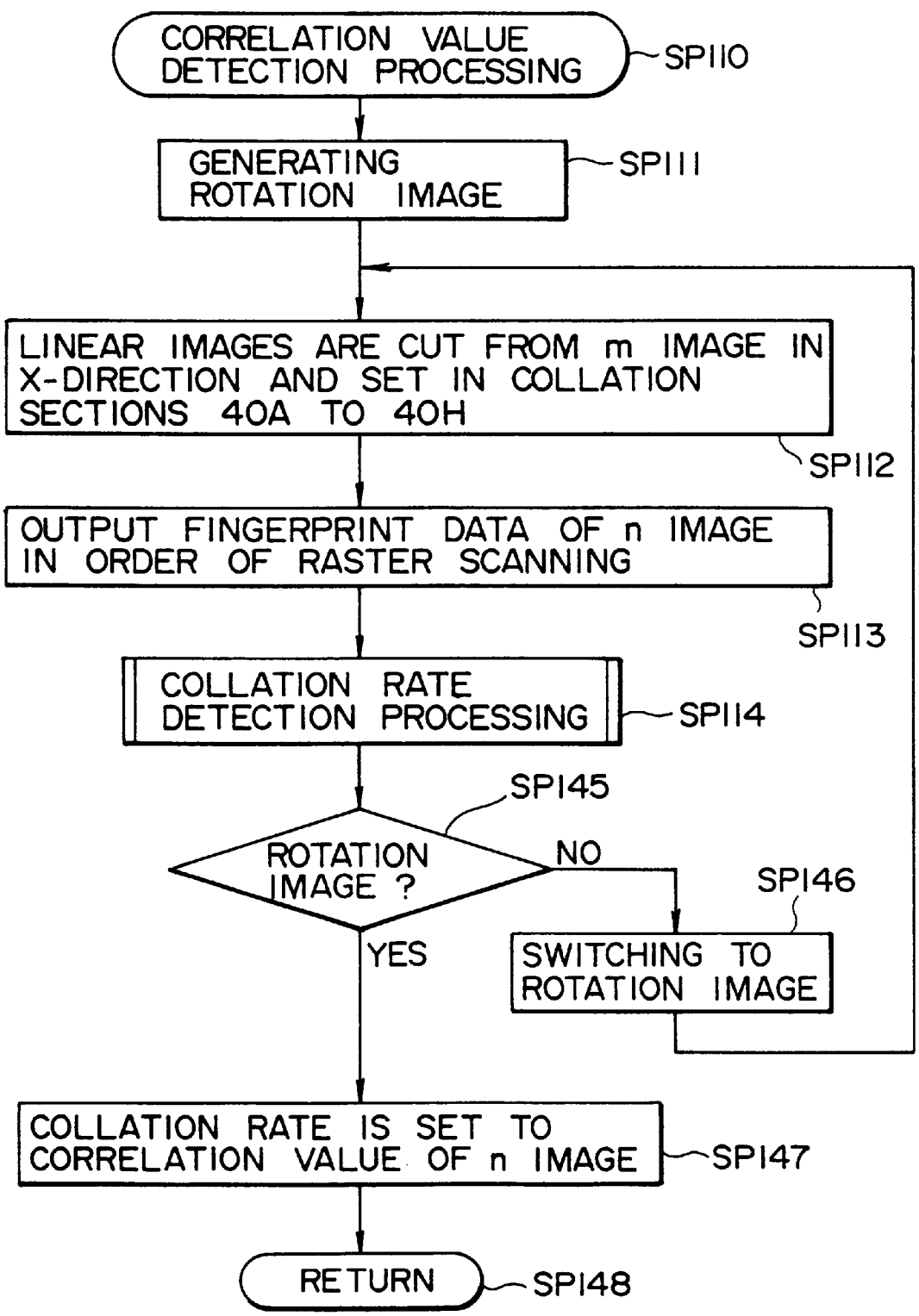
FIG. 35 is a flowchart for describing correlation value detection processing shown in FIG. 34.

FIG. 35 is a flowchart for describing correlation value detection processing on the fingerprint data D1 with the variable m of the fingerprint data D1 with the variable n. In the processing sequence, the sequence proceeds from the step SP110 to the step SP111, the system control circuit 3 transmits the fingerprint data D1 specified by the variables n and m to the image rotation circuit 31 respectively segment-by-segment, and stores the fingerprint data outputted from the image rotation circuit 31 in the rotation image memory 6B. Thereby the system control circuit 3 rotates processing target images 90 degrees respectively in the step SP111 (refer to FIG. 10 and FIG. 11).

Subsequently, the sequence proceeds to the step SP112, the system control circuit 3 selects intermittently the 8 byte image data which continues in the horizontal direction from the top side of an image of the fingerprint data D1 successively out of the fingerprint data D1 specified by the variable m. Further the selected fingerprint data are outputted respectively to the collation sections 40A to 40B, and stored in the latch circuit 41 of the respective collation sections 40A to 40B (refer to FIG. 17). Thereby the system control circuit 3 cuts linear images from the image of the fingerprint data D1 and sets them in the collation sections 40A to 40H.

When, the system control circuit 3 executes a prescribed judgment sequence to set the fingerprint data D1 so as not to cut the linear image of the blackening segments described for FIG. 30 herein before, and thereby deterioration of the fingerprint collation accuracy is avoided efficiently. The system control circuit 3 sets the area that is the area where the linear image is cut (namely the frame) with reference to the effective area detected previously.

The number of switching of the logical level is counted on the fingerprint data to be cut linearly, the portion where the count value is smaller than a prescribed value is excluded from the target. Thereby, the number of linear cut across a fingerprint is more than a prescribed value on the portion where the image is cut linearly, and sufficient information useful for fingerprint collation is included in the cut area, thus the fingerprint collation accuracy is improved.

In connection with the above-mentioned operation, the system control circuit 3 sets a frame for cutting linear images in the effective area at the position with deviation of prescribed some segments from the tip side of the effective area of the tip side portion of a finger to the foot side of the finger, and sets the frame with reference to the center of the effective area in the vertical direction.

Subsequently the sequence proceeds to the step SP113, the system control circuit 3 transmits successively the fingerprint data to the collation sections 40A to 40H so that the fingerprint data D1 specified with the variable n is arranged continuous in the order of the raster scanning. The system control circuit 3 scans the linear image in the order of the raster scanning on the image specified with the variable n in the respective collation sections 40A to 40H, and detects the number of bits which is coincident between the linear images and the image overlapped with the linear images with the variable n with aid of the counter 45 of the respective collation sections 40A to 40H (refer to FIG. 16).

Further, the system control circuit 3 records the position, where the count value is similar to the coordinate value which rises from the threshold value set in the resister 46, that is, where the overlapped two images are very similar each other, in the coordinate group memory 49 according to the coordinate value of the fingerprint data supplied in the order of the raster scanning.

When, the system control circuit 3 switches operation of the comparison circuit 44 so that the comparison circuit 47 outputs comparison result based on a certain logical level on bits corresponding to the fingerprint data which is judged to be blackening area, namely ineffective area, and switches the threshold value to be set in the register 46 correspondingly to the switching of operation of the comparison circuit 44, and subsequently changes the criterion in the comparison circuit 47. Thus the system control circuit 3 performs the processing with a mask on the blackening area, namely ineffective area.

Figure 36:
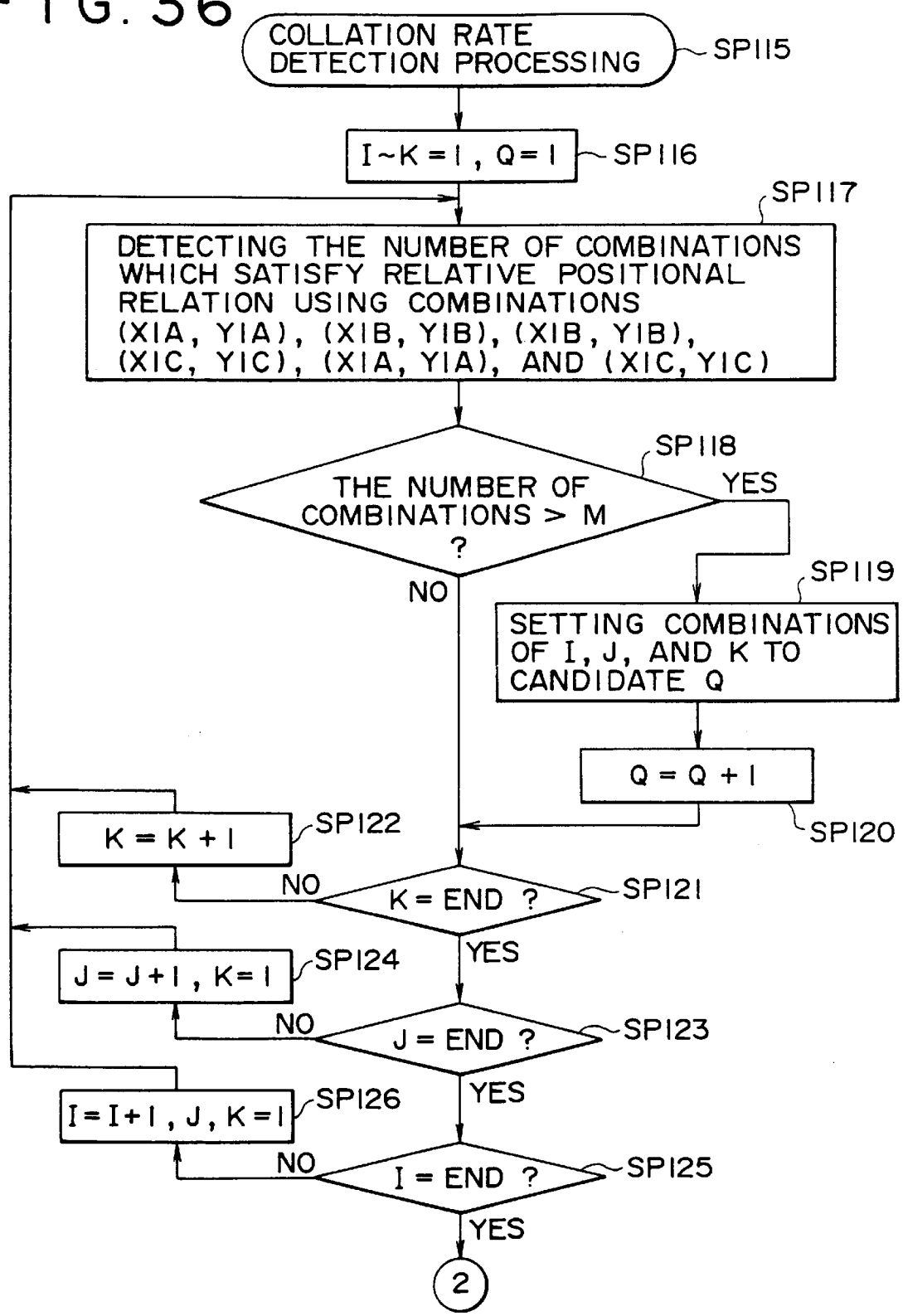
FIG. 36 is a flowchart for describing the continuation of the processing shown in FIG. 35.
Figure 37:
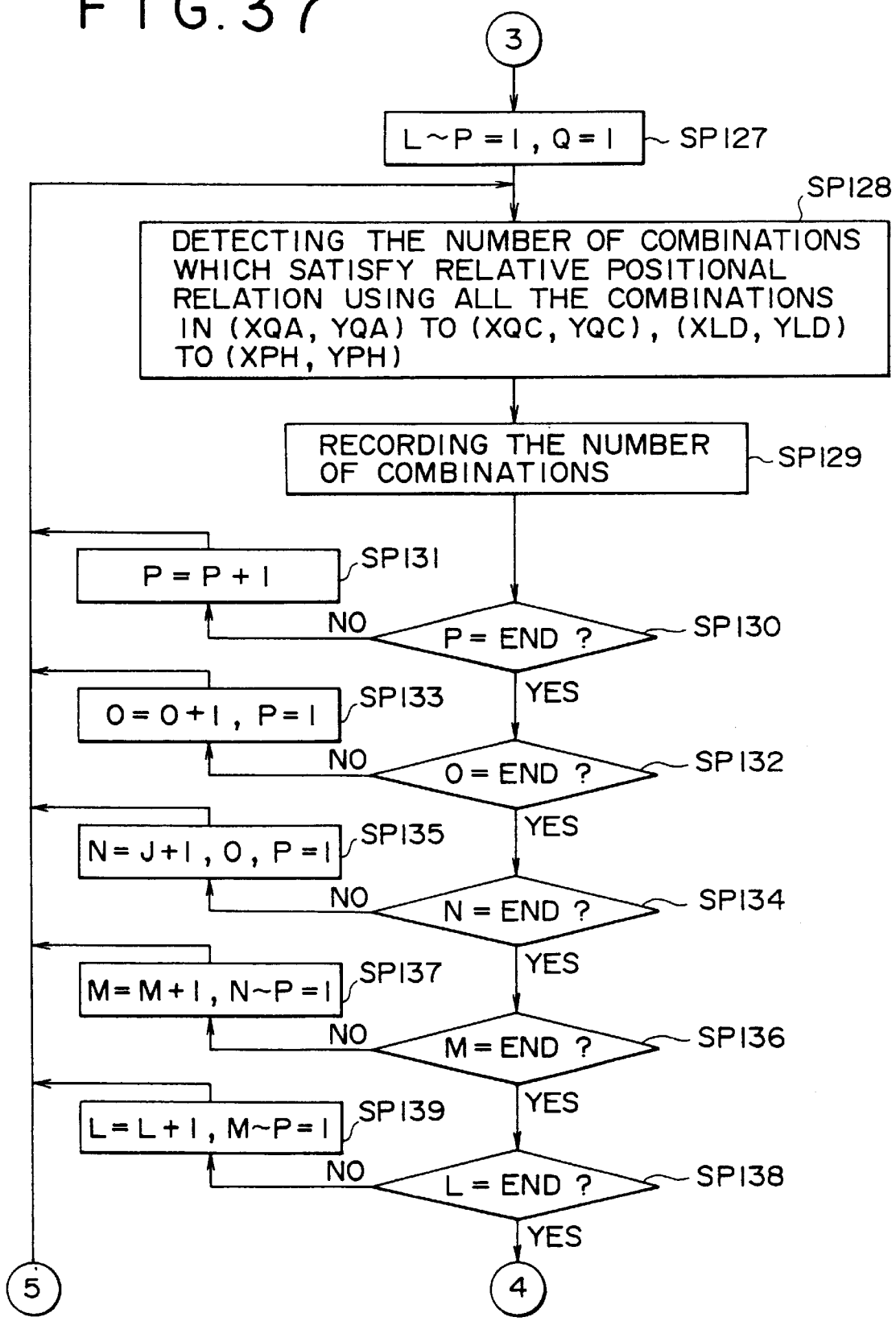
FIG. 37 is a flowchart for describing the continuation of the processing shown in FIG. 36.
Figure 38:
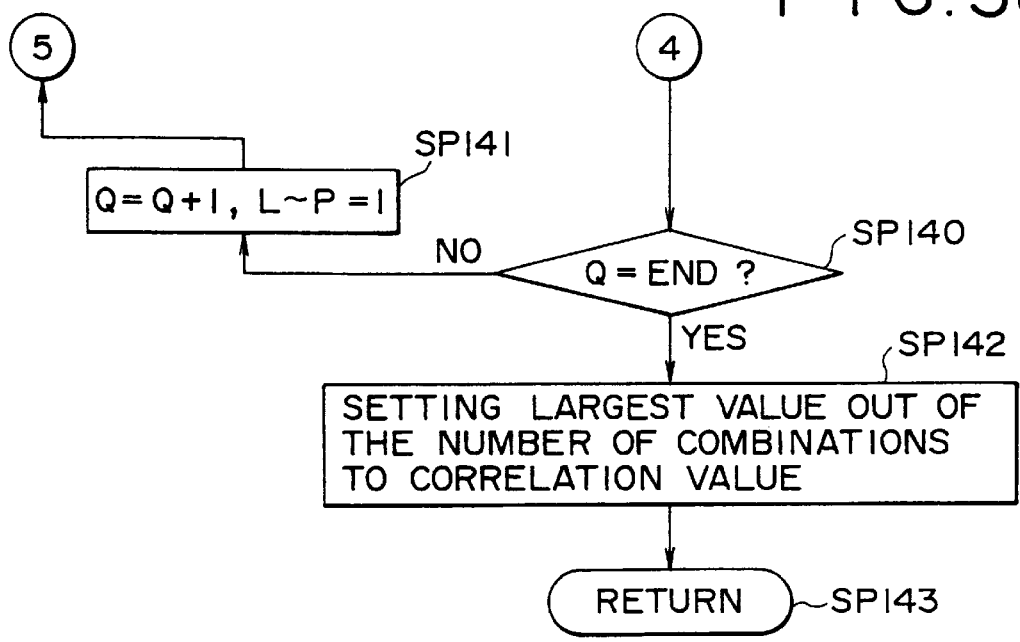
FIG. 38 is a flowchart for describing the continuation of the processing shown in FIG. 37.

The sequence proceeds to the step SP114, the system control circuit 3 executes collation rate detection processing. As shown in FIG. 36, FIG. 37, and FIG. 38, in the collation rate detection processing, the sequence proceeds from the step SP115 to the step SP116, the system control circuit 3 sets the variables I, J, K, and Q to the value of 1. Herein, the variables I, J, and K are variables for specifying the respective coordinate values of the collation sections 40A, 40B, and 40C fetched in the coordinate group memory 49, and the variable Q is the variable for specifying the combination of these coordinate values detected in the partial collation rate calculation processing.

Subsequently, the sequence proceeds to the step SP117, the system control circuit 3 sets three combinations comprising a combination of a coordinate value (XIA, YIA) and a coordinate value (XJB, YJB), a combination of a coordinate value (XJB, YJB) and a coordinate value (XKC, YKC), and a combination of a coordinate value (XIA, YIA) and a coordinate value (XKC, YKC) for the three coordinate values (XIA, YIA), (XJB, YJB), and (XKC, YKC) specified with the variables I, J, and K, and detects the number of combinations which satisfy the relative positional relation of the fingerprint data D1 which are set in the latch circuit 41 of the respective collation sections 40A to 40C, namely the number of combinations which satisfy the relative positional relation of the linear images which are cut in the step SP 112.

Subsequently, the sequence proceeds to the step SP118, the system control circuit 3 judges whether the number of combination detected as described herein above is more than a prescribed value M. If a YES result is obtained, the sequence proceeds to the step SP119, the system control circuit 3 sets the combinations of I, J, and K as the candidate to be specified with the variable Q, and increases the variable Q in the step SP120, and the sequence proceeds to the step SP121. On the other hand, if a NO result is obtained in the step SP118, then the sequence proceeds directly from the step SP118 to the step SP121.

In the step SP121, the system control circuit 3 judges whether the coordinate value specified with the variable K is the coordinate value that is detected finally by the collation section 40C, and if a NO result is obtained, then the sequence proceeds to the step SP122, the system control circuit 3 increases the variable K, and the sequence reruns to the step SP117. Thereby the system control circuit 3 switches successively the variable I correspondingly to the coordinate values (XIA, YIA) and (XJB, YJB), and detects successively candidates specified with the variable Q based on the number of combinations which satisfy the relative positional relation of the linear images out of combinations of these coordinate values (XIA, YIA), (XJB, YJB), and (XKC, YKC).

When the operation comes to the final coordinate value after successive switching of the variable K, the system control circuit 3 obtains a YES result in the step SP121, then the sequence proceeds to the step SP123. The system control circuit 3 judges whether the coordinate value specified with the variable J is the final coordinate value in the same manner as operated for the variable J, if a NO result is obtained, then the sequence proceeds to the step SP124, the system control circuit 3 increases the variable J and sets the variable K to the initial value of 1, then the sequence returns to the step SP117.

In the step SP123, if the system control circuit 3 obtains YES result by repeating the processing sequence with increasing the variable J as described herein above, then the sequence proceeds to the step SP125, and the system control circuit 3 judges whether the coordinate value specified with the variable I is the final coordinate, and if a NO result is obtained, then the sequence proceeds to the step SP126, the system control circuit 3 increases the variable I and sets the variables J and K to the initial value of 1, then the sequence returns to the step SP117.

The system control circuit 3 excludes combinations which does not satisfy the relative positional relation the coordinate values obtained by scanning successively the linear images with aid of the partial combinations. Thereby in the fingerprint collation device 1, combinations of the detected coordinate values which happens to have high similarity are excluded from the candidate, and the residual combinations are held as the candidate specified with the variable Q.

The system control circuit 3 detects combinations which satisfy the relative positional relation between the candidates selected as described herein above and the coordinate values of the residual collation sections 40D to 40H in the same manner as operated herein above, and detects the collation rate thereby. The system control circuit 3 sets the variables Q, L, M, N, O, and P to the initial value of 1 in the step SP127 (refer to FIG. 37). Herein, the variables L, M, N, O, and P are variables for specifying the coordinate values stored respectively in the coordinate group memory 49 for the collation sections 40D to 40H.

Subsequently, the sequence proceeds to the step SP128, and the system control circuit 3 detects the number of combinations which satisfy the relative positional relation of the linear image out of the coordinate values (XQA, YQA), (XQB, YQB), (XQC, YQC), (XLD, YLD), (XME, YME), (XNF, YNF), (XOG, YOG), and (XPH, YPH) specified with the variables Q, L, M, N, O, and P.

Subsequently, the sequence proceeds to the step SP129, the system control circuit 3 records the number of combinations, and then the sequence proceeds to the step SP130. The system control circuit 3 judges whether the coordinate value specified with the variable P is the final coordinate value, and if a NO result is obtained, the system control circuit 3 increases the variable P in the step SP131, and the sequence returns to the step SP127.

On the other hand, if a YES result is obtained in the step SP130 during repetition of the processing sequence, then the sequence proceeds from the step SP130 to the step SP132, the system control circuit 3 judges whether the coordinate value specified with the variable O is the final coordinate value, and if a NO result is obtained, then the sequence proceeds to the step SP133, the system control circuit 3 increases the variable O and sets the variable P to the initial value of 1, and the sequence returns to the step SP127.

On the other hand, if a YES result is obtained in the step SP132 during the repetition of this processing, then the sequence proceeds from the step SP132 to the step SP134, the system control circuit 3 judges whether the coordinate value specified with the variable N is the final coordinate, if a NO result is obtained, then the sequence proceeds to the step SP135, the system control circuit 3 increases the variable N and sets the variables P and O to the initial value of 1, and the sequence returns to the step SP127. On the other hand, if a YES result is obtained in the step SP134, then the sequence proceeds from the step SP134 to the step SP136, the system control circuit 3 judges whether the coordinate value specified with the variable M is the final coordinate, if a NO result is obtained, the sequence proceeds to the step SP137, the system control circuit 3 increases the variable M and sets the variables P, O, and N to the initial value of 1, and the sequence returns to the step SP127.

Further similarly, if a YES result is obtained in the step SP136, then the sequence proceeds from the step SP136 to the step SP138, the system control circuit 3 judges whether the coordinate value specified with the variable L is the final coordinate value, and if a NO result is obtained, then the sequence proceeds to the step SP137, the system control circuit 3 increases the variable L and sets the variables P, O, N, and M to the initial value of 1, and the sequence returns to the step SP127. On the other hand, if a YES result is obtained in the step SP138, then the sequence proceeds from the step SP138 to the step SP140 (refer to FIG. 38), the system control circuit 3 judges whether the coordinate value specified with the variable Q is the final coordinate value, and if a NO result is obtained, then the sequence proceeds to the step SP142, the system control circuit 3 increases the variable Q and sets the variables P, O, M, N, and L to the initial value of 1, and the sequence returns to the step SP127.

The system control circuit 3 detects the number of combinations which satisfy the relative positional relation for respective combinations of these coordinate values, when, executes this processing after selecting candidates previously by excluding combinations which does not satisfy the relative positional relation with aid of the partial combinations, thus the time required for processing is shortened additionally. In the case that a coordinate values are detected for 8 series of coordinate values, the number of combinations of these coordinate values is $a^8$.

On the other hand, the number of combinations in the previous processing is $a^3$, and in the case that the number of candidate combinations is reduced to the value smaller than a, for example, 1, the number of residual combinations is $a^5$, after all, $a^5$ is extremely larger than $a^3$, the number of combinations to be subjected to processing is reduced by about $a^3$. For example, assuming a=10, it is found that the time required for processing is reduced by a factor of approximately 1000. Therefore the fingerprint collation device 1 can executes fingerprint registration processing within a short time.

After the number of combinations which satisfy the relative positional relation is detected for the respective combinations as described herein above, the system control circuit 3 detects the number of combinations with the largest value in the step SP142, sets the value of the number of combinations to the collation rate in the subsequent step SP143, and the sequence returns from the step SP144 to the main routine. Thus in this processing, in the case that the coordinate value which satisfies the relative positional relation for all the 8 linear images is recorded in the coordinate group memory 49 as for the relative positional relation when 8 linear images are cut, the system control circuit 3 detects simplified 8/8 collation rate.

Thus, the system control circuit 3 picks up a plurality of fingerprint images of the same person, cuts image-1 linearly, performs raster scanning on other images, in this condition, judges totally the degree of similarity of overlapped portions, and detects the collation rate.

Subsequently, the sequence proceeds to the step SP145 (refer to FIG. 35), the system control circuit 3 judges whether the collation rate is detected on the rotation image generated in the step SP111, and if a NO result is obtained, then the sequence proceeds to the step SP146, the system control circuit 3 switches the processing target to the rotation image, then the sequence returns to the step SP112, and repeats the same processing.

Figure 39:
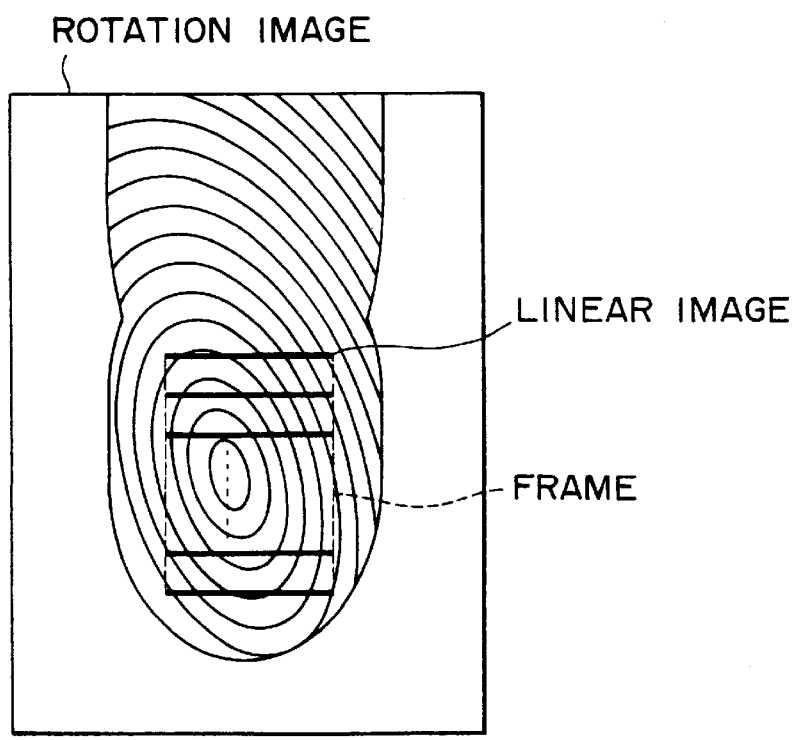
FIG. 39 is a schematic diagram for describing linear image cutting from a rotation image.
Figure 40:
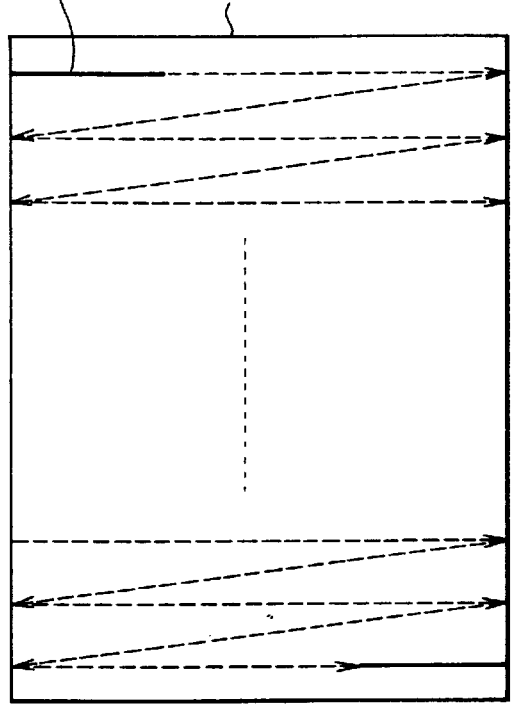
FIG. 40 is a schematic diagram for describing the supply of a fingerprint data to the linear image of a rotation image.

The system control circuit 3 cuts linear images in the horizontal direction from fingerprint data-1 stored in the rotation image memory 6B as shown in FIG. 39 and FIG. 40, and sets these cut fingerprint data of the cut images in the collation sections 40A to 40H. The system control circuit 3 outputs the corresponding fingerprint data D1 in the order of raster scanning simultaneously in parallel to the collation sections 40A to 40H, performs raster scanning of the previous linear images on other images, and judges totally the degree of similarity of overlapped portions to detect the collation rate.

In this processing, the system control circuit 3 cuts linear images from the fingerprint image inputted from the fingerprint data input section 4 in approximately horizontal direction and vertical direction, detects the degree of similarity to an image of other fingerprint data in the horizontal and vertical direction, thus combines the data processing of the one-dimensional image which is relatively easy to be subjected to processing, and judges the degree of two-dimensional similarity.

After the collation rate is detected on the rotation image as described herein above, the system control circuit 3 obtains a YES results in the step SP145, then the sequence proceeds to the step SP147, the system control circuit 3 sets the collation rate having a value larger than that of two collation rates to the correlation value of n image with collation target of the m image, then the sequence returns from the step SP148 to the main routine.

Thus, the system control circuit 3 calculates correlation values for all the combinations between a plurality of fingerprint images which are picked up from the same person, selects the fingerprint data with the highest correlation value, and registers selectively the fingerprint image that is most useful for fingerprint collation. Thus the fingerprint collation accuracy of the fingerprint collation device 1 is improved.

(1-4-5) Fingerprint collation processing

When a user operates the key input section 2 to input a request for fingerprint collation in the condition that the fingerprint data D1 is registered in the fingerprint database 5 as described herein above, the system control circuit 3 executes processing sequence shown in FIG. 41 and FIG. 42 and performs fingerprint collation.

In detail, the sequence proceeds from the step SP150 to the step SP151, the system control circuit 3 displays a message through the display section 8 (refer to FIG. 1) to press a user to place a finger on the finger placing place. Subsequently, the sequence proceeds to the step SP152, the system control circuit 3 judges whether a finger is placed on the finger placing place, and if NO result is obtained, the sequence repeats the step SP152.

In the step SP152, the system control circuit 3 inputs the output data of the serial-parallel conversion circuit 21 through the data bus BUS (refer to FIG. 2), counts the logical level of the output data on the prescribed segments, and detects thereby whether a finger is placed through the output data. Herein in the count processing, the number of bits of logical L-level is counted on a plurality of prescribed segments corresponding to the approximately middle portion of the finger placing place, and the processing is performed by judging whether the count value exceeds a prescribed value. Thus the system control circuit 3 starts fingerprint collation processing with aid of image pick-up result as a trigger, the operation of the fingerprint collation device 1 is simplified and the convenience for use is improved.

If a YES result is obtained in the step SP152, the sequence proceeds to the step SP153, the system control circuit 3 judges whether the pulsatory wave detection section 22 detects biological reaction. If a NO result is obtained, then the sequence proceeds to the step SP154 and this processing sequence is finished, on the other hand, if a YES result is obtained in the step SP153, then the sequence proceeds to the step SP155.

In the step SP155, the system control circuit 3 inputs collation target fingerprint data D2 outputted from the fingerprint data input section 4 to the fingerprint collation memory 6. Thereby the system control circuit 3 performs fingerprint collation only when biological reaction of a finger is detected, and the security is improved.

Subsequently, the sequence proceeds to the step SP156, the system control circuit 3 executes comparison judgment processing. In this embodiment, the system control circuit 3 judges with reference to the user ID inputted through the key input section 2 whether the registered fingerprint data D1 corresponding to the user ID is coincident with the fingerprint data D2 inputted from the fingerprint data input section 4. Further in the case that a plurality of fingerprint data D1 is registered for the same user ID in the fingerprint database 5, the system control circuit 3 judges the coincidence using the fingerprint data D1 having the highest priority.

Subsequently, the sequence proceeds to the step SP157, the system control circuit 3 judges whether judgment result of coincidence is obtained, and if a YES result is obtained, then the sequence proceeds to the step SP158, the system control circuit 3 outputs the judgment result of coincidence, and the sequence proceeds to the step SP159. The system control circuit 3 records the collation rate in the fingerprint database 5 in the step SP159.

Subsequently, the sequence proceeds to the step SP160 (refer to FIG. 42), the system control circuit 3 confirms the change of collation rate recorded in the fingerprint database 5. In the case that the collation rate decreases gradually beyond a certain value, the system control circuit 3 judges that the collation rate changes beyond the allowable range, the sequence proceeds to the step SP161, the system control circuit 3 presses a user to register an updated fingerprint data, and finishes this processing sequence in the step SP162.

In detail, in this embodiment, the degree of similarity is measured between the fingerprint data D2 of a collation target and the fingerprint data D1 registered in the fingerprint database 5, and the degree of similarity is represented by the collation rate. Coincidence between a fingerprint of the fingerprint data D2 and a fingerprint of the fingerprint data D1 is judged with reference to the judgment whether the collation rate exceeds a certain reference value.

Figure 43:
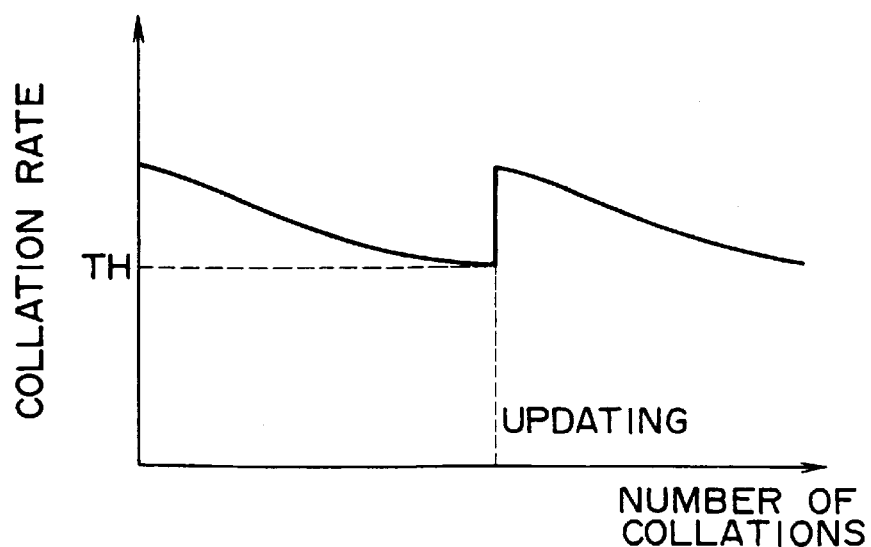
FIG. 43 is a graph for describing the gradual falling down of the collation rate.

However, in the case of a child, a finger becomes large as the child grows, in such case, the collation rate decreases gradually as shown in FIG. 43 as the finger grows larger. In this embodiment, when the collation rate decreases gradually beyond a certain value TH, the fingerprint collation device 1 is set so that the user registers the fingerprint data D2 again, thereby the collation rate is resumed for performing fingerprint collation consistently.

In the case that such change in the collation rate is not observed, a YES result is obtained in the step SP160 in the system control circuit 3, and the sequence proceeds directly from the step SP160 to the step SP162 to finish this processing sequence.

On the other hand, if a NO result is obtained in the step SP157 (refer to FIG. 41), the sequence proceeds to the step SP163, the system control circuit 3 judges whether the frame is moved already. In this embodiment, as shown in FIG. 44, the system control circuit 3 cuts linear images in a prescribed frame on the fingerprint image of the fingerprint data D1 that is the collation target for detecting the collation rate. If the system control circuit 3 does not obtain a result of coincidence in comparison judgment processing in the step SP156, then the sequence proceeds from the step SP163 to the step SP164, the system control circuit 3 moves the frame. Further, the sequence returns from the step SP164 to the step SP156, the system control circuit 3 executes comparison judgment processing with reference to the moved frame.

Thus the system control circuit 3 performs fingerprint collation processing so as to obtain the judgment result of coincidence consistently in the case that a user who is registered in the fingerprint database 5 collates the fingerprint, thereby the fingerprint collation accuracy is improved.

Figure 42:
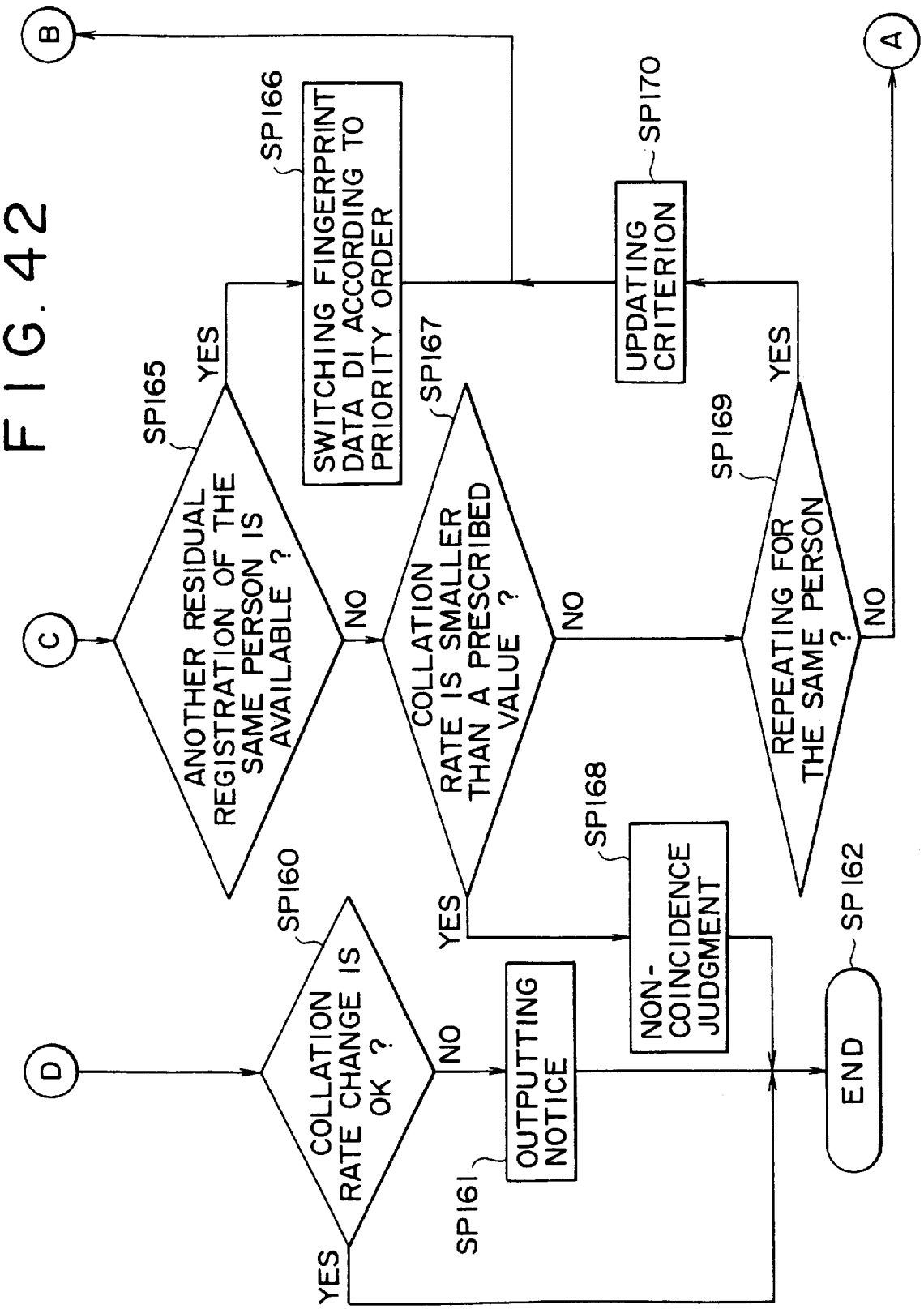
FIG. 42 is a flowchart for describing the continuation of the processing shown in FIG. 41.

In the case that the judgment result of coincidence is not obtained after the frame is moved as described herein above, the system control circuit 3 obtains a YES result in the step SP163 after the system control circuit 3 obtains a NO result in the step SP157, then the sequence proceeds to the step SP165 (FIG. 42). Then, the system control circuit 3 judges whether another fingerprint data D1 is registered for the same person.

As described for FIG. 15 herein before, in the case that the fingerprint data D1 of an index finger, a middle finger, and a little finger is registered with the priority order data in the fingerprint database 5, the sequence proceeds from the step SP165 to the step SP166, the system control circuit 3 switches the fingerprint data D1 according to the priority order, and then the sequence returns to the step SP155. The system control circuit 3 performs fingerprint collation between the fingerprint data D2 inputted from the fingerprint data input section 4 and the fingerprint data D11 of an index finger registered in the fingerprint database 5 initially, and subsequently performs fingerprint collation between the fingerprint data D2 and the fingerprint data of a middle finger and then the fingerprint data of a little finger, even in the case that a user places a middle finger instead of an index finger because, for example, the user has a hurt on the index finger, the fingerprint collation device 1 identifies the person consistently. When, by switching successively the fingerprint data D1 according to the priority order, the time required for fingerprint collation is shortened additionally.

If it is difficult to obtained the judgment result of coincidence in spite of switching of the fingerprint data D1 as described herein above, the system control circuit 3 obtains a NO result in the step SP165, and then the sequence proceeds to the step SP167. The system control circuit 3 judges whether the collation rate is smaller than a certain value, if a YES result is obtained, then the sequence proceeds to the step SP168, the system control circuit 3 outputs a judgment result of non-coincidence, and the sequence returns to the step SP162. Thus the system control circuit 3 outputs a judgment result of non-coincidence only when the system control circuit 3 judges consistently that the target fingerprint does not corresponds to the target person.

As described for FIG. 43 herein before for the case of a child, the collation rate can decrease as a child grows, and in the case the fingerprint has been not collated for long time form the previous fingerprint collation, it is difficult to resume the collation rate by way of the above-mentioned processing in the step SP160, and after all, it is difficult to obtain a judgment result of coincidence. Also in the case that the fingerprint is defective due to hurt on the finger, it is difficult to obtain a judgment result of coincidence.

In such case, significant decrease in the collation rate is not observed differently from collation with a fingerprint of another person, a NO result is obtained in the step SP167. Further in such case, by repeating collation with the fingerprint data D1, approximately the same degree of collation rate is obtained.

In this embodiment, if a NO result is obtained in the step SP167, then the sequence proceeds to the step SP169, the system control circuit 3 judges whether the series of fingerprint collation is repeated on the same user ID, and if a NO result is obtained, then the sequence returns to the step SP151. As described herein above, the system control circuit 3 fetches again the fingerprint data D2 and performs fingerprint collation processing in the case that it is difficult to definitely judge it to be coincident or non-coincident. A user can carried out fingerprint collation again with placing, for example, a middle finger instead of an index finger.

In this repeated fingerprint collation processing, if a NO result is obtained again in the step SP167, then the system control circuit 3 obtains a YES result in the step SP169, the sequence proceeds to the step SP170, and the system control circuit 3 reduces the criterion for coincidence judgment, and the sequence returns to the step SP155. In the case that it is difficult to definitely judge the coincidence after repeated processing as described herein above and the collation rate is maintained in a certain range, a correct judgment result is obtained by judging it to be coincident, thereby the system control circuit 3 can output a judgment result of coincidence consistently.

Figure 45:
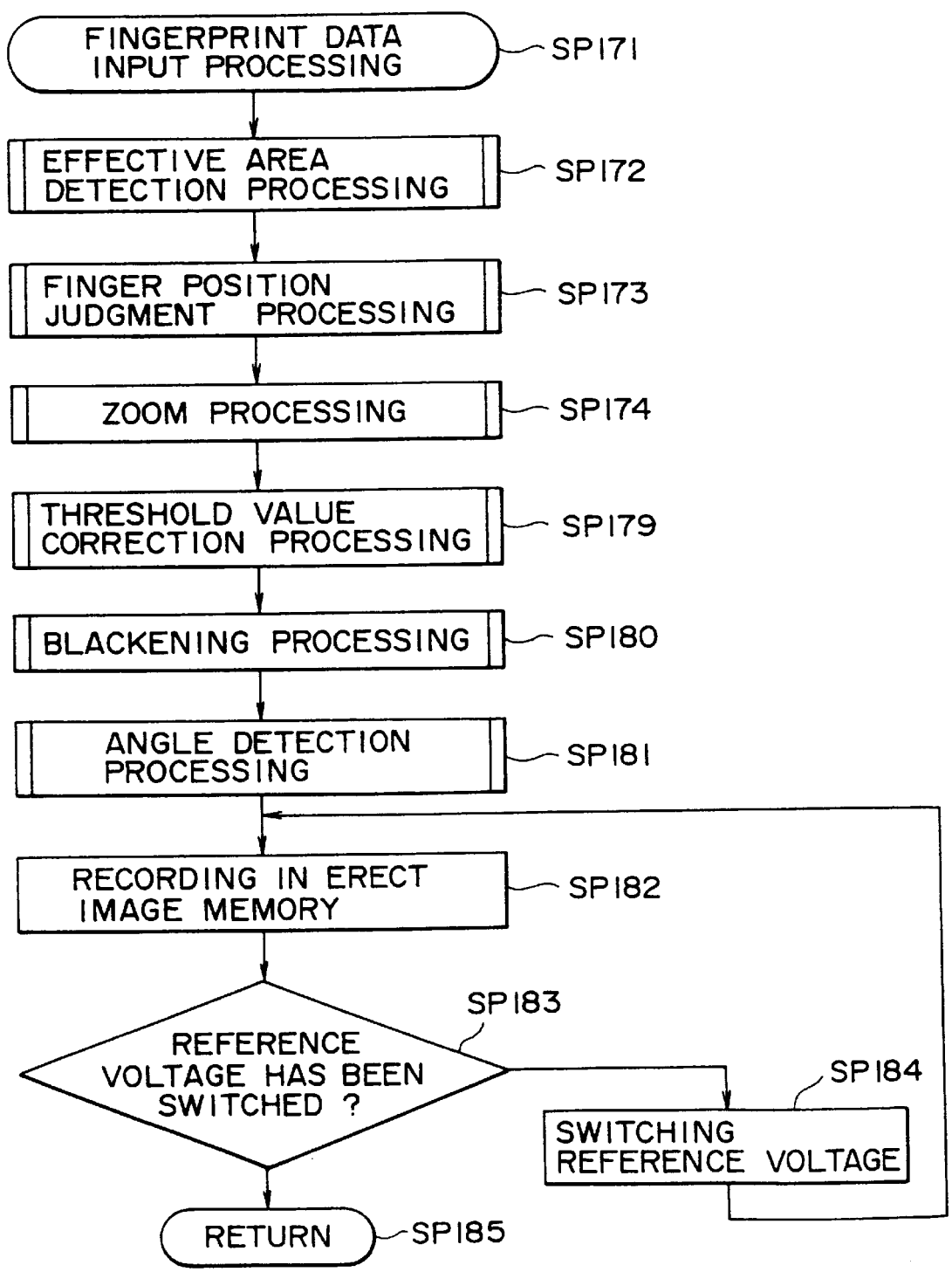
FIG. 45 is a flowchart for describing fingerprint data input processing shown in FIG. 41.

FIG. 45 is a flowchart for describing fingerprint data input processing. The sequence proceeds from the step SP171 to the step SP172, the system control circuit 3 executes effective area detection processing. The effective area detection processing is performed in the same manner as the effective area detection processing described for FIG. 25, thereby the system control circuit 3 sets the effective area usable for fingerprint collation in the effective area, thereafter executes various processing with reference to the effective area, and thus these various processing is simplified.

Subsequently, the sequence proceeds to the step SP173, the system control circuit 3 executes finger position detection processing. The finger position detection processing is performed in the same processing sequence as the finger position detection processing described for FIG. 27, the system control circuit 3 collates a fingerprint only when a user places a finger correctly, thus the fingerprint collation accuracy is improved.

Subsequently, the sequence proceeds to the step SP174, the system control circuit 3 executes zoom processing. As shown in FIG. 46, in the zoom processing, the sequence proceeds from the step SP175 to the step SP176, the system control circuit 3 loads the magnification of the corresponding fingerprint data D1 from the fingerprint database 5, and in the subsequent step SP177, sets the thinning proportion of the thinning circuit 20 dependently on the loaded magnification, then the sequence proceeds to the step SP178 and returns to the main routine. Thereby the system control circuit 3 fetches the fingerprint data D2 of the collation target with reference to the magnification of the fingerprint data D1 registered in the fingerprint database 5, and inputs the fingerprint data D2 under the same condition as for registration. and thus the fingerprint collation accuracy is improved additionally.

Subsequently, the sequence proceeds to the step SP179 (FIG. 45), the system control circuit 3 executes threshold value correction processing, then the sequence proceeds to the step SP180, the system control circuit 3 executes blackening processing, and executes angle detection processing in the subsequent step SP181. Further the system control circuit 3 inputs the fingerprint data D2 to the erect image memory 6A in the subsequent step SP182, then the sequence proceeds to the step SP183. The threshold value correction processing, blackening processing, and angle detection processing are performed in the same processing sequence as corresponding processing described for FIG. 29, FIG. 30, and FIG. 31. Thereby the system control circuit 3 corrects the reference voltage of the comparison circuit 14 so as to perform consistently fingerprint collation, and avoids effectively image deterioration due to soiling of a finger, and further fetches the fingerprint data D2 with an inclination of the finger.

The system control circuit 3 judges whether the reference voltage REF2 is already set in the comparison circuit 14 of the fingerprint data input section 4, and if a NO result is obtained, then the sequence proceeds to the step SP184, the system control circuit 3 switches the reference voltage, and the sequence returns to the step SP182. Thereby the system control circuit 3 repeats a processing sequence of the step SP182-SP183-SP184-SP182, updates successively the reference voltage which is the reference for setting the threshold value under the condition that the reference voltage is corrected by performing threshold value correction processing, stores the total three fingerprint images in the fingerprint collation memory 6, and thereafter the sequence proceeds to the step SP185 to finish this processing sequence.

Figure 47:
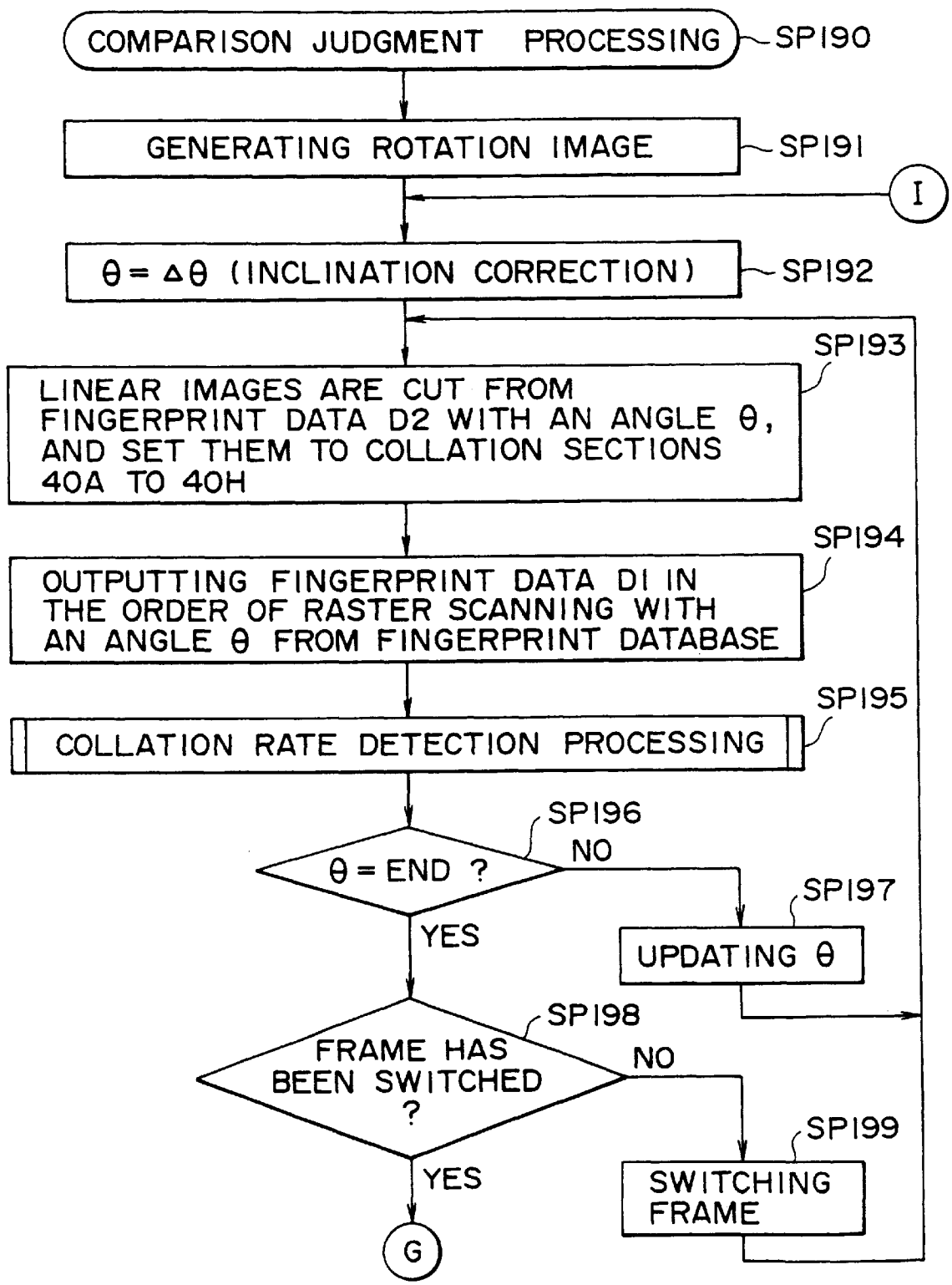
FIG. 47 is a flowchart for describing comparison judgment processing shown in FIG. 41.
Figure 48:
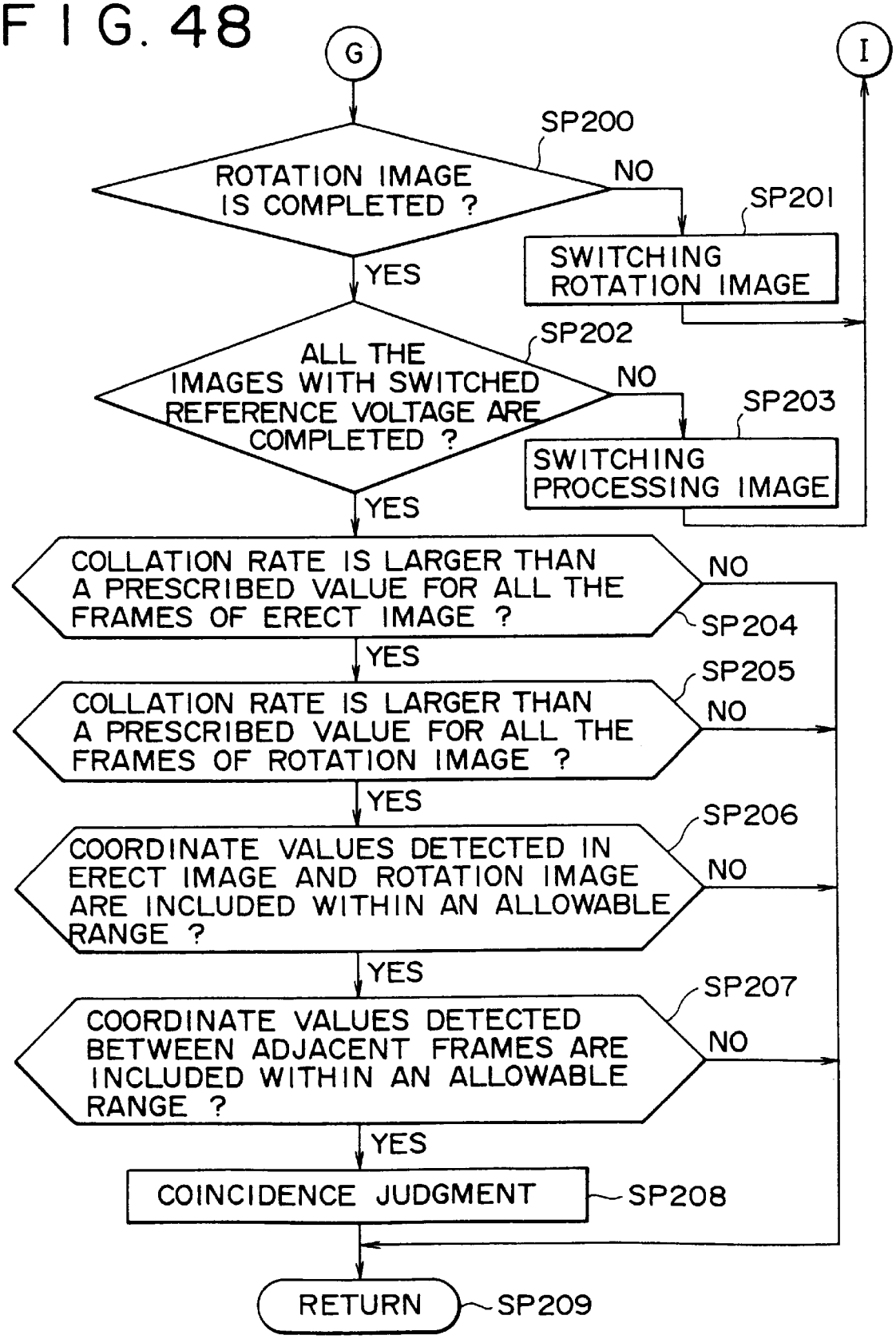
FIG. 48 is a flowchart for describing the continuation of the processing shown in FIG. 47.

FIG. 47 and FIG. 48 are flowcharts for describing processing sequence of comparison judgment processing. The sequence proceeds from the step SP190 to the step SP191, the system control circuit 3 transmits the fingerprint data D2 stored in the erect image memory 6A to the image rotation circuit 31 segment-by-segment, and stores the fingerprint data outputted from the image rotation circuit 31 in the rotation image memory 6B. Further, the system control circuit 3 transmits the corresponding fingerprint data D1 stored in the fingerprint database 5 to the image rotation circuit 31 segment-by-segment, and stores the fingerprint data D1 outputted from the image rotation circuit 31 in the database rotation image memory 5B. Thereby the system control circuit 3 rotates the processing target image 90 degrees (refer to FIG. 10 and FIG. 11).

Figure 49:
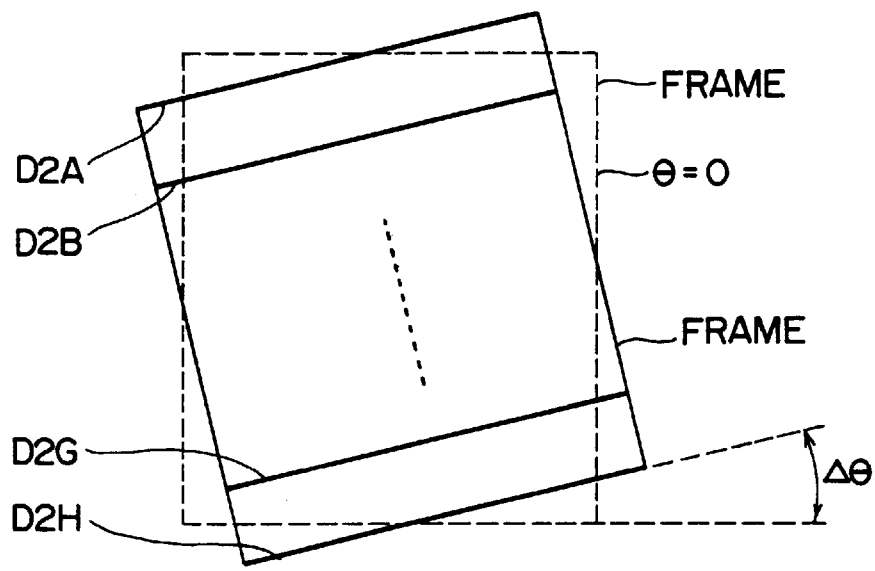
FIG. 49 is a schematic diagram for describing inclination correction .

Subsequently, the sequence proceeds to the step SP192, the system control circuit 3 sets a frame with an inclination by an inclination angle $\Delta\theta$ which is detected in the above-mentioned angle detection processing (refer to FIG. 45, in step SP181), and sets the frame with correction of inclination of a finger as shown in FIG. 49.

Figure 50:
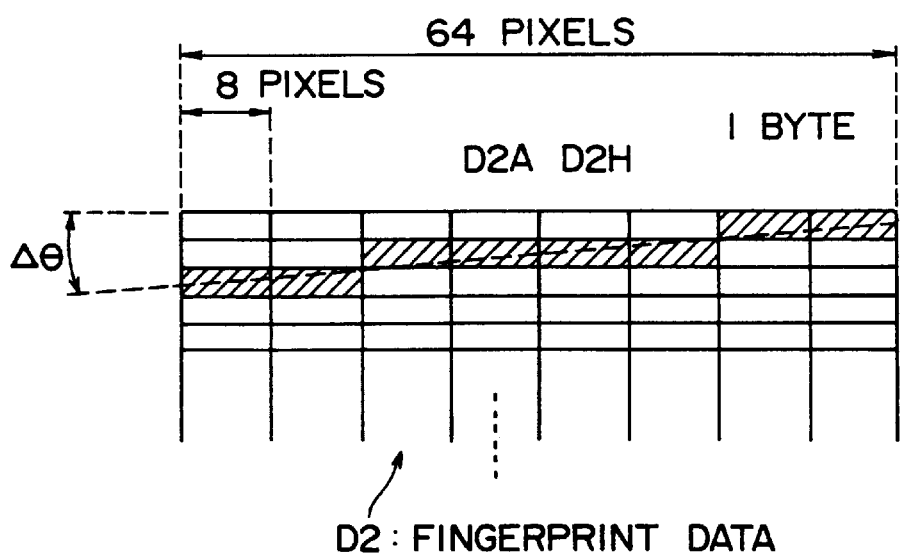
FIG. 50 is a schematic diagram for describing image data processing in the inclination processing shown in FIG. 49.

In detail, the system control circuit 3 stores 8 pixel data as 1 byte fingerprint data D2 in the fingerprint collation memory 6 as shown in FIG. 50, controls the address of the memory control circuit 30 in 8 pixel unit, and cuts successively an image, which is inclined approximately by the angle $\Delta\theta$ from the horizontal direction, into linear images (64 pixels).

Further, the system control circuit 3 outputs the fingerprint data D2A to D2H which form the linear images cut as described herein above to the collation sections 40A to 40B respectively, and stores the latch circuit of the respective collation sections 40A to 40B (refer to FIG. 17). Thereby the system control circuit 3 sets the linear images with an inclination with respect to the image of the fingerprint data D1, and thus corrects the inclination of the image of the fingerprint data D2 with respect to the image of the fingerprint data D1. Thus, the fingerprint collation device 1 can perform fingerprint collation consistently even if a user places a finger with inclination within a certain range.

When an image is cut into linear images with setting of a frame as described herein above, the system control circuit 3 executes a prescribed judgment sequence and sets the fingerprint data D2A to D2H so that blackening segments detected by performing blackening processing (refer to FIG. 45, in the step SP180) are not cut to form liner images, and thereby the fingerprint collation accuracy is prevented from deterioration. The frame is set with reference to the previously detected effective area to omit the ineffective collation rate detection processing, and the fingerprint collation accuracy is improved.

The system control circuit 3 counts previously the number of switching of the logical level on the fingerprint data D2A to D2H which are cut linearly, and excludes the portion where the count value is smaller than a prescribed value from the target. Thereby the line passes across a prescribed number of fingerprints on the portion where these linear images are cut, information effective for fingerprint collation is sufficiently included in the cut area, and thus the fingerprint collation accuracy is improved. By the way, the system control circuit 3 determines the position of a frame in the same manner as used for registration of fingerprints.

Figure 51:
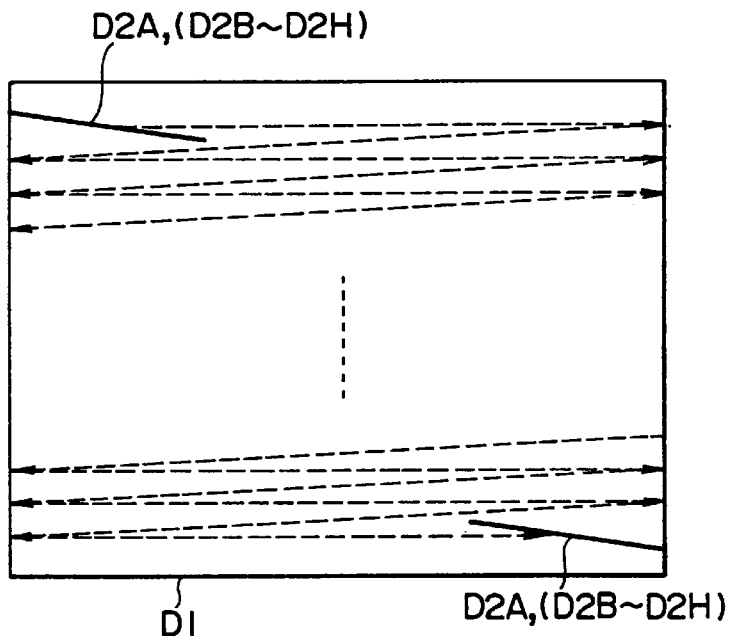
FIG. 51 is a schematic diagram for describing the supply of a fingerprint data to inclination corrected linear images.

Subsequently, the sequence proceeds to the step SP194, the system control circuit 3 transmits successively the corresponding fingerprint data D1 from the fingerprint database 5 to the collation sections 40A to 40H so that the fingerprint data D1 continue successively in the order of raster scanning. Thereby the system control circuit 3 scans the linear images in the order of raster scanning on an image of the fingerprint data D1 in the respective collation sections 40A to 40H as shown in FIG. 51, and detects the number of bits which is coincident between the liner images and the overlapped image of the fingerprint data D1 by means of the counter 45 of the respective collation sections 40A to 40H (refer to FIG. 16). Further, the system control circuit 3 fetches and holds successively coordinate values where the count value rises beyond the threshold value set in the resister 46, namely the position which is judged that two overlapped images are very similar, in the coordinate group memory 49 using the coordinate value of the fingerprint data D1.

When the fingerprint data D1 is outputted from the fingerprint data base 5 as described herein above, the system control circuit 3 switches operation of the comparison circuit 44 so that the fingerprint database 5 outputs the comparative result compared with a certain logical level for the corresponding bit of the fingerprint data D1 which is judged to be an ineffective area namely blackening area, and also switches the threshold value which is set to the register 46 correspondingly to the change in the above-mentioned logical level, and changes the criterion used in the subsequent comparison circuit 47. Thus the system control circuit 3 performs processing with a mask on such ineffective areas and blackening areas.

Subsequently, the sequence proceeds to the step SP195, the system control circuit 3 executes collation rate detection processing. The collation rate detection processing is executed in the same processing as the collation rate detection processing described for FIG. 36, FIG. 37, and FIG. 38.

The system control circuit 3 performs raster scanning of linear images which are cut from the fingerprint data D2 on an image of the fingerprint data D1, and judges totally the degree of similarity of the overlapped portion to detect the collation rate. When, the system control circuit 3 forms partial combinations from coordinate values obtained by scanning successively the linear images, excludes combinations of coordinate values which have the detected high degree of similarity accidentally, and detects the number of combinations which satisfy the relative positional relation between the residual coordinates. Thus the system control circuit 3 shorten the time required for processing, and performs fingerprint collation within a short time.

Figure 53:
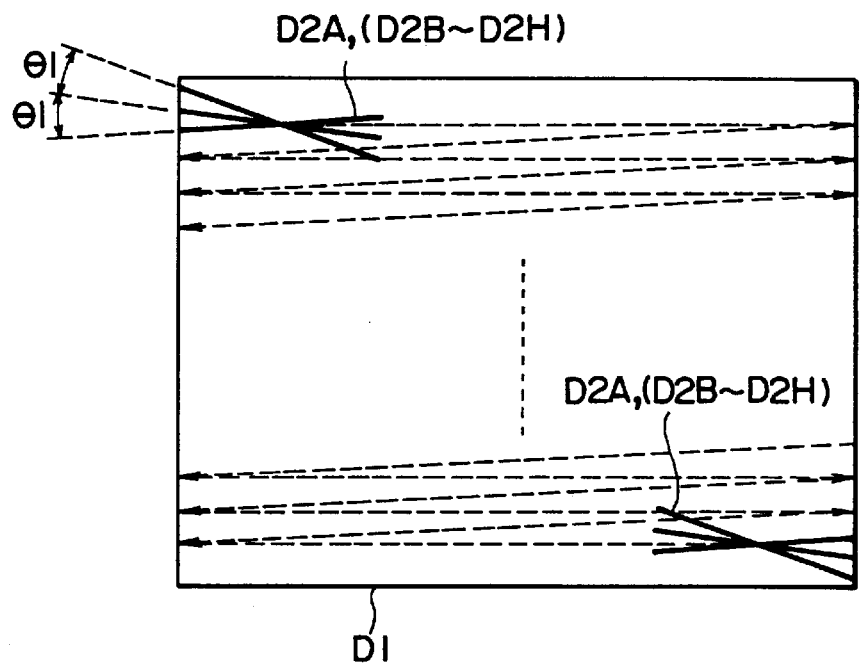
FIG. 53 is a schematic diagram for describing angle switching.

Subsequently, the sequence proceeds to the step SP196, the system control circuit 3 judges whether the angle θ is the final. Herein, the system control circuit 3 detects the collation rate a plurality of times repeatedly with varying an inclination of the image to be cut into linear images with the center of the above-mentioned inclination correction angle Δθ as shown in FIG. 53, and judges totally the coincidence of the fingerprint with reference to the respective collation rate. In this case, the system control circuit 3 obtains a NO result in the step SP196, updates the angle θ in the step SP197, and then the sequence returns to the step 193.

Thus the system control circuit 3 cuts an image of the fingerprint data D1 into linear images with varying successively the angle, and detects the collation rate successively using the cut image. The system control circuit 3 can performs fingerprint collation consistently even if a fingerprint is inclined so severely as it is difficult to correct the inclination by way of angle correction and even if a fingerprint is partially deformed. In this embodiment, the collation rate is detected respectively for 5 angles with the center at the above-mentioned angle Δθ.

Figure 54:
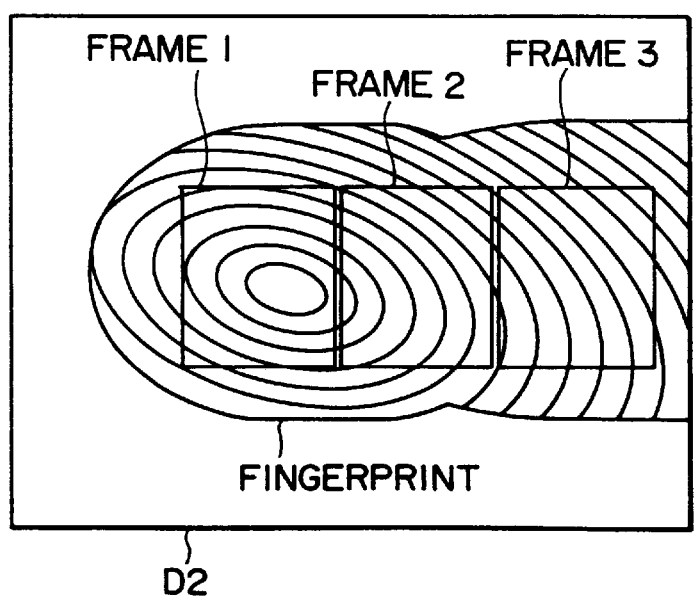
FIG. 54 is a schematic diagram for describing frame switching.

After the collation rate is detected respectively for each angle, a YES result is obtained in the step SP196, then the sequence proceeds to the step SP198. At this time point, the system control circuit 3 judges whether switching of the frame is completed. In this embodiment, three frames are set continuously, coincidence of the fingerprint is judged on each frame, and thus the identification capability is improved as shown in FIG. 54.

In this case, a NO result is obtained in the step SP198, then the sequence proceeds to the step SP199, the system control circuit 3 switches the frame from frame-1 to frame-2, and then the sequence proceeds to the step SP193. Thereby the system control circuit 3 detects the collation rate of frame-2 in the same manner, and then detects the collation rate of frame-3 in the same manner.

After the collation rate is detected as described herein above, a YES result is obtained in the step SP198, and then the sequence proceeds to the step SP200 (refer to FIG. 48). The system control circuit 3 judges whether the same processing is executed on the rotation image stored in the rotation image memory 6B and the database rotation image memory 5B, and obtains a NO result, then the sequence proceeds to the step SP201. The system control circuit 3 switches the processing target from the fingerprint data D1 and D2 held in the erect image memory 6A and fingerprint database 5 respectively which have been the processing target heretofore to the fingerprint data D1 and D2 stored in the rotation image memory 6B and the database rotation image memory 5B, and then the sequence returns to the step SP192.

Thus the system control circuit 3 detects successively the collation rate under the condition that the angle is corrected also on the image which is rotated 90 degree with switching the angle successively and switching the frame successively. Thereby the fingerprint collation device 1 can perform fingerprint collation more consistently. In the processing, the system control circuit 3 cuts a fingerprint image outputted from the fingerprint data input section 4 into linear images approximately in horizontal and vertical direction, detects the degree of similarity between the linear images and a fingerprint image stored in the fingerprint database, and judges thereby the degree of two-dimensional similarity by combining the one-dimensional image data processing which is relatively easy to perform.

After the collation rate is detected as described herein above, a YES result is obtained in the step SP200, and then the sequence proceeds to the step SP202. The system control circuit 3 judges whether the detection processing of the collation rate is completed on all the images fetched in the fingerprint collation memory 6 after the reference voltage is switched, and if a NO result is obtained, then the sequence proceeds to the step SP203, the system control circuit 3 switches the processing target image, and the sequence returns to the step SP103.

The system control circuit 3 detects the collation rate of the erect image and rotation image with switching of the frame and inclination on three fingerprint images fetched with switching of the reference voltage.

After the collation rate is detected as described herein above, a YES result is obtained in the step SP202, then the sequence proceeds to the step SP204, the system control circuit 3 judges whether the collation rate larger than a prescribed value is obtained on each frame of the erect image. If a YES result is obtained, then the sequence proceeds to the step SP205, the system control circuit 3 judges whether the collation rate larger than a prescribed value is obtained on each frame of the rotation image in the same manner.

Figure 55:
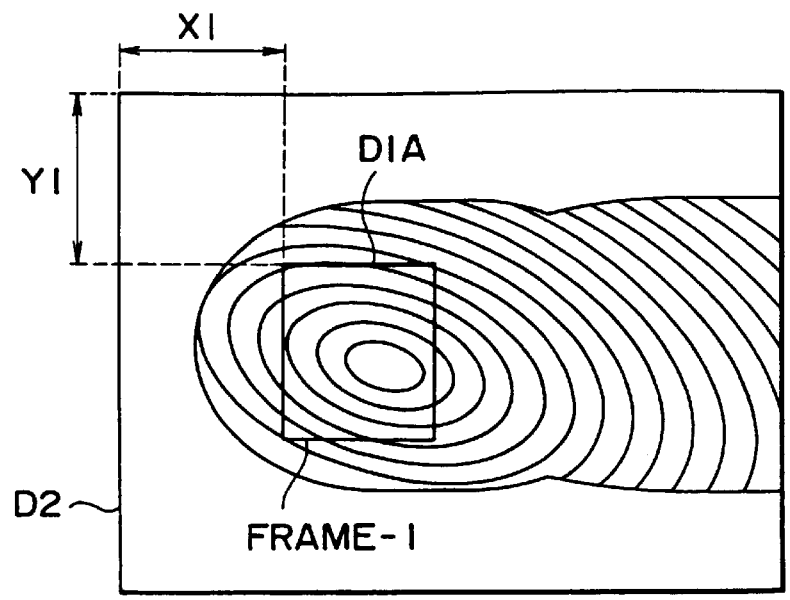
FIG. 55 is a schematic diagram for describing coordinate values on an erect image.
Figure 56:
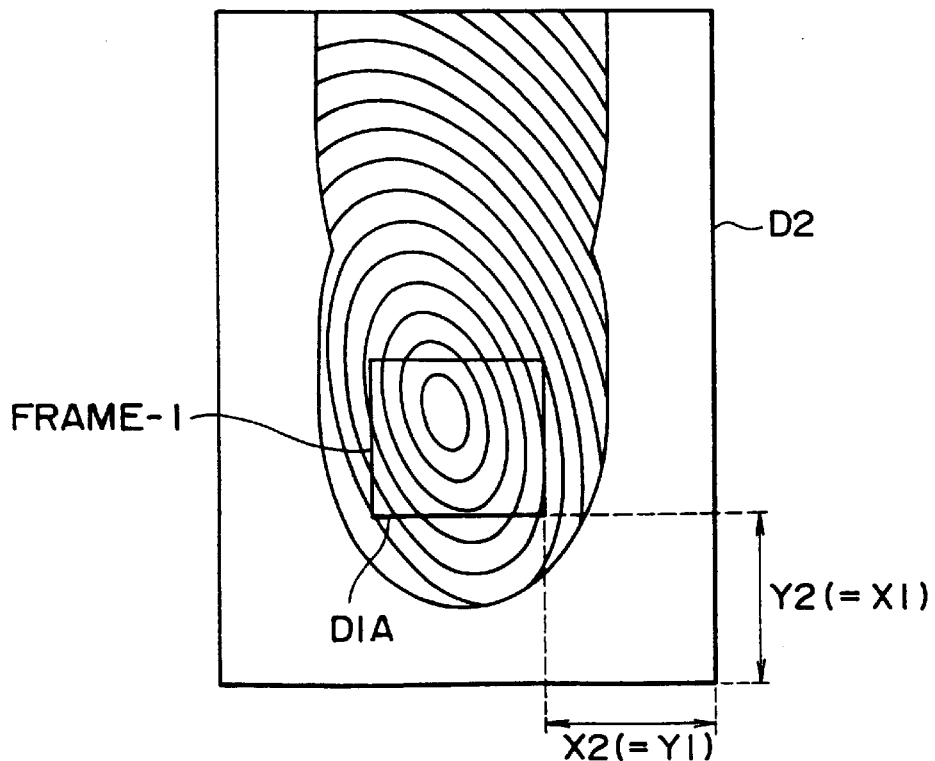
FIG. 56 is a schematic diagram for describing coordinate values on a rotation image in relation to the erect image shown in FIG. 55.

If a YES result is obtained, the sequence proceeds to the step SP206, and the system control circuit 3 loads coordinate values where a collation rate larger than the prescribed value is detected on the erect image and rotation image from the coordinate group memory 49. Further, system control circuit 3 judges whether the coordinate values are included in a prescribed allowable range. In detail, as shown in FIG. 55 and FIG. 56, in the case that the fingerprint is coincident between the fingerprint data D1 and D2, for example, coordinate values (X1, Y1) and (X2, Y2) where a collation rate larger than a prescribed value is detected by scanning the linear image D2A are the first coordinate which satisfies the relative positional relation on the frame in the erect image and rotation image. By the way, in the case that frame-1 is set at the same position in the erect image and rotation image for the image of the fingerprint data D2, then X-coordinate and Y-coordinate are in the relation of X1=Y2, and Y1=X2.

In the case that the relation is disturbed, when linear image happens to be scanned in the horizontal or vertical direction, the system control circuit 3 can judges it to be another person having the partially similar fingerprint pattern. Thus in this embodiment, identification capability of the system control circuit 3 is improved more by way of the reference of coordinate value between the erect image and rotation image.

If a YES result is obtained in the step SP206, then the sequence proceeds to the step SP207. The system control circuit 3 judges whether the coordinate values detected on these frames satisfy the relative positional relation at the time when the frames are set by judging whether the coordinate value detected on the adjacent frame on the erect image is included in a certain allowable range.

Figure 57:
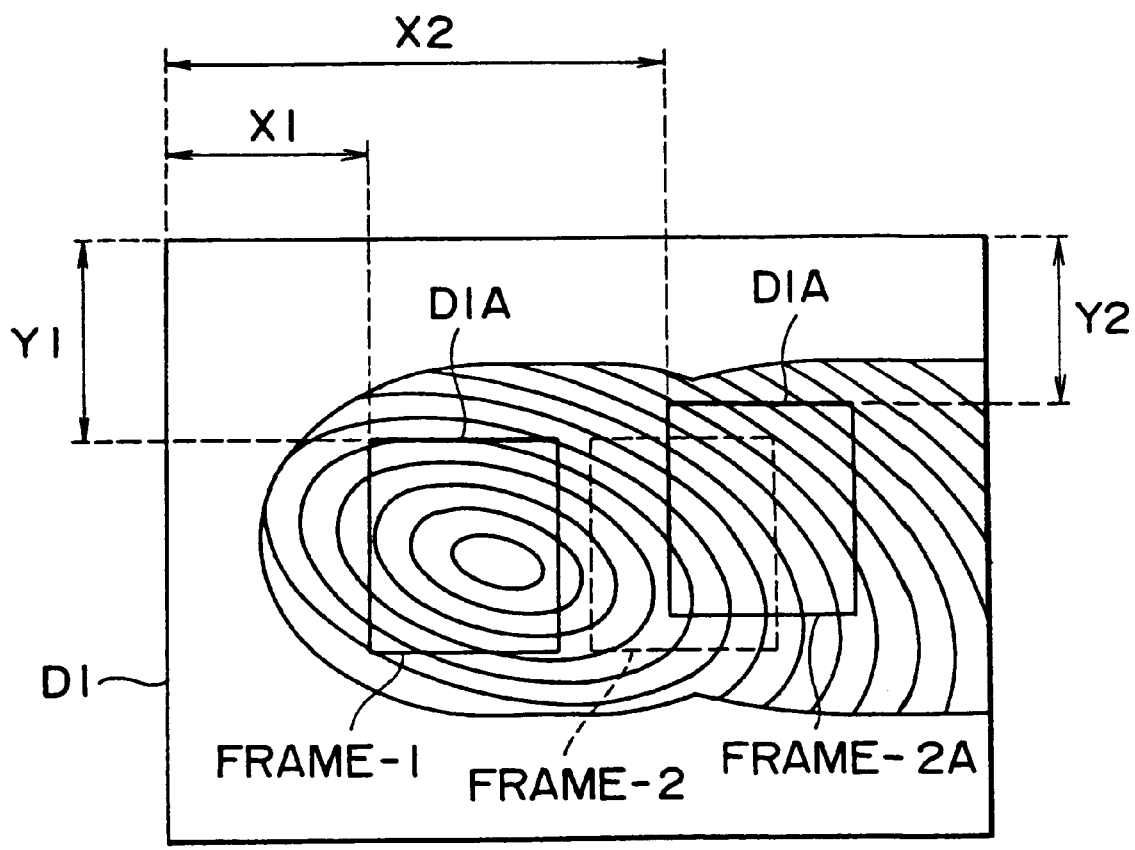
FIG. 57 is a schematic diagram for illustrating the relation between coordinate values detected from each frame.

In the case that the fingerprint is identical between the fingerprint data D1 and D2 as shown in FIG. 57, the coordinate values (X1, Y1) and (X2, Y2) of the fingerprint D1 where a certain collation rate is obtained by scanning with the linear image D2A on each frame corresponds to the initial relation at the time when the frames are set. If the relation is disturbed, when linear image happens to be scanned in the horizontal or vertical direction, the system control circuit 3 can judges it to be another person having the partially similar fingerprint pattern. Thus in this embodiment, identification capability of the system control circuit 3 is improved more by way of the reference of coordinate value between the adjacent frames.

If a YES result is obtained between the adjacent frames on the erect image as described herein above, the system control circuit 3 executes the same processing on the adjacent frame of the rotation image, and thereby identification capability is improved more.

In processing in the respective steps from the step SP204 to the step SP207, the system control circuit 3 judges whether a YES result is obtained respectively on each fingerprint image which is obtained with witching the angle and reference voltage, and if a YES result is obtained on any image, then the sequence proceeds to the next step. Thereby the system control circuit 3 judges coincidence with the image of the fingerprint data D1 on the fingerprint images obtained with switching the angle and reference voltage by way of so called or-judgment. Thereby the system control circuit 3 avoids the deterioration of identification capability between the person and another person, and outputs the result of coincidence consistently in the case of the person.

If a YES result is obtained in the step SP207 as described herein above, the sequence proceeds from the step SP207 to the step SP208, the system control circuit 3 judges the fingerprint to be coincident only for this case, and the sequence returns from the step SP209 to the main routine.

Thus the system control circuit 3 judges the fingerprint to be coincident only when the fingerprint can be judged to be coincident consistently, and thereby the fingerprint collation accuracy is improved. Further, the processing described for FIG. 42 is repeated as required, the system control circuit 3 outputs the judgment of coincidence for the user who is judged to be coincident and outputs the definite judgment of non-coincidence for the user who is judged to be not coincident.

The above-mentioned update processing of criterion described with reference to FIG. 42 updates the criterion of the above-mentioned steps of the step SP204 to the step SP207. Similarly, in the recording of the collation rate in the step SP159 shown in FIG. 41, and in the change judgment of the collation rate in the step SP160 shown in FIG. 42, collation rates detected for a plurality of frames and inclinations as described herein above are recorded and collation rates recorded are judged. The judgment of the collation rate in the step SP166 involves the repetition of the judgment in the steps from the step SP204 to the step SP207.

(2) Operation of the embodiment

In the fingerprint collation device 1 having the structure as described herein before, the reference data of the light quantity correction memory 16 which was set when shipping from a factory is set in the reference voltage generation circuit 15 by way of the control performed by the system control circuit 3 when the power source is thrown in (FIG. 2, FIG. 3 to FIGS. 6A and 6B, and FIG. 20), and thereby the reference voltage of the comparison circuit 14 is set so that the light quantity of the optical system is corrected segment-by-segment. Thereby deterioration of the fingerprint collation accuracy due to light quantity dispersion of the optical system is effectively avoided, and the fingerprint collation accuracy can be high with the optical system having a simple structure.

The illumination light emitted from the light source 12 under this condition is reflected on the base of the isosceles triangle prism 11, a fingerprint is picked up by means of the CCD camera 13, and the image-picked up result is converted to a binary signal by means of the comparison circuit 14. The binary signal S1 outputted from the comparison circuit 14 is latched by means of the latch circuit 18, the binary signal S1 is converted to a 1 bit image data, thinned by means of the thinning circuit 20, and converted to a 8 bit image data in 8 pixel unit by means of the serial-parallel conversion circuit 21.

The image data outputted from the serial-parallel conversion circuit 21 as described herein above is inputted to the system control circuit 3 through the data bus BUS, and the number of bits where the logical level falls down is counted segment-by-segment (refer to FIG. 21), thereby abnormality of the optical system is monitored. Abnormality such as soiling of the base of the isosceles triangle prism 11 which is the finger placing place and deterioration of the light source 12 is detected, and maintenance processing is performed as required, thus deterioration of the fingerprint collation accuracy is avoided effectively.

When a user operates the key input section 2 (refer to FIG. 1), the fingerprint collation device 1 executes the corresponding fingerprint registration processing and fingerprint collation processing (refer to FIG. 20).

In the fingerprint registration processing, the fingerprint collation device 1 presses the user to place a finger through the display section 8 (refer to FIG. 22), starts finger registration processing in response to the change in the image data outputted from the serial-parallel conversion circuit 21, thus fingerprint registration is performed with simple operation.

Subsequently, the pressure sensor 23 (refer to FIG. 2) provided on the side of a finger detects biological reaction of the finger, and if biological reaction is not detected, then the fingerprint registration processing is brought to a stop. Thus security is improved in the aspect of fingerprint registration.

On the other hand, if biological reaction is detected, input condition of the fingerprint data is arranged, thereafter a plurality of fingerprint images are taken in, and the image that is most suitable for fingerprint collation is registered in the fingerprint data base 5.

After registration of the index finger is completed in this registration work, the fingerprint collation 1 device subsequently registers the fingerprint data D1 of the middle finger, and further subsequently the fingerprint data of the little finger, and priority in the order from index finger, to middle finger, and little finger is registered (refer to FIG. 15). Thus the fingerprint collation device 1 can perform fingerprint collation using any one of an index finger, a middle finger, and a little finger in fingerprint collation processing, and the convenience for use is improved additionally. The fingerprint collation device 1 performs fingerprint collation processing according to the priority order for fingerprint collation, and the time required for collation is shortened.

In operation of the fingerprint collation device 1 in the actual processing of a pick-up image (refer to FIG. 23), the system control circuit 3 counts the output data from the serial-parallel conversion circuit 21, thereby the area which is formed by picking up image of the background is excluded in a segment unit, and only the effective area where a fingerprint is picked up actually is detected (refer to FIG. 25). Thus the subsequent series of processing is performed with reference to the effective area, and the time required for processing is shortened additionally.

Subsequently, whether the position where the finger is placed is correct is judged based on the number of segments in the effective area (refer to FIG. 41), thereby deterioration of collation accuracy due to incorrect placing of the finger is avoided. Further in the subsequent processing, the thinning proportion involved in the thinning circuit 20 (refer to FIG. 2) is varied based on the number of segments included in the effective area, thus fingerprint is image picked up with a magnification suitable for fingerprint collation for a small finger, for example, a finger of a child, and the fingerprint collation accuracy is improved.

In the subsequent threshold value correction processing (refer to FIG. 29), the number of bits of logical H-level is detected segment-by segment in the effective area, and the area where the finger is placed tightly on the base of the isosceles triangle prism 11 is detected on each segment in the effective area, and then the content of the threshold value correction memory 24 (FIG. 2) is corrected so that the count value of each segment is included in the range from 30 to 70%. The content of the threshold value correction memory 24 is set so that the reference data of the light quantity correction memory 16 is corrected, and thereby deterioration of the fingerprint collation accuracy due to variation of pressing force of the finger and deterioration of the fingerprint collation accuracy due to soiling of the isosceles triangle prism 11 are avoid effectively in a segment unit.

Subsequently in blackening processing (refer to FIG. 30), the number of bits of logical L-level is detected segment-by-segment in the effective area, thereby blackening segments which is not suitable for fingerprint collation are detected, and these segments are excluded from the collation target. Also a finger which is abnormally wet is given a notice. Thus only the image pick-up result performed under condition suitable for fingerprint collation is subjected to processing, and the fingerprint collation accuracy is improved.

Subsequently in angle detection processing (refer to FIG. 31, FIG. 32, and FIG. 33), the inclination of a finger is detected with reference to the effective area, and an notice is given to a user in the case that the inclination is abnormal. Thus deterioration of the fingerprint collation accuracy due to inclined placing of a finger is avoided.

After input condition of the finger data D1 is arranged as described herein above (refer to FIG. 24) in the fingerprint collation device 1, the fingerprint data D1 outputted from the serial-parallel conversion circuit 21 for N images is fetched in the erect image memory 6A of the fingerprint collation memory 6 (refer to FIG. 9), subsequently the reference voltage REF of the comparison circuit 14 is offset by a prescribed voltage to the positive side (refer to FIGS. 8A and 8B1 to 8B3), and the fingerprint data D1 for N images is fetched in the same manner in the erect image memory 6A in the erect image memory 6A, and inversely, the reference voltage REF is off-set by a prescribed voltage to the negative side, and the fingerprint data for N images is fetched in the erect image memory 6A.

By switching the reference voltage to offset, the fingerprint collation device 1 equalizes the width of the fingerprint image. The change in the binary signal S1 due to variation of pressing force, due to deformation of a fingerprint, and due to soiling of the optical system for image pick-up of a finger is absorbed, and deterioration of the fingerprint collation accuracy is effectively avoided.

The fingerprint collation device 1 selects an image that is most suitable for fingerprint collation out of these 3N fingerprint images, and the selected fingerprint image is registered in the fingerprint database 5. Thereby the fingerprint collation accuracy of the fingerprint collation device 1 is improved.

In the processing for selecting a fingerprint image that is most suitable for fingerprint collation (refer to FIG. 34), one of the 3N images is assumed to be the fingerprint data registered in the fingerprint database 5, processing for fingerprint collation with other images is repeated to detect the collation rate. Further, the same processing is repeated with switching successively the image which is assumed to be registered, the fingerprint image having the maximum correlation value, that is the collation rate, is selected and subjected to execution. Thus the fingerprint collation device 1 selects the fingerprint data D1 to be registered in the fingerprint database 4 using the criterion corresponding to the actual fingerprint collation, and fingerprint collation is consistently performed additionally.

In detail, the fingerprint collation device 1 outputs a fingerprint data assumed to be registered in the fingerprint database 5 (correspond to n images in FIG. 35) and a fingerprint data (correspond to m images in FIG. 35) which is prepared for detecting the collation rate with the assumed fingerprint data respectively from the erect image memory 6A to the image rotation circuit 31, and the arrangement in a segment is changed to generates a fingerprint data where segments are rotated 90 degree is generated (refer to FIG. 12). Further, the generated fingerprint data is stored in the rotation image memory 6B and database rotation image memory 5B, and thereby the erect image and the rotation image which is the image formed by rotating the erect image 90 degree are generated.

8 linear images are cut from m image successively in the vertical direction each of which linear image is composed of 64 pixel image data in the horizontal direction in the erect image, and the image data of each linear image is set in the latch circuit 41 of the respective collation sections 40A to 40B (refer to FIG. 16). The fingerprint data of n image is supplied simultaneously in parallel to the collation sections 40A to 40B so as to be continuous in the order of raster scanning, and the comparison circuit 44 judges coincidence of each bit between two image data.

The counter 45 counts the number of coincident bits, and the comparison circuit 47 judges whether the count value exceeds a certain reference value. If the count value exceeds a certain value, then the coordinate value of the corresponding n image is recorded in the coordinate group memory 49 with reference to the address data AD of the memory control circuit 30 which outputs the fingerprint data of n image to the collation section 40A to 40B.

Thereby 8 linear images are subjected respectively to raster scanning on n image (refer to FIG. 18), the degree of similarity is detected successively between overlapped images, and coordinate values of positions where the degree of similarity is larger than a certain value are stored in the coordinate group memory 49. When, in the fingerprint collation device 1, scanning of 8 linear images are performed simultaneously in parallel in 8 sets of the collation sections from 40A to 40H respectively, thus a fingerprint image suitable for fingerprint collation is selected within a shorter time.

When such linear images formed by cutting as described herein above are set in the collation sections 40A to 40H, the fingerprint data D1 is set with aid of a prescribed judgment sequence so that the linear image is not formed from blackening segments, thereby deterioration of the fingerprint collation accuracy is effectively avoided. Frames from which linear images are cut are set with reference to the effective area which is detected previously, thereby needed images are cut within a short time. The number of switching of logical level is counted on the fingerprint data which is cut into linear images, and the portion where the count value is smaller than a prescribed value is excluded from the target, and the portion which includes sufficiently effective information is cut, and thus the fingerprint collation accuracy is more improved.

On the other hand, the operation of comparison circuits 44 and 47 is switched so that blackening segment and blank area included in the fingerprint data supplied in the order of raster scanning are covered with a mask, thus deterioration of collation rate due to these areas and segments is effectively avoided.

After the coordinate data of the erect image is held in the coordinate group memory 49 as described herein above, subsequently the fingerprint data stored in the rotation image memory 6B and the database rotation image memory 5B are subjected to the same processing (refer to FIG. 40), and the coordinate data of the rotation image is also recorded (refer to FIG. 19).

The number of combinations which satisfy the relative positional relation of the linear image is detected on the coordinate data recorded as described herein above for every combination of the coordinate values in the collation sections 40A to 40H by way of collation rate detection processing by means of the system control circuit 3.

When, the system control circuit 3 detects the number of combinations which satisfy the relative positional relation of the corresponding linear image for every combinations of coordinate values obtained from the collation sections 40A, 40B, and 40C initially, and coordinate values where the high degree of similarity happen to be detected are excluded with reference to the number of combinations, and the collation rate is detected on the residual combinations. Thereby targets to be subjected to processing is reduced previously with aid of the partial combinations, and the collation rate is detected within a shorter time, the image suitable for registration is selected within a short time.

After the collation rate is detected on m image on the assumption that n image is registered in the fingerprint database as described herein above, the collation rate is detected with switching the m image, and after the processing is completed on 3N images, then the n image is switched and the same processing is repeated, finally the collation rate is detected respectively for each combination.

The collation rate detected as described herein above is dealt as the correlation value when fingerprint registration, the fingerprint data which gives the largest correlation value when it is assumed to be registered in the fingerprint database is registered in the fingerprint database 5, thus the fingerprint collation accuracy is improved.

In the fingerprint collation processing, the fingerprint collation device 1 presses a user to place a finger (refer to FIG. 41), and starts fingerprint collation processing in response to the change of the image data outputted from the serial-parallel conversion circuit 21, and thus fingerprint collation is performed by way of simple operation.

Subsequently, the pressure sensor 23 (refer to FIG. 2) provided on the side of a finger detects biological reaction of a finger, and if biological reaction is not detected, then the fingerprint collation processing is brought to a stop. Thus the security is improved in the aspect of fingerprint collation.

On the other hand, if biological reaction is detected, then input condition for fingerprint data is arranged, thereafter the fingerprint data is fetched, and fingerprint collation is performed between the fetched fingerprint data and the fingerprint data registered in the fingerprint database 5 for the corresponding user.

In detail, the effective area is detected from the output data of the serial-parallel conversion circuit 21 (refer to FIG. 25) under the input condition of the fingerprint data for this fingerprint collation (refer to FIG. 45). Thereby subsequent series of processing is performed with reference to the effective area, and the time required for collation is shortened additionally. Whether a finger is placed on the correct place is judged based on the number of segments in the effective area (refer to FIG. 41), and deterioration of collation accuracy due to incorrect placing of the finger is effectively avoided.

In the subsequent zoom processing (refer to FIG. 46), the thinning proportion to be involved in the thinning circuit 20 is set in the fingerprint data input section 4 so as to correspond to the magnification registered in the fingerprint database 5, thereby the thinning circuit 20 is set so that the fingerprint data is inputted with the same magnification as that for the fingerprint registration, and the fingerprint collation accuracy is improved.

In the threshold correction processing (refer to FIG. 29), the content of the threshold correction memory 24 (refer to FIG. 2) is corrected segment-by-segment in the effective area, thereby deterioration of the fingerprint collation accuracy due to varying pressing force and deterioration of the fingerprint collation accuracy due to soiling of the isosceles triangle prism 11 is avoided effectively in segment unit. Further in the blackening processing (refer to FIG. 30), blackening segments which are unsuitable for fingerprint collation are detected, and these segments are excluded from collation target, a notice is given to a user when a finger is moist, and thus an image pick-up result is subjected to processing under the condition suitable for fingerprint collation, and the fingerprint collation accuracy is improved.

In the subsequent angle detection processing (refer to FIG. 31, FIG. 32, and FIG. 33), the inclination of a finger is detected with reference to the effective area, a notice is given to a user when the inclination is abnormal, inclination correction processing is performed based on the detection result when fingerprint collation (refer to FIG. 47, and the step SP192), and deterioration of the fingerprint collation accuracy due to inclination of a finger is avoided effectively.

After input condition of the fingerprint data D1 is arranged as described herein above, in the fingerprint collation device 1, the fingerprint data D2 outputted from the serial-parallel conversion circuit 21 is fetched in the erect image memory 6A of the fingerprint collation memory 6 (refer to FIG. 9), subsequently the reference voltage REF of the comparison circuit 14 is offset by a prescribed voltage to the positive side (refer to FIGS. 8A and 8B1 to 8B3), similarly the fingerprint data D2 is fetched in the erect image memory 6A, inversely the reference voltage REF is offset by a prescribed voltage to the negative side, and the fingerprint data D2 is fetched in the erect image memory 6A.

The reference voltage REF is offset and then switched, thereby in the fingerprint collation device 1 the width of collation target fingerprint image is approximately equalized, and deterioration of the fingerprint collation accuracy due to varying pressing force and deformed fingerprint is effectively avoided The fingerprint data D2 (refer to FIG. 47) fetched in the fingerprint collation memory 6 as described herein above is outputted from the erect image memory 6A to the image rotation circuit 31 where the arrangement in segments are changed, and thereafter stored in the rotation image memory 6B, thereby the rotation image which is the image that the erect image is rotated 90 degrees is held in the rotation image memory 6B. On the other hand, the fingerprint data D1 which is the comparison target is outputted from the fingerprint database 5 to the image rotation circuit 31 where the arrangement in segments are changed, thereafter stored in the database rotation image memory 5, and the rotation image corresponding to that stored in the rotation image memory 6B is generated.

Subsequently, the fingerprint data D2 is inclined by a prescribed angle with respect to the horizontal direction (refer to FIG. 49 and FIG. 50) so that the inclination detected in the inclination detection processing is corrected, 8 linear images each of which comprises 64 pixel image data are cut, the respective linear image data are set in the latch circuit 41 of the respective collation sections 40A to 40B (refer to FIG. 16). Thereby the inclination of the fingerprint image held in the fingerprint database 5 is corrected, and the fingerprint collation accuracy is improved. The fingerprint data D1 which is comparison target in the fingerprint database 5 is supplied simultaneously in parallel to the collation sections 40A to 40B so as to be continuous in the order of raster scanning, and the comparison circuit 44 judges the coincidence of each bit between these two image data set.

Further the counter 45 counts the number of coincident bits, the comparison circuit 47 judges whether the count value exceeds a certain reference value. If the count value exceeds a certain value, then the coordinate data of the corresponding fingerprint data D1 is recorded in the coordinate group memory 49.

These 8 linear images are subjected respectively to raster scanning on the image of the fingerprint data D1 (refer to FIG. 51), the degree of similarity is detected successively between overlapped images, and coordinate data of portions where the degree of similarity exceeds a certain value are stored in the coordinate group memory 49. When, in the fingerprint collation device 1, scanning of these linear images are executed simultaneously in parallel in 8 collation sections 40A to 40H, and thus fingerprint collation is performed within a short time additionally.

When the cut linear images are set in the collation sections 40A to 40H, the fingerprint data D2 is set so that the linear image is not cut from blackening segments, and thus deterioration of the fingerprint collation accuracy is effectively avoided. Frames where the linear images are cut are set, and thus a needed image is cut within a short time. The number of switching in logical level is counted on the fingerprint data to be subjected to linear cutting, portions where the count value is smaller than a prescribed value are excluded from the target, thereby only the portion which includes sufficiently useful information for fingerprint collation is subjected to linear cutting, and thus the fingerprint collation accuracy is improved.

On the other hand, operation of the comparison circuits 44 and 47 is switched so that blackening segments and blank areas of the fingerprint data D1 in the fingerprint database 5 side are masked, and thus the fingerprint collation accuracy is improved.

The coordinate data recorded as described herein above is subjected to detection processing, in the detection processing, the number of combinations which satisfy the relative positional relation of the linear images is detected combination-by-combination of coordinate values in the collation sections 40A to 40H by way of the same processing as used for fingerprint registration (refer to FIG. 36 and FIG. 37), and the collation rate is detected based on the detected number of combinations. When, in the system control circuit 3, combinations which does not satisfy the relative positional relation in the partial combinations corresponding to the collation sections 40A to 40C are excluded from the processing target, thereby coordinate values of the portions where high degree of similarity happens to be detected are excluded, and the collation rate is detected on the residual combinations. Thus the collation rate is detected within a short time, and the time required for collation is shortened.

Figure 52:
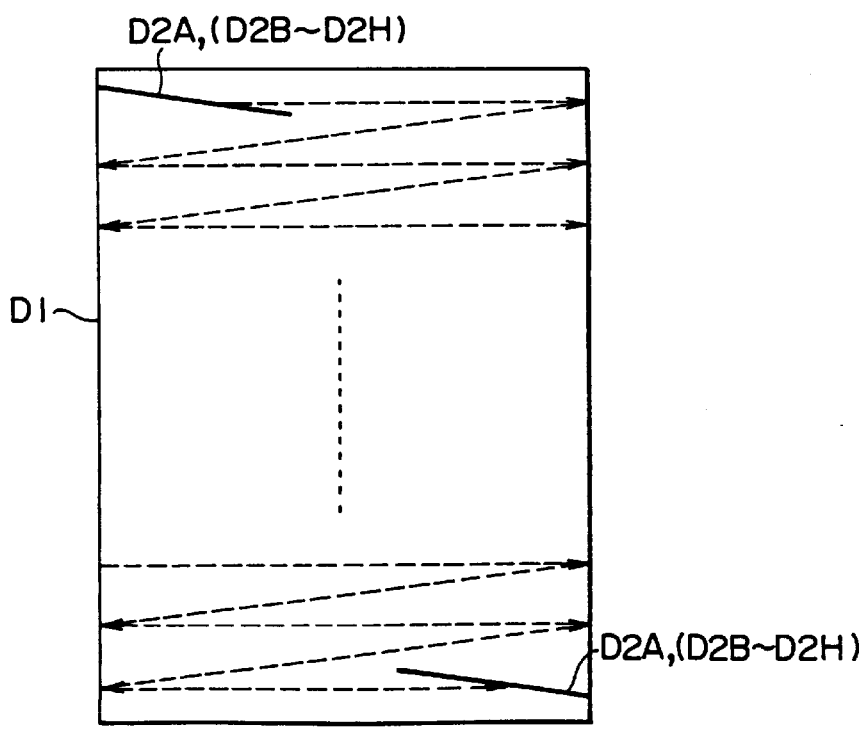
FIG. 52 is a schematic diagram for describing the case of a rotation image shown in FIG. 51.

After the collation rate is detected on the inclination corrected fingerprint data D2 as described herein above, subsequently the inclination angle θ is updated (refer to FIG. 53), the same processing is executed, and the same processing is executed with switching the frame (refer to FIG. 54). After the series of processing is completed on the erect image, the same processing is executed with updating successively the angle θ and frame on the rotation image (refer to FIG. 52). Further, after processing on the erect image and rotation image is completed, the same processing is repeated with a switched threshold value on the fingerprint data D2 which is left when it is fetched in the fingerprint collation memory 6 (refer to FIG. 47, and the step SP202 and 203).

After a plurality of collation rates are detected corresponding to each angle and each threshold value of the erect image and rotation image as described herein above, whether the collation rate is larger than a certain value on all the switched frames on the erect image is detected, subsequently whether the collation rate is larger than a certain value on all the switched frames on the rotation image is detected in the same manner. Further whether the coordinate values detected on the corresponding frames on the erect image and rotation image satisfy the relative positional relation is detected, and the same processing is performed on the switched frames to detect such coordinate values. In the case that these all the conditions are satisfied, the fingerprint of the fingerprint data D2 is judged to be coincident with the fingerprint of the fingerprint data D1. On the other hand, in the case that any one condition is not satisfied, the judgment of coincidence is suspended.

By identifying a fingerprint with reference to the erect image and rotation image, identification capability is improved. A plurality of frames are specified, a plurality of linear images are cut from each frame, the coincidence between the linear images is determined, and thereby the accuracy of determination can be improved more than the method for determining coincidence between images by cutting linear images from only one frame.

Compared with the method for determination by increasing the number of linear images to be cut, the whole configuration can be simplified. Also, in this case, the relatively positional relationship between coordinate values in frames is added to a reference of determination and conditions are added for neighboring frames, and thereby identification power is further improved.

In the judgment, the coincidence is judged by the logical sum in each frame of the erect image and rotation image for collation rate obtained with the switched angle and reference voltage, thus the identification capability is improved for a person registered in the fingerprint database 5, and the result of coincidence is outputted consistently.

In the case that the judgment of coincidence is suspended (refer to FIG. 41), a frame which will be a reference is moved (the step SP163), and the same processing is repeated again. Thus the fingerprint collation accuracy is improved. Further, in the case that the judgment of coincidence is suspended even after moving the frame (refer to FIG. 42), the target fingerprint data D1 is switched according to the priority order if another fingerprint data of the same user is stored (refer to the step SP165), and the same processing is repeated, and thus the fingerprint collation accuracy is improved additionally.

Further, if only a low collation rate can be obtained although such processing is repeated, it is determined that images do not coincide with each other, and thereby the accuracy of fingerprint collation is improved. If the determination of coincidence is completely difficult, that is, the collation ratio is continued in a constant range, the determination reference is reduced, the same processing is repeated, and thereby a person can consistently be identified even when his/her finger is much dried. If the determination of coincidence is completely difficult and the collation ratio can be obtained in a constant range for a fingerprint of a stranger, it is characterized that continuation of the collation ratio in this range is not almost observed, and thereby according to the embodiments, the determination reference is reduced to effectively prevent the identification power from being reduced to allow consistent identification.

Figure 41:
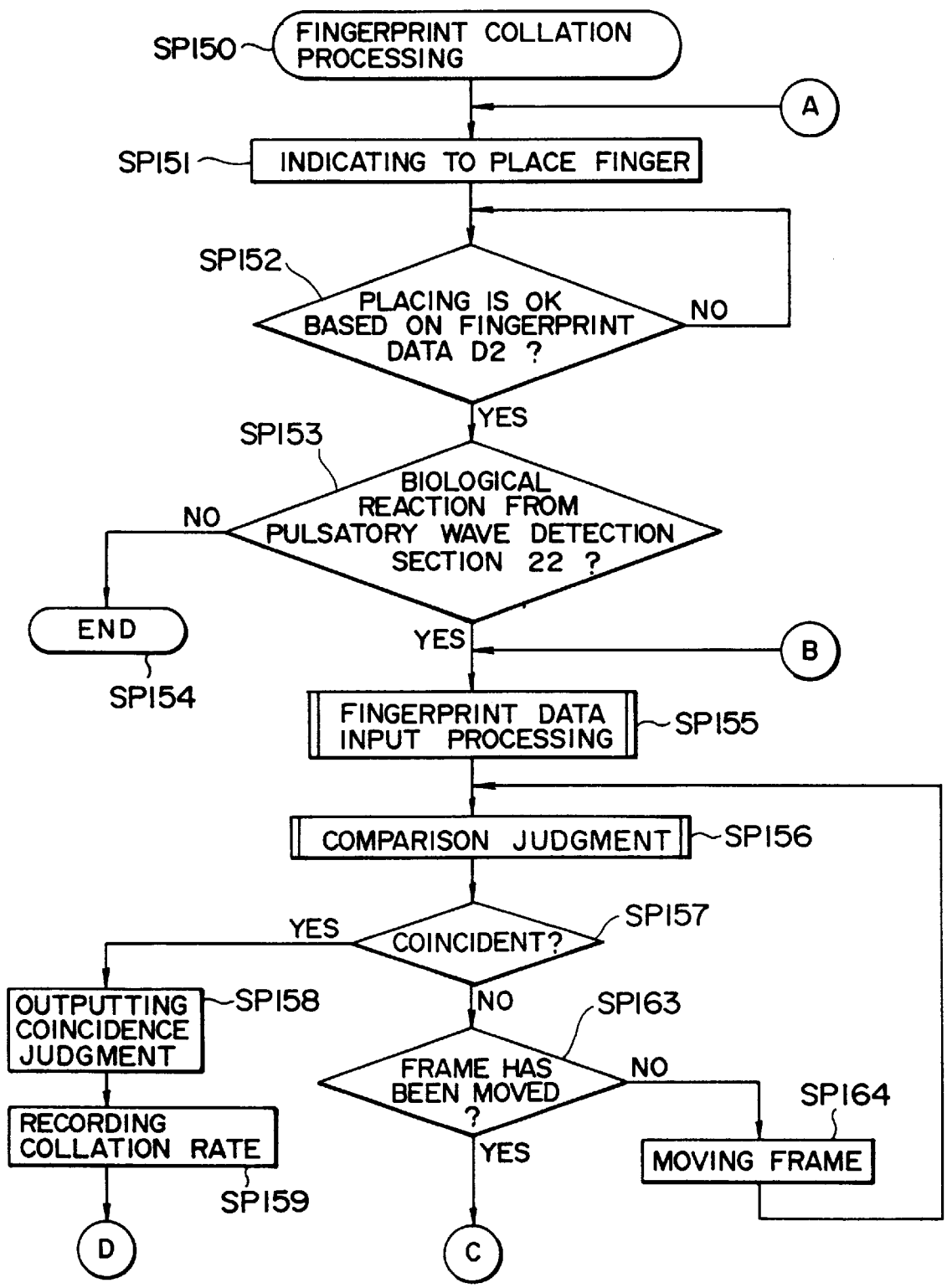
FIG. 41 is a flowchart for describing fingerprint registration processing shown in FIG. 20.

On the other hand, in the case that a fingerprint is judged to be coincident, a judgment result is outputted, and thereafter the collation rate of this judgment is recorded in the fingerprint database 5 (refer to FIG. 15 and FIG. 41). Subsequently, the historical transition of collation rates recorded in the fingerprint database 5 is confirmed, and if the record shows the decreasing trend, then the user is pressed to update the recorded fingerprint data (refer to FIG. 43). Thereby the collation rate is resumed even if the size of a finger has changed, and fingerprint collation is performed consistently.

(3) Effect of the embodiment

According to the above-mentioned structure, a plurality of frames are specified for an image to be collated, the coincidence in each frame is determined using linear images cut from frames, the determination results obtained on each frame is determined on a overall basis, and finally the coincidence between the images is determined. Thereby consistent fingerprint collation is enabled with a simplified structure.

Further, the determination of coincidence by adding the relatively positional relationship in frames as a reference can improve identification power more.

Moreover, for the collation ratio obtained by changing an angle and reference voltage, the determination of coincidence by logical ADD for upright image and rotating image in each frame can consistently obtain coincidence results for data on the person himself/herself registered in data base 5 by improving identification power.

(4) Other embodiments

In the embodiment described above, the coincidence in all frames is determined, and the above embodiment showed that for the collation ratio obtained by changing an angle and reference voltage, the coincidence is determined by logical ADD for upright image and rotating image in each frame. However, in the present invention, these determination methods are simplified if necessary and the coincidence may be determined in all frames on a overall basis.

In the above-mentioned embodiment, the present invention is not limited to the determination of coincidence based on the relatively positional relationship in each frames, the coincidence may be determined in all frames on a overall basis.

Further, in the above-mentioned embodiment, the present invention is not limited to the case that three frames are specified and respective eight linear images are cut. That is, the number of frames to be specified and the number of linear images to be cut can freely be selected as the need arises.

In the embodiment described herein before, the case that an image to be examined is cut for fingerprint collation is described, however the present invention is by no means limited to the case, and can be applied widely to the case that a fingerprint image registered in the fingerprint database is cut for fingerprint collation.

In the embodiment described herein before, that case that the present invention is applied as a fingerprint collation device, however the present invention is by no means limited to the case, and is applied as, for example, a collation device of stamp, and an image collation device for judging entire or partial similarity or dissimilarity between database images.

According to the present invention as described herein, a plurality of frames are specified for an inspection object, a plurality of linear images are cut from each frame, the coincidence between images in each frame is determined with reference to a plurality of these cut linear images, the determination result is determined on an overall basis to finally determine the coincidence, and thereby consistent collation results for images such as fingerprints can be obtained with a simple structure.

What is claimed is:

1. An image collation apparatus for determining whether a first image and a second image coincide with each other comprising:

means for extracting a plurality of linear images in a first frame of said first image, said first frame being a contiguous subset of said first image;

means for extracting a plurality of linear images in said second image;

means for comparing successively each of said linear images in said first frame of said first image with each corresponding linear image of said second image and for producing coordinate values, of locations in said second image, for each of said linear images in said first frame when a coincidence occurs;

means for successively selecting produced coordinate values for each of said linear images in said first frame;

first detecting means for detecting a first relative positional relationship between a combination of said selected coordinate values in said first frame;

means for extracting a plurality of linear images in a second frame of said first image, said second frame being a different contiguous subset of said first image;

means for comparing successively each of said linear images in said second frame of said first image with each corresponding linear image of said second image and for producing coordinate values, of locations in said second image, for each of said linear images in said second frame when a coincidence occurs;

means for successively selecting produced coordinate values for each of said linear images in said second frame;

second detecting means for detecting a second relative positional relationship between a combination of said selected coordinate values in said second frame; and third detecting means for detecting whether said first and second images coincide with each other based on the results of said first and second detecting means.

2. An image collation apparatus for determining whether a first image and a second image coincide with each other comprising:

means for extracting a plurality of linear images in a first frame of said first image;

means for extracting a plurality of linear images in said second image;

means for comparing successively each of said linear images in said first frame of said first image with each corresponding linear image of said second image and for producing coordinate values, of locations in said second image, for each of said linear images in said first frame when a coincidence occurs;

means for successively selecting produced coordinate values for each of said linear images in said first frame;

first detecting means for detecting a first relative positional relationship between a combination of said selected coordinate values in said first frame;

means for extracting a plurality of linear images in a second frame of said first image;

means for comparing successively each of said linear images in said second frame of said first image with each corresponding linear image of said second image and for producing coordinate values, of locations in said second image, for each of said linear images in said second frame when a coincidence occurs;

means for successively selecting produced coordinate values for each of said linear images in said second frame;

second detecting means for detecting a second relative positional relationship between a combination of said selected coordinate values in said second frame; and third detecting means for detecting whether said first and second images coincide with each other based on the results of said first and second detecting means, wherein said third detecting means detects whether said first and second images coincide with each other by determining whether the first relative positional relationship and the second relative positional relationship satisfy a relative positional relationship between the first and second frames.

3. An image collation apparatus for determining whether a first image and a second image coincide with each other comprising:

means for extracting a plurality of linear images in a first frame of said first image;

means for extracting a plurality of linear images in said second image;

means for comparing successively each of said linear images in said first frame of said first image with each corresponding linear image of said second image and for producing coordinate values, of locations in said second image, for each of said linear images in said first frame when a coincidence occurs;

means for successively selecting produced coordinate values for each of said linear images in said first frame;

first detecting means for detecting a first relative positional relationship between a combination of said selected coordinate values in said first frame;

means for extracting a plurality of linear images in a second frame of said first image;

means for comparing successively each of said linear images in said second frame of said first image with each corresponding linear image of said second image and for producing coordinate values, of locations in said second image, for each of said linear images in said second frame when a coincidence occurs;

means for successively selecting produced coordinate values for each of said linear images in said second frame;

second detecting means for detecting a second relative positional relationship between a combination of said selected coordinate values in said second frame;

third detecting means for detecting whether said first and second images coincide with each other based on the results of said first and second detecting means; and means for specifying one of said first and second frames and successively changing a specified angle of the specified frame, wherein linear images in said specified frame are extracted using specified lines when the specified angle of said specified frame is changed, and produced coordinate values which satisfy a respective relative positional relationship of said linear images in said specified frame specified at a certain angle are detected.

4. An image collation apparatus for determining whether a first image and a second image coincide with each other comprising:

means for extracting a plurality of linear images in a first frame of said first image;

means for extracting a plurality of linear images in said second image;

means for comparing successively each of said linear images in said first frame of said first image with each corresponding linear image of said second image and for producing coordinate values, of locations in said second image, for each of said linear images in said first frame when a coincidence occurs;

means for successively selecting produced coordinate values for each of said linear images in said first frame;

first detecting means for detecting a first relative positional relationship between a combination of said selected coordinate values in said first frame;

means for extracting a plurality of linear images in a second frame of said first image;

means for comparing successively each of said linear images in said second frame of said first image with each corresponding linear image of said second image and for producing coordinate values, of locations in said second image, for each of said linear images in said second frame when a coincidence occurs;

means for successively selecting produced coordinate values for each of said linear images in said second frame;

second detecting means for detecting a second relative positional relationship between a combination of said selected coordinate values in said second frame; and third detecting means for detecting whether said first and second images coincide with each other based on the results of said first and second detecting means, wherein said first image is formed by binarized signals obtained by binarizing multi-valued digital or analog signals according to specified thresholds;

one of said first and second frames is specified according to changed thresholds;

linear images in the specified frame are extracted using specified lines according to each threshold; and produced coordinate values which satisfy a respective relative positional relationship of said linear images in said specified frame specified at a certain threshold are detected.

5. An image collation apparatus for determining whether a first image and a second image coincide with each other, comprising:

means for extracting a plurality of linear images in a first frame from said first image;

means for comparing successively each of said linear images in said first frame with said second image by moving said each linear image on said second image and detecting coordinate values, of locations in said second image, having a predetermined degree of similarity between said each linear image and said second image;

means for successively selecting detected coordinate values for each of said linear images in said first frame to form combinations of said detected coordinate values in said first frame;

first determining means for determining coordinate values for each of the combinations of said selected coordinate values in said first frame that satisfy a relative positional relationship between the plurality of linear images in the first frame;

means for extracting a plurality of linear images in a second frame from said first image;

means for comparing successively each of said linear images in said second frame with said second image by moving said each linear image on said second image and detecting coordinate values, of locations in said second image, having a predetermined degree of similarity between said each linear image and said second image;

means for successively selecting detected coordinate values for each of said linear images in said second frame to form combinations of said detected coordinate values in said second frame;

second determining means for determining coordinate values for each of the combinations of said selected coordinate values in said second frame that satisfy a relative positional relationship between the plurality of linear images in the second frame; and third determining means for determining whether said first and second images coincide with each other based on the results of said first and second determining means.

6. An image collation apparatus as claimed in claim 5, wherein said third determining means determines whether said first and second images coincide with each other by further determining whether the determined coordinate values that satisfy the relative positional relationship between the plurality of linear images in the first frame and the determined coordinate values that satisfy the relative positional relationship between the plurality of linear images in the second frame satisfy a relative positional relationship between the first and second frames.

7. An image collation apparatus as claimed in claim 5, further comprising means for specifying one of said first and second frames and successively changing a specified angle of the specified frame; wherein linear images in said specified frame are extracted using specified lines when the specified angle of said specified frame is changed; and determined coordinate values that satisfy a respective relative positional relationship of said linear images in said specified frame specified at a certain angle are detected.

8. An image collation apparatus as claimed in claim 5, further comprising means for specifying one of said first and second frames and successively changing specified thresholds of the specified frame; wherein said first image is formed by binarized signals obtained by binarizing multi-valued digital or analog signals according to the specified thresholds;

linear images in the specified frame are extracted using specified lines according to each threshold; and determined coordinate values that satisfy a respective relative positional relationship of said linear images in said specified frame specified at a certain threshold are detected.

* * * * *